(12) United States Patent
Georgeson et al.

(10) Patent No.: US 12,448,124 B2
(45) Date of Patent: Oct. 21, 2025

(54) AERIAL VEHICLES, COOPERATIVE FLYING SYSTEMS, AND METHODS OF OPERATING THE SAME

(71) Applicant: The Boeing Company, Arlington, VA (US)

(72) Inventors: Gary E. Georgeson, Tacoma, WA (US); Joseph L. Hafenrichter, Seattle, WA (US)

(73) Assignee: The Boeing Company, Arlington, VA (US)

( * ) Notice: Subject to any disclaimer, the term of this patent is extended or adjusted under 35 U.S.C. 154(b) by 34 days.

(21) Appl. No.: 18/538,179

(22) Filed: Dec. 13, 2023

(65) Prior Publication Data

US 2024/0109651 A1   Apr. 4, 2024

Related U.S. Application Data

(62) Division of application No. 17/503,537, filed on Oct. 18, 2021, now abandoned.

(Continued)

(51) Int. Cl.
| | |
|---|---|
| *B64C 29/02* | (2006.01) |
| *B64C 3/38* | (2006.01) |
| *B64C 9/26* | (2006.01) |
| *B64C 27/22* | (2006.01) |
| *B64C 27/32* | (2006.01) |
| *B64C 27/54* | (2006.01) |
| *B64D 31/06* | (2006.01) |
| *B64U 10/20* | (2023.01) |
| *B64U 30/10* | (2023.01) |
| *B64U 30/24* | (2023.01) |

(Continued)

(52) U.S. Cl.
CPC ............... *B64C 29/02* (2013.01); *B64C 3/38* (2013.01); *B64C 3/385* (2013.01); *B64C 9/26* (2013.01); *B64C 27/22* (2013.01); *B64C 27/32* (2013.01); *B64C 27/54* (2013.01); *B64D 31/06* (2013.01); *B64U 10/20* (2023.01); *B64U 30/10* (2023.01); *B64U 30/24* (2023.01); *B64U 30/26* (2023.01); *B64U 50/31* (2023.01); *B64U 2201/00* (2023.01)

(58) Field of Classification Search
CPC ......... B64C 39/10; B64C 29/02; B64C 11/48; B64C 37/02; B64U 30/26
See application file for complete search history.

(56) References Cited

U.S. PATENT DOCUMENTS

| | | |
|---|---|---|
| 7,643,893 B2 | 1/2010 | Troy et al. |
| 7,859,655 B2 | 12/2010 | Troy et al. |

(Continued)

*Primary Examiner* — Nicholas McFall
(74) *Attorney, Agent, or Firm* — Walters & Wasylyna LLC

(57) ABSTRACT

An aerial vehicle includes a wing body, a first wingtip, a second wingtip, a first edge, and a second edge. The aerial vehicle includes a pair of coaxial rotors configured to rotate in opposite rotational directions about a vehicle axis and a drive assembly configured to rotate the coaxial rotors. A controller is configured to selectively control thrust produced by the coaxial rotors. Selective control of the thrust produced by the coaxial rotors induces a pitch motion of the aerial vehicle to transition between a horizontal flight state and a vertical flight state. In the horizontal flight state, a collective thrust from the coaxial rotors is directed forward. In the vertical flight state, the collective thrust from the coaxial rotors is directed upward.

20 Claims, 32 Drawing Sheets

Related U.S. Application Data

(60) Provisional application No. 63/127,568, filed on Dec. 18, 2020.

(51) Int. Cl.
*B64U 30/26* (2023.01)
*B64U 50/31* (2023.01)

(56) References Cited

U.S. PATENT DOCUMENTS

| | | |
|---|---|---|
| 9,470,658 B2 | 10/2016 | Troy et al. |
| 10,641,290 B1* | 5/2020 | Piasecki .................... B64C 7/02 |
| 10,712,286 B1 | 7/2020 | Fetzer et al. |
| 2018/0120196 A1 | 5/2018 | Georgeson et al. |
| 2019/0031316 A1* | 1/2019 | Hefner .................... B64C 11/48 |
| 2020/0166938 A1 | 5/2020 | Hafenrichter et al. |
| 2020/0182835 A1 | 6/2020 | Hafenrichter et al. |
| 2020/0207488 A1 | 7/2020 | Troy et al. |
| 2020/0407061 A1 | 12/2020 | Hafenrichter et al. |
| 2021/0232141 A1 | 7/2021 | Georgeson et al. |
| 2021/0237381 A1 | 8/2021 | Hafenrichter et al. |
| 2021/0237861 A1 | 8/2021 | Georgeson et al. |
| 2021/0300546 A1* | 9/2021 | Kisly ....................... B60F 5/02 |

\* cited by examiner

AERIAL VEHICLES, COOPERATIVE FLYING SYSTEMS, AND METHODS OF OPERATING THE SAME

PRIORITY

This application is a divisional of U.S. Ser. No. 17/503,537 filed on Oct. 18, 2021, which claims priority from U.S. Ser. No. 63/127,568 filed on Dec. 18, 2020.

FIELD

The present disclosure relates generally to aerial vehicles and, more particularly, to aerial vehicles configured to operate in horizontal and vertical flight states, cooperative flying systems formed from a plurality of aerial vehicles, and methods of operation.

BACKGROUND

Conventional fixed-wing aircraft are limited to flight in a horizontal direction. Conventional rotorcraft and other vertical takeoff and landing aircraft are capable of flight in both the horizontal direction and a vertical direction. However, such aircraft are not efficient in both horizontal flight and vertical flight. Accordingly, those skilled in the art continue with research and development efforts in the field of aerial vehicles.

SUMMARY

Disclosed are examples, of an aerial vehicle, a method of controlling an aerial vehicle, a cooperative flying system of aerial vehicles, a method of coupling a plurality of aerial vehicles together to form a cooperative flying system, and a method of controlling a cooperative flying system of aerial vehicles. The following is a non-exhaustive list of examples, which may or may not be claimed, of the subject matter according to the present disclosure.

In an example, the disclosed aerial vehicle has a first vehicle axis and a second vehicle axis that is perpendicular to the first vehicle axis. The aerial vehicle includes a wing body having an airfoil shape. The wing body includes a first wingtip and a second wingtip, located opposite the first wingtip along the first vehicle axis. The wing body also includes a first edge and a second edge, located opposite the first edge along the second vehicle axis. The aerial vehicle also includes a plurality of rotors coupled to the wing body. Each one of the plurality of rotors includes a plurality of rotor blades. The aerial vehicle further includes a drive assembly configured to rotate the plurality of rotors. The aerial vehicle additionally includes a controller configured to selectively control thrust produced by each one of the plurality of rotors. Selective control of the thrust produced by each one of the plurality of rotors induces a pitch motion of the aerial vehicle to transition the aerial vehicle between a horizontal flight state and a vertical flight state. In the horizontal flight state, the second vehicle axis is approximately horizontal and a collective thrust from the plurality of rotors is directed forward. In the vertical flight state, the second vehicle axis is approximately vertical and the collective thrust from the plurality of rotors is directed upward.

In another example, the disclosed aerial vehicle includes a wing body having an airfoil shape. The aerial vehicle also includes a plurality of rotors coupled to the wing body. Each one of the plurality of rotors includes a plurality of rotor blades. The aerial vehicle further includes a drive assembly operatively coupled with the plurality of rotors to rotate each one of the plurality of rotors. The aerial vehicle additionally includes a variable pitch mechanism operatively coupled with each one of the plurality of rotors to manipulate blade pitch of each one of the plurality of rotor blades of the plurality of rotors. The aerial vehicle also includes a controller in communication with the variable pitch mechanism and with the drive assembly and configured to selectively adjust the blade pitch of each one of the plurality of rotor blades of the plurality of rotors and to selectively control rotational speed of each one of the plurality of rotors. Variations in at least one of the blade pitch of the plurality of rotor blades of the plurality of rotors and the rotational speed of the plurality of rotors controls a pitch motion, a yaw motion, and a rolling motion of the aerial vehicle. Selective control of the pitch motion of the aerial vehicle transitions the aerial vehicle between a horizontal flight state and a vertical flight state. In the horizontal flight state, the wing body is oriented horizontally and a collective thrust from the plurality of rotors is directed forward. In the vertical flight state, the wing body is oriented vertically and the collective thrust from the plurality of rotors is directed upward.

In another example, the disclosed aerial vehicle includes a wing body having an airfoil shape and including a first wingtip and a second wingtip, located opposite the first wingtip along a first vehicle axis. The aerial vehicle also includes a first edge and a second edge, located opposite the first edge along a second vehicle axis, perpendicular to the first vehicle axis. The aerial vehicle further includes a first coaxial rotor configured to rotate in a first rotational direction about the second vehicle axis, and a second coaxial rotor configured to rotate in a second rotational direction, opposite to the first rotational direction, about the second vehicle axis. The aerial vehicle also includes a drive assembly configured to rotate the first coaxial rotor and the second coaxial rotor. The aerial vehicle further includes a controller configured to selectively control thrust produced by the first coaxial rotor and the second coaxial rotor. Selective control of the thrust produced by the first coaxial rotor and the second coaxial rotor induces a pitch motion of the aerial vehicle to transition the aerial vehicle between a horizontal flight state and a vertical flight state. In the horizontal flight state, the second vehicle axis is approximately horizontal and a collective thrust from the first coaxial rotor and the second coaxial rotor is directed forward. In the vertical flight state, the second vehicle axis is approximately vertical and the collective thrust from the first coaxial rotor and the second coaxial rotor is directed upward.

In an example, the disclosed method of controlling an aerial vehicle includes steps of: (1) selectively controlling at least one of thrust and torque produced by each one of a plurality of rotors to induce at least one of a pitch motion, a yaw motion, and a rolling motion of the aerial vehicle; and (2) in response to the pitch motion, transitioning the aerial vehicle between a horizontal flight state in which the wing body is oriented horizontally and a collective thrust from the plurality of rotors is directed forward, and a vertical flight state in which the wing body is oriented vertically and the collective thrust from the plurality of rotors is directed upward.

In another example, the disclosed method for controlling an aerial vehicle, including a wing body having an airfoil shape, a pair of coaxial rotors coupled to the wing body, and a drive assembly configured to rotate the pair of coaxial rotors, includes steps of: (1) selectively controlling at least one of thrust and torque produced by the pair of coaxial rotors to induce at least one of a pitch motion, a yaw motion, and a rolling motion of the aerial vehicle; and (2) in response to the pitch motion, transitioning the aerial vehicle between a horizontal flight state in which the wing body is oriented horizontally and a collective thrust from the pair of coaxial rotors is directed forward, and a vertical flight state in which the wing body is oriented vertically and the collective thrust from the pair of coaxial rotors is directed upward.

In an example, the disclosed cooperative flying system of aerial vehicles includes a plurality of aerial vehicles configured to be coupled together in flight. Each one of the plurality of aerial vehicles includes a wing body having a first vehicle axis and including a first wingtip and a second wingtip, located opposite to the first wingtip along the first vehicle axis, and a plurality of rotors coupled to the wing body. The cooperative flying system also includes an alignment apparatus configured to align the first wingtip of each one of the plurality of aerial vehicles with the second wingtip of a directly adjacent one of the plurality of aerial vehicles. The cooperative flying system further includes a coupling apparatus configured to couple the first wingtip of each one of the plurality of aerial vehicles to the second vehicle-end of the directly adjacent one of the plurality of aerial vehicles. The cooperative flying system additionally includes a set of vehicle controllers configured to coordinate thrust produced by the plurality of rotors of each one of the plurality of aerial vehicles to alter at least one of a pitch angle, a yaw angle, and a roll angle of the cooperative flying system and a velocity of the cooperative flying system.

In another example, the disclosed cooperative flying system includes a plurality of aerial vehicles configured to be coupled together in flight. Each one of the plurality of aerial vehicles includes a wing body including a first wingtip and a second wingtip, located opposite to the first wingtip along a first vehicle axis. Each one of the plurality of aerial vehicles also includes a first coaxial rotor configured to rotate in a first rotational direction about a second vehicle axis, perpendicular to the first vehicle axis, and a second coaxial rotor configured to rotate in a second rotational direction, opposite to the first rotational direction, about the second vehicle axis. The cooperative flying system also includes an alignment apparatus configured to align the first wingtip of each one of the plurality of aerial vehicles with the second wingtip of a directly adjacent one of the plurality of aerial vehicles. The cooperative flying system further includes a coupling apparatus configured to couple the first wingtip of each one of the plurality of aerial vehicles to the second wingtip of the directly adjacent one of the plurality of aerial vehicles. The cooperative flying system additionally includes a set of vehicle controllers configured to coordinate thrust produced by the first coaxial rotor and the second coaxial rotor of each one of the plurality of aerial vehicles to alter at least one of a pitch angle, a yaw angle, and a roll angle of the cooperative flying system and a velocity of the cooperative flying system.

In an example, the disclosed method of coupling a plurality of aerial vehicles together in flight to form a cooperative flying system includes steps of: (1) aligning a first wingtip of each one of the plurality of aerial vehicles with a second wingtip of a directly adjacent one of the plurality of aerial vehicles; and (2) coupling the first wingtip of each one of the plurality of aerial vehicles to the second wingtip of the directly adjacent one of the plurality of aerial vehicles.

In an example, the disclosed method of controlling a cooperative flying system of aerial vehicles includes steps of: (1) selectively controlling thrust produced by a plurality of rotors of each one of the plurality of aerial vehicles; and (2) coordinating the thrust produced by the plurality of rotors of each one of the plurality of aerial vehicles to induce a pitch motion, a yaw motion, and a rolling motion of the cooperative flying system.

Other examples of the disclosed aerial vehicle, cooperative flying system and methods will become apparent from the following detailed description, the accompanying drawings, and the appended claims.

DETAILED DESCRIPTION

Figure 1:
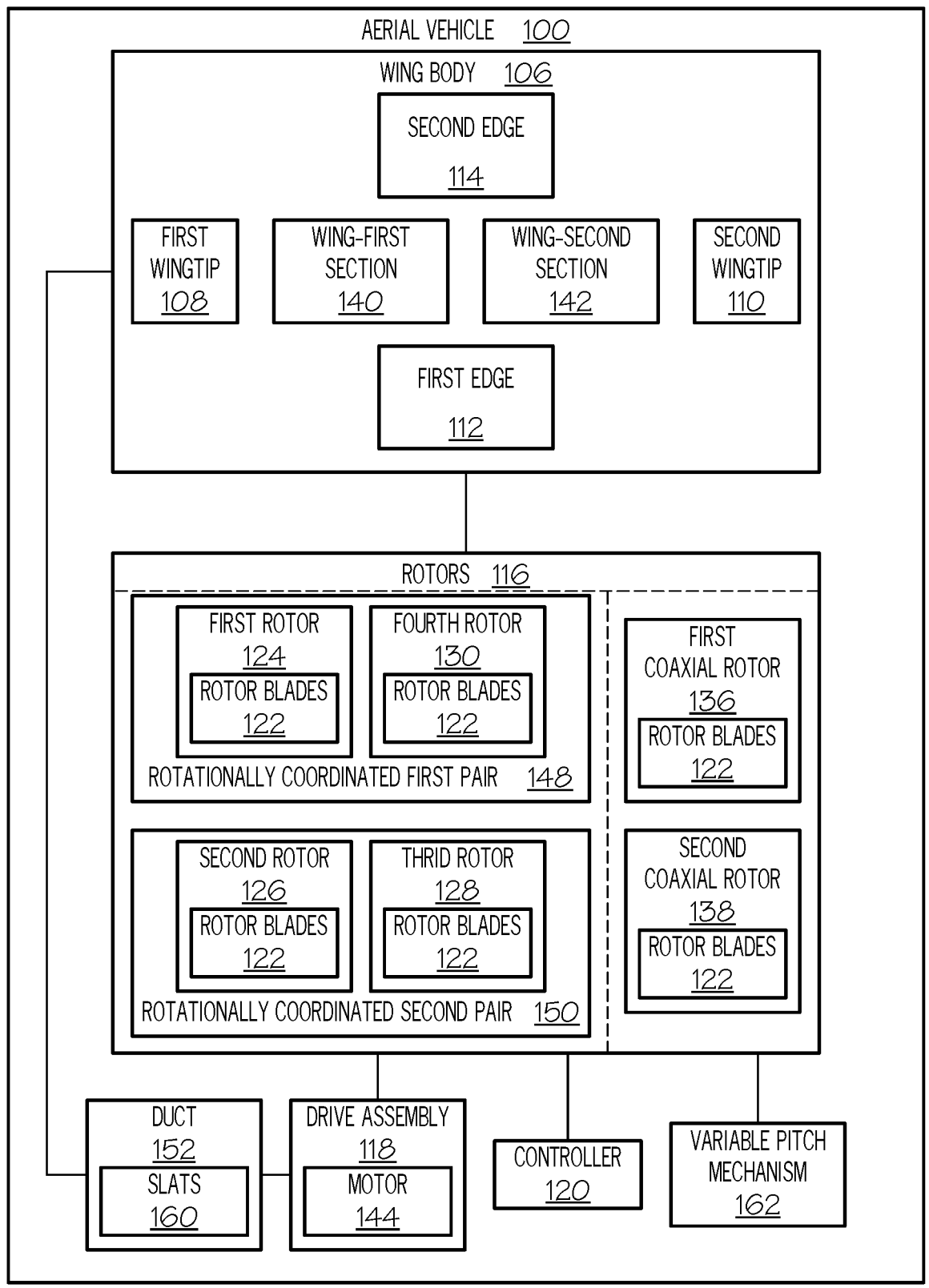
FIG. 1 is a schematic block diagram of an example of an aerial vehicle.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Referring generally to FIGS. 1-15, by way of examples, the present disclosure is directed to an aerial vehicle 100. In one or more examples, the aerial vehicle 100 is an unmanned aerial vehicle (e.g., an aircraft with no pilot onboard) that is controlled remotely, such as by a pilot at a ground control station, or that is controlled autonomously by a flight control system based on programmed flight plans or by a dynamic automated flight control system. In one or more examples, the aerial vehicle 100 is a manned aerial vehicle (e.g., an aircraft with a pilot onboard) that is controlled, at least in part, by onboard pilot input. In piloted examples, the pilot may create manual inputs that drive control of the aerial vehicle in the same way as automated navigational instructions.

The aerial vehicle 100 has a first vehicle axis 102 and a second vehicle axis 104 that is perpendicular to the first vehicle axis 102. The aerial vehicle 100 includes a wing body 106. The wing body 106 forms substantially an entirety of the mechanical load bearing structure of the aerial vehicle 100. The wing body 106 also forms a lifting structure of the aerial vehicle 100. In one or more examples, an airframe of the aerial vehicle 100 is formed primarily by the wing body 106 and does not include a fuselage (e.g., barrel) or a tail. In other words, the aerial vehicle 100 is a flying-wing aircraft.

The wing body 106 has an airfoil shape. When moving through air, the airfoil-shaped wing body 106 produces lift acting on the wing body 106 in a direction that is perpendicular to a direction of relative motion of the wing body 106. The airfoil shape of the wing body 106 may have any suitable cross-sectional shape, viewed along the first vehicle axis 102. The wing body 106 may have a nonsymmetrical airfoil shape or a symmetrical airfoil shape.

The wing body 106 includes a first wingtip 108 and a second wingtip 110. The second wingtip 110 is located opposite the first wingtip 108 along the first vehicle axis 102. Accordingly, the first vehicle axis 102 may also be referred to as a spanwise axis or a longitudinal axis that extends between (e.g., passes through) the first wingtip 108 and the second wingtip 110.

The wing body 106 also includes a first edge 112 and a second edge 114. The second edge 114 is located opposite the first edge 112 along the second vehicle axis 104. The first edge 112 may also be referred to as a leading edge of the wing body 106 and the second edge may also be referred to as a trailing edge of the wing body 106. Accordingly, the second vehicle axis 104 may also be referred to as a chordwise axis or a lateral axis that extends between (e.g., passes through) the first edge 112 and the second edge 114.

The aerial vehicle 100 is configured to operate in a horizontal flight state and a vertical flight state. As used herein, the phrase "horizontal flight state" refers to the state (e.g., orientation, condition, or arrangement) of the aerial vehicle 100 to achieve primarily horizontal motion or forward flight, such as to advance the aerial vehicle 100 in a relative forward direction of travel. As used herein, the phrase "vertical flight state" refers to the state (e.g., orientation, condition, or arrangement) of the aerial vehicle 100 to achieve primarily vertical motion, such as to advance the aerial vehicle 100 in a relative upward or downward direction of travel or to maintain a desired vertical location (e.g., hover). However, the horizontal flight state does not restrict or prevent an altitude change of the aerial vehicle 100 during forward flight. Similarly, the vertical flight state does not restrict or prevent forward flight of the aerial vehicle 100 during an altitude change or hold.

The aerial vehicle 100 also includes a plurality of rotors 116. The plurality of rotors 116 is coupled to the wing body 106. Each one of the plurality of rotors 116 includes a plurality of rotor blades 122. In one or more examples, each one of the plurality of rotors 116 includes a hub 172 (FIGS. 2-11). Each one of the plurality of rotor blades 122 of a corresponding one of the plurality of rotors 116 is coupled to the hub 172 of the corresponding one of the plurality of rotors 116.

In one or more examples, the aerial vehicle 100 includes a duct 152. The duct 152 is coupled to the wing body 106 and is concentric to the plurality of rotor blades 122 of a corresponding one of the plurality of rotors 116.

The aerial vehicle 100 also includes a drive assembly 118. The drive assembly 118 is operatively coupled with each one of the plurality of rotors 116. The drive assembly 118 is configured to rotate the plurality of rotors 116. In one or more examples, the drive assembly 118 is configured to manipulate rotational speed of each one of the plurality of rotors 116 (i.e., the rotational speed of the plurality of rotor blades 122 of each one of the plurality of rotors 116).

In one or more examples, the drive assembly 118 includes at least one motor 144. The motor 144 includes any machine or engine that is configured to produce and impart rotational motion to the plurality of rotors 116. In one or more examples, a single motor 144 is configured to drive rotation of the plurality of rotors 116. In one or more examples, each one of a plurality of motors 144 is configured to drive rotation of at least one the plurality of rotors 116.

In one or more examples, a power source for at least the one motor 144 is located within the wing body 106. In one or more examples, the motor 144 is an internal combustion engine and fuel is stored within the wing body 106. In one or more examples, the motor 144 is an electric motor and an electrical energy storage device (e.g., a battery) is housed within the wing body 106. Other sources of power and other types of motors are also contemplated, such as a solar cells and solar powered motors.

In one or more examples, at least the one motor 144 is operatively coupled with the hub 172 (FIGS. 2-11) of a corresponding one of the plurality of rotors 116. In one or more examples, the drive assembly 118 includes other functional components, such as at least one drive shaft, at least one power transmission component that is configured to transfer power and rotational motion from the motor 144 to the hub 172, and the like.

The aerial vehicle 100 also includes a controller 120. The controller 120 is coupled to and is in communication with the drive assembly 118. The controller 120 is configured to selectively control the drive assembly 118 and, thus, selectively control the rotational speed of each one of the plurality of rotors 116. For example, the controller 120 provides instructions, such as control signals, to the drive assembly 118. Under direction from the controller 120, the drive assembly 118 selectively adjusts the rotational speed of at least one, or each one, of the plurality of rotors 116.

In one or more examples, the aerial vehicle 100 includes a variable pitch mechanism 162. The variable pitch mechanism 162 is operatively coupled with each one of the plurality of rotors 116. The variable pitch mechanism 162 is configured to selectively manipulate blade pitch of each one of the plurality of rotor blades 122 of the plurality of rotors 116.

In one or more examples, the controller 120 is coupled to and is in communication with the variable pitch mechanism 162. The controller 120 is configured to selectively control the variable pitch mechanism 162 and, thus, selectively control the blade pitch of each one of the plurality of rotor blades 122 of the plurality of rotors 116. For example, the controller 120 provides instructions, such as control signals, to the variable pitch mechanism 162. Under direction from the controller 120, the variable pitch mechanism 162 selectively adjusts the blade pitch of at least one, or each one, of the plurality of rotor blades 122 corresponding to each one of the plurality of rotors 116.

In one or more examples, the controller 120 is configured to selectively control thrust produced by each one of the plurality of rotors 116. In one or more examples, the controller 120 selectively adjusts the blade pitch of each one of the plurality of rotor blades 122 of each one of the plurality of rotors 116 to selectively control the thrust produced by each one of the plurality of rotors 116. In one or more examples, the controller 120 selectively adjusts the rotational speed of each one of the plurality of rotors 116 to selectively control the thrust produced by each one of the plurality of rotors 116.

In one or more examples, at least one of selective adjustment of the blade pitch of each one of the plurality of rotor blades 122 of the plurality of rotors 116 and/or selective adjustment of the rotational speed of each one of the plurality of rotors 116 selectively varies the thrust produced by the plurality of rotors 116. Selective variations of the thrust produced by each one of the plurality of rotors 116, as directed by the controller 120, creates a rotational moment that induces a pitch motion of the aerial vehicle 100. The pitch motion of the aerial vehicle 100 transitions the aerial vehicle 100 between the horizontal flight state and the vertical flight state.

As used herein, the terms "vary," "varying," "variations," and similar terms refer to a degree of change or a degree of different in a stated condition. As an example, a variation in a stated condition (e.g., thrust, blade pitch, torque, angle of attack, and the like) may refer to a change in the stated condition of one item. As another example, a variation in a stated condition may refer to a difference between the stated conditions of two or more items.

In the horizontal flight state, the wing body 106 is oriented horizontally. For example, in the horizontal flight state, the second vehicle axis 104 of the aerial vehicle 100 is horizontal. In the horizontal flight state, a collective thrust from the plurality of rotors 116 is directed forward. In the horizontal flight state, the wing body 106 is primarily responsible for generating lift and the plurality of rotors 116 are primarily responsible for generating forward thrust.

In the vertical flight state, the wing body 106 is oriented vertically. For example, in the vertical flight state, the second vehicle axis 104 is approximately vertical. In the vertical flight state, the collective thrust from the plurality of rotors 116 is directed upward. In the vertical flight state, the plurality of rotors 116 are responsible for generating both lift and forward thrust.

As used herein, the terms "horizontal" and "horizontally" also include orientations that are approximately horizontal. As used herein the terms "vertical" and "vertically" include orientations that are approximately vertical. As used herein, the term "collective thrust" refers to a combined thrust produced by the plurality of rotors 116, taken as a whole or aggregate. As used herein, the term "forward" refers to a relative direction of horizontal motion of the aerial vehicle 100.

In one or more examples, the controller 120 is configured to selectively control torque produced by each one of the plurality of rotors 116. Generally, the torque produced by each one of the plurality of rotors 116 acts on the wing body 106. In one or more examples, the controller 120 selectively adjusts the blade pitch of each one of the plurality of rotor blades 122 of each one of the plurality of rotors 116 to selectively control the torque produced by each one of the plurality of rotors 116.

In one or more examples, selective adjustment of the blade pitch of each one of the plurality of rotor blades 122, corresponding to each one of the plurality of rotors 116, and/or the rotational speed of the each one of the plurality of rotors 116 selectively varies at least one of the thrust and the torque produced by each one of the plurality of rotors 116. Selective variations of at least one of the thrust and the torque produced by each one of the plurality of rotors 116, as directed by the controller 120, creates a rotational moment that induces at least one of the pitch motion, a yaw motion, and a rolling motion of the aerial vehicle 100 while the aerial vehicle 100 is in the horizontal flight state or the vertical flight state.

Generally, the aerial vehicle 100 has a pitch axis, a yaw axis that is perpendicular to the pitch axis, and a roll axis that is perpendicular to the pitch axis and the yaw axis. The pitch motion refers to rotation of the aerial vehicle 100 about the pitch axis. The yaw motion refers to rotation of the aerial vehicle 100 about the yaw axis. The rolling motion refers to rotation of the aerial vehicle 100 about the roll axis. In the horizontal flight state, the pitch axis of the aerial vehicle 100 is parallel or coincident with the first vehicle axis 102 and the roll axis is parallel or coincident with the second vehicle axis 104. In the vertical flight state, the yaw axis is parallel or coincident with the second vehicle axis 104 and the pitch axis or the roll axis if parallel or coincident with the first vehicle axis 102.

In one or more examples, the automated flight control system of the aerial vehicle 100 provides automatic inputs (e.g., based on navigational instructions) to the controller 120 for selective control of the drive assembly 118 and the variable pitch mechanism 162. In one or more examples, the pilot (e.g., remote or onboard) provides manual inputs (e.g., via a control stick) to the controller 120 for selective control of the drive assembly 118 and the variable pitch mechanism 162.

Figure 2:
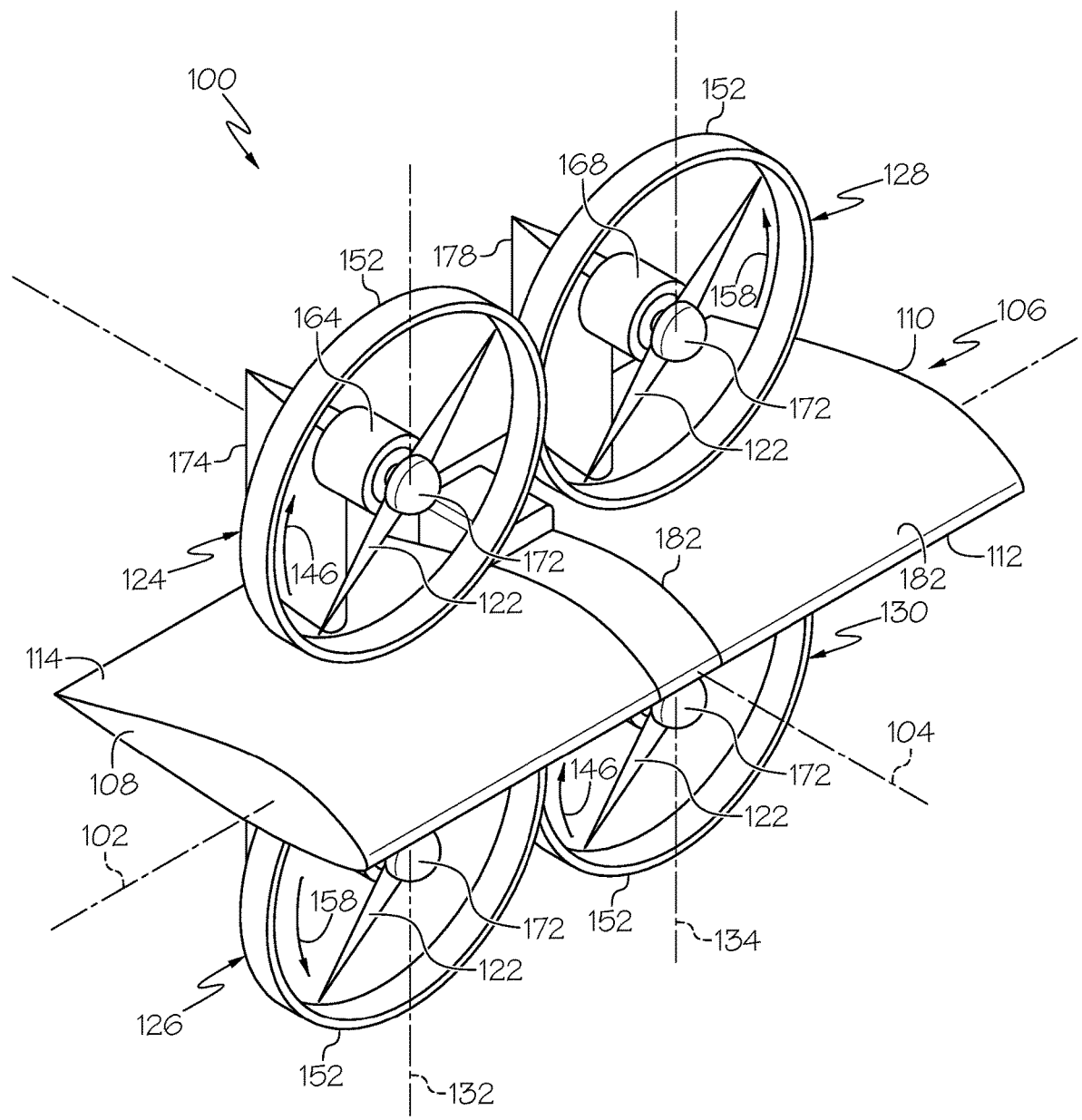
FIG. 2 is a schematic, perspective view of an example of the aerial vehicle, depicted in a horizontal flight state.
Figure 3:
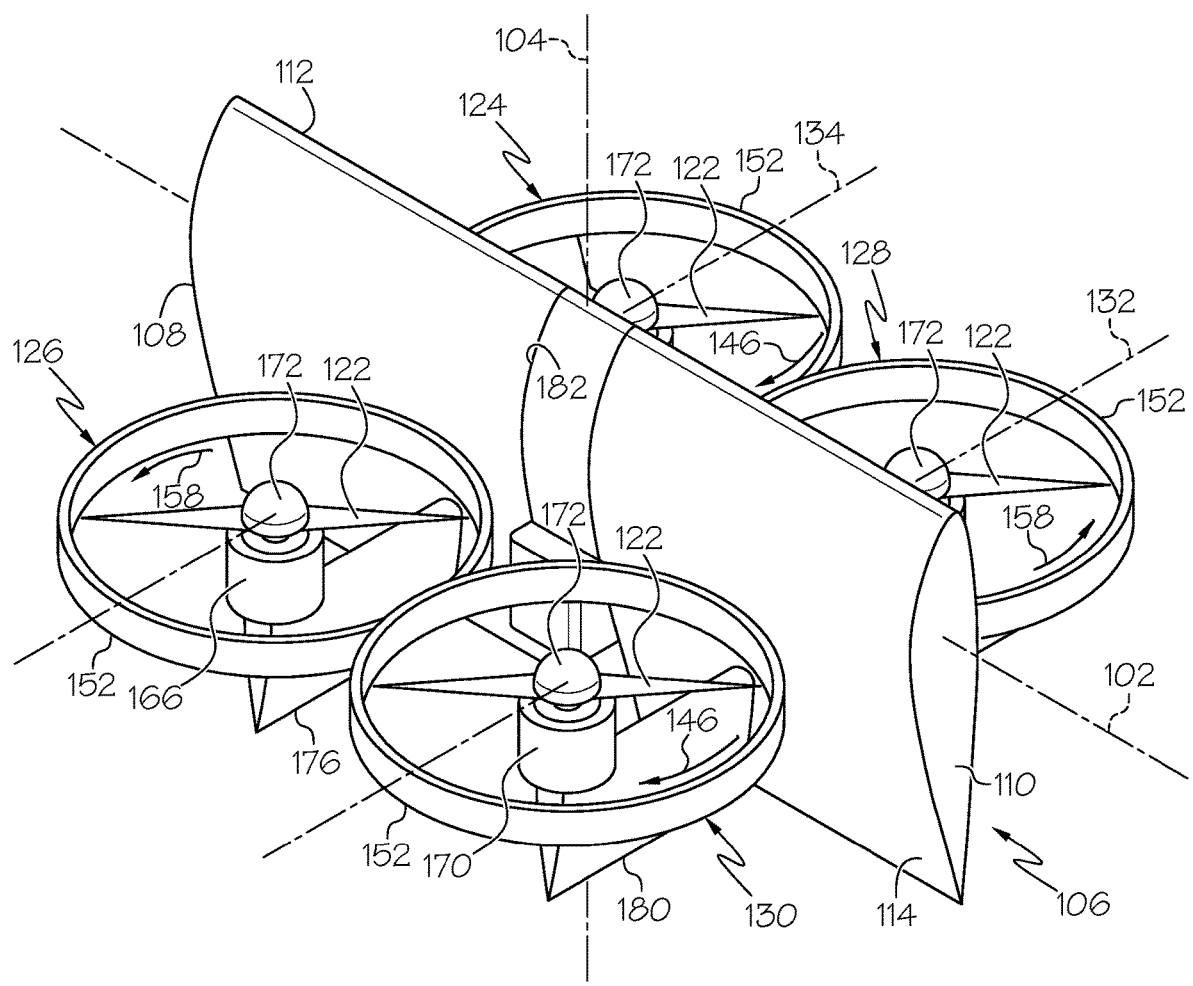
FIG. 3 is a schematic, perspective view of an example of the aerial vehicle of FIG. 2, depicted in a vertical flight state.
Figure 4:
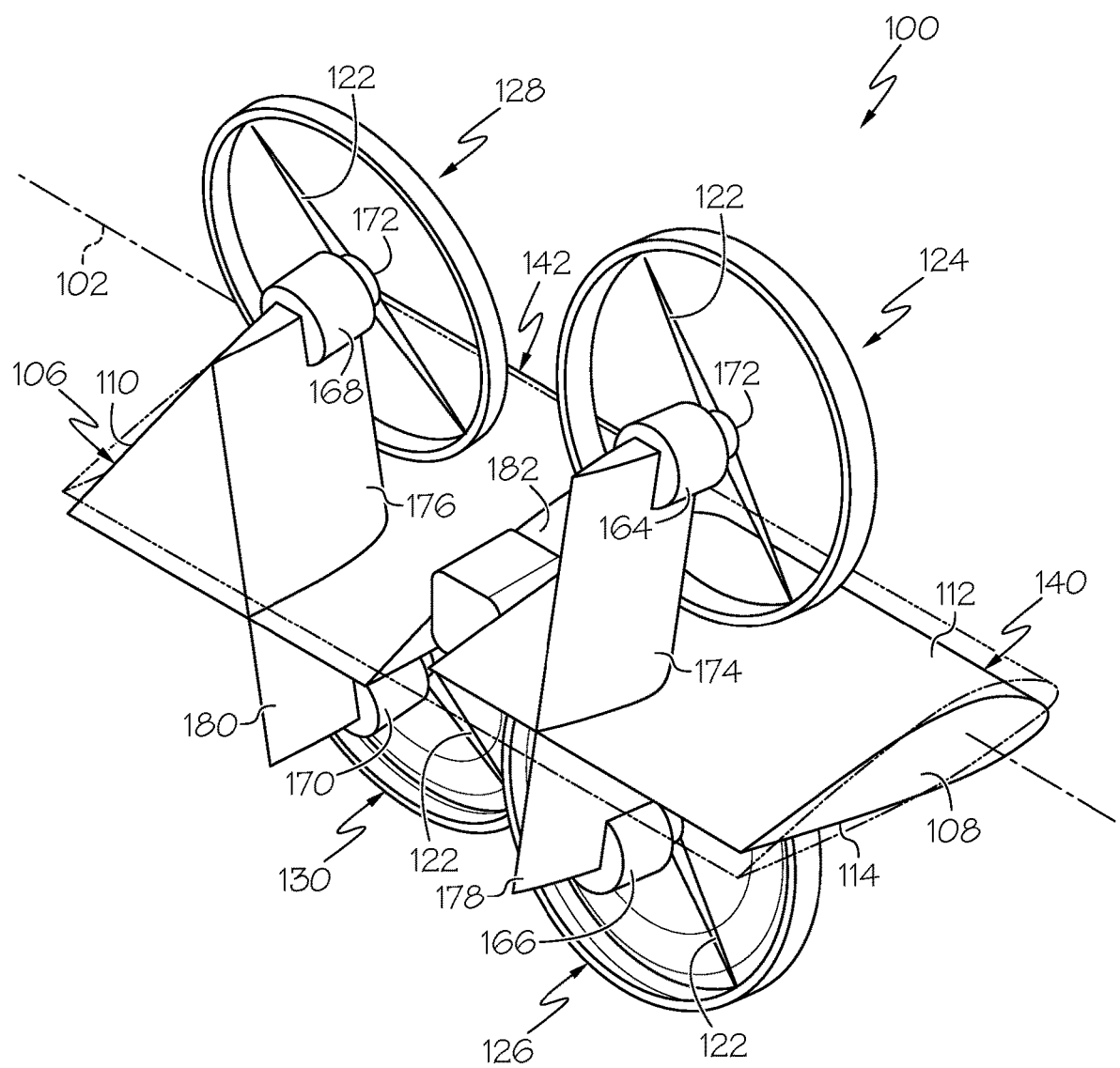
FIG. 4 is a schematic perspective view of an example of the aerial vehicle, depicting a variation in angle of attack between a wing first section and a wing second section of a wing body.

Referring generally to FIG. 1 and particularly to FIGS. 2-4, in one or more examples, the plurality of rotors 116 includes four rotors 116. In one or more examples, as illustrated in FIGS. 2-4, the aerial vehicle 100 includes a first rotor 124, a second rotor 126, a third rotor 128 and a fourth rotor 130.

In one or more examples, the aerial vehicle 100 includes a third vehicle axis 132 (FIGS. 2 and 3) that is perpendicular to the first vehicle axis 102 and the second vehicle axis 104. The first rotor 124 and the second rotor 126 are located along the third vehicle axis 132. The first rotor 124 and the second rotor 126 are located opposite each other along the third vehicle axis 132. A first axis of rotation of the first rotor 124 and a second axis of rotation of the second rotor 126 are parallel to each other and perpendicular to the third vehicle axis 132.

In one or more examples, the aerial vehicle 100 also includes a fourth vehicle axis 134 (FIGS. 2 and 3) that is perpendicular to the first vehicle axis 102 and the second vehicle axis 104. The third rotor 128 and the fourth rotor 130 are located along the fourth vehicle axis 134. The third rotor 128 and the fourth rotor 130 are located opposite each other along the fourth vehicle axis 134. A third axis of rotation of the third rotor 128 and a fourth axis of rotation of the fourth rotor 130 are parallel to each other and perpendicular to the fourth vehicle axis 134.

Generally, the third vehicle axis 132 and the fourth vehicle axis 134 are parallel to each other and are spaced apart from each other along the first vehicle axis 102. As such, the first rotor 124 and the fourth rotor 130 are located diagonal to each other (e.g., are located along a first diagonal line that is oblique to the first vehicle axis 102 and the second vehicle axis 104). Similarly, the second rotor 126 and third rotor 128 are located diagonal to each other (e.g., are located along a second diagonal line that is oblique to the first vehicle axis 102 and the second vehicle axis 104 and that intersect the first diagonal line).

The first rotor 124 and the fourth rotor 130 are configured to rotate in a first rotational direction 146 (the same rotational direction) and form a rotationally correlated first pair 148 (FIG. 1) of the plurality of rotors 116. Similarly, the second rotor 126 and the third rotor 128 are configured to rotate in a second rotational direction 158 (the same rotational direction) that is opposite to the first rotational direction and form a rotationally correlated second pair 150 (FIG. 1) of the plurality of rotors 116.

The first rotor 124 and the second rotor 126 are configured to rotate in opposite rotational directions and form a counter-rotationally correlated first pair of the plurality of rotors 116. The third rotor 128 and the fourth rotor 130 are configured to rotate in opposite rotational directions and form a counter-rotationally correlated second pair of the plurality of rotors 116. The first rotor 124 and the third rotor 128 are configured to rotate in opposite rotational directions and form a counter-rotationally correlated third pair of the plurality of rotors 116. The second rotor 126 and the fourth rotor 130 are configured to rotate in opposite rotational directions and form a counter-rotationally correlated fourth pair of the plurality of rotors 116.

Referring generally to FIG. 1 and particularly to FIGS. 2-4, in one or more examples, the drive assembly 118 includes four motors 144, each one of the motors 144 being operatively coupled with and configured to drive rotation of an associated one of the four rotors 116 (FIG. 1). In one or more examples, as illustrated in FIGS. 2-4, the drive assembly 118 includes a first motor 164, a second motor, 166, a third motor 168, and a fourth motor 170. The first motor 164 is operatively coupled with and is configured to drive rotation of the first rotor 124. The second motor 166 is operatively coupled with and is configured to drive rotation of the second rotor 126. The third motor 168 is operatively coupled with and is configured to drive rotation of the third rotor 128. The fourth motor 170 is operatively coupled with and is configured to drive rotation of the fourth rotor 130.

Referring to FIGS. 2-4, in one or more examples, the aerial vehicle 100 includes a first pylon 174, a second pylon 176, a third pylon 178, and a fourth pylon 180. In one or more examples, each one of the first pylon 174, the second pylon 176, the third pylon 178, and the fourth pylon 180 has an airfoil shape. The first pylon 174 is coupled to and extends perpendicularly from the wing body 106. The second pylon 176 is coupled to and extends perpendicularly from the wing body 106. The third pylon 178 is coupled to and extends perpendicularly from the wing body 106. The fourth pylon 180 is coupled to and extends perpendicularly from the wing body 106.

In one or more examples, the first pylon 174 and the second pylon 176 are opposite one another along the third vehicle axis 132. The third pylon 178 and the fourth pylon 180 are opposite one another along the fourth vehicle axis 134. The first pylon 174 and the third pylon 178 are spaced away from each other along the first vehicle axis 102. The second pylon 176 and the fourth pylon 180 are spaced away from each other along the first vehicle axis 102.

In one or more examples, the first rotor 124 is coupled to an end of the first pylon 174, opposite the wing body 106. The second rotor 126 is coupled to an end of the second pylon 176, opposite the wing body 106. The third rotor 128 is coupled to an end of the third pylon 178, opposite the wing body 106. The fourth rotor 130 is coupled to an end of the fourth pylon 180, opposite the wing body 106.

In one or more examples, the first motor 164 is coupled to the end of the first pylon 174, opposite the wing body 106. The second motor 166 is coupled to the end of the second pylon 176, opposite the wing body 106. The third motor 168 is coupled to the end of the third pylon 178, opposite the wing body 106. The fourth motor 170 is coupled to the end of the fourth pylon 180, opposite the wing body 106.

In one or more examples, the aerial vehicle 100 includes four ducts 152. Each one of the ducts 152 is associated with one of the first rotor 124, the second rotor 126, the third rotor 128, and the fourth rotor 130. Each one of the ducts 152 is concentric to the plurality of rotor blades 122 of a corresponding one of the first rotor 124, the second rotor 126, the third rotor 128, and the fourth rotor 130. In one or more examples, a first one of the ducts 152, associated with the first rotor 124, is coupled to the first pylon 174. A second one of the ducts 152, associated with the second rotor 126, is coupled to the second pylon 176. A third one of the ducts 152, associated with the third rotor 128, is coupled to the third pylon 178. A fourth one of the ducts 152, associated with the fourth rotor 130, is coupled to the fourth pylon 180.

Referring generally to FIG. 1 and particularly to FIGS. 2-6, 8, 9 and 11, in one or more examples, the wing body 106 includes a wing first section 140 and a wing second section 142. The wing second section 142 and the wing first section 140 are coupled to each other along the first vehicle axis 102.

Referring to FIGS. 2-4, in one or more examples, the wing first section 140 and the wing second section 142 form a unitary structure. In one or more examples, the wing first section 140 and the wing second section 142 are directly coupled to each other. In one or more examples, the wing body 106 includes a wing central section 182. The wing first section 140 is coupled to the wing central section 182. The wing second section 142 is coupled to the wing central section 182, opposite the wing first section 140.

In one or more examples, the first pylon 174 is coupled to the wing first section 140. The second pylon 176 is coupled to the wing first section 140, opposite the first pylon 174. The third pylon 178 is coupled to the wing second section 142. The fourth pylon 180 is coupled to the wing second section, 142, opposite the third pylon 178.

Referring to FIGS. 2 and 3, in one or more examples, the wing first section 140 and the wing second section 142 are rigidly coupled together. In other words, the wing first section 140 and the wing second section 142 are non-rotatable about the first vehicle axis 102 relative to each other. The rigid, non-rotatable connection between the wing first section 140 and the wing second section 142 facilitates that an angle of attack of the wing first section 140 and an angle of attack of the wing second section 142 remain the same relative to each other.

Referring to FIG. 4, in one or more examples, the wing first section 140 and the wing second section 142 are rotatable about the first vehicle axis 102 relative to each other. The rotatable connection between the wing first section 140 and the wing second section 142 facilitates a variation in the angle of attacks of the wing first section 140 and the angle of attack of the wing second section 142 relative to each other.

In one or more examples, the wing first section 140 and the wing second section 142 rotate about the first vehicle axis 102 relative to each other in response to a variation in the thrust produced by the plurality of rotor 116 corresponding to the rotationally correlated first pair 148 (first rotor 124 and fourth rotor 130) and the thrust produced by the plurality of rotors 116 corresponding to the rotationally correlated second pair 150 (second rotor 126 and third rotor 128). For example, a relative increase or decrease in the thrust produced by the rotationally correlated first pair 148 and/or the thrust produced by the rotationally correlated second pair 150 creates a thrust imbalance between the first rotor 124 and the second rotor 126 and/or a thrust imbalance between the third rotor 128 and the fourth rotor 130.

As an example, the thrust imbalance between the first rotor 124 and the second rotor 126 creates a rotational moment about the first vehicle axis 102 that causes the wing first section 140 to rotate about the first vehicle axis 102 relative to the wing second section 142 and, thus, changes the angle of attack of the wing first section 140 relative to the angle of attack of the wing second section 142. As another example, the thrust imbalance between the third rotor 128 and the fourth rotor 130 creates a rotational moment about the first vehicle axis 102 that causes the wing second section 142 to rotate about the first vehicle axis 102 relative to the wing first section 140 and, thus, changes the angle of attack of the wing second section 142 relative to the angle of attack of the wing first section 140. Accordingly, selectively controlling and selectively varying the thrust produced by the rotationally correlated first pair 148 and the rotationally correlated second pair 150 facilitates selective rotation of the wing first section 140 and the wing second section 142 about the first vehicle axis 102 relative to each other.

Selectively rotating the wing first section 140 and the wing second section 142 about the first vehicle axis 102 relative to each other varies the angle of attack between the wing first section 140 and the wing second section 142. A variation between the angle of attack of the wing first section 140 and the angle of attack of the wing second section 142 creates a lift imbalance across the wing body 106 between the wing first section 140 and the wing second section 142. The lift imbalance generates a rotational moment about the roll axis of the aerial vehicle 100 that induces the rolling motion of the aerial vehicle 100.

As an example, a relative increase in the angle of attack of the wing first section 140 relative to the angle of attack of the wing second section 142 results in a relative increase in the lift acting on the wing first section 140 relative to the lift acting on the wing second section 142, which generates a rotational moment about the roll axis of the aerial vehicle 100 that induces the rolling motion of the aerial vehicle 100 in a first roll direction (e.g., counter clockwise). As another example, a relative increase in the angle of attack of the wing second section 142 relative to the angle of attack of the wing first section 140 results in a relative increase in the lift acting on the wing second section 142 relative to the lift acting on the wing first section 140, which generates a rotational moment about the roll axis of the aerial vehicle 100 that induces the rolling motion of the aerial vehicle 100 in a second roll direction that is opposite to the first roll direction (e.g., clockwise).

Figure 14:
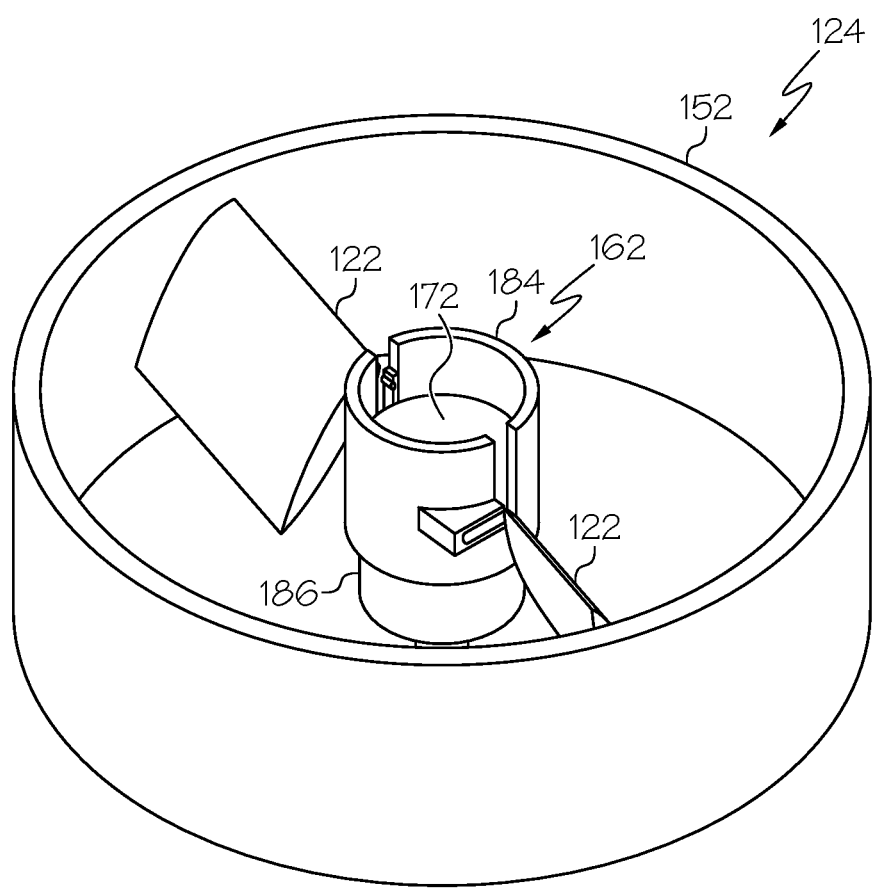
FIG. 14 is a schematic illustration of an example of a variable pitch mechanism of the aerial vehicle.

Referring generally to FIGS. 1-4 and particularly to FIG. 14, in one or more examples, the variable pitch mechanism 162 is configured to collectively manipulate the blade pitch of the plurality of rotor blades 122. For example, under direction from the controller 120, the variable pitch mechanism 162 is configured to selectively vary the blade pitch of the plurality of rotor blades 122 corresponding to the rotationally correlated first pair 148 (first rotor 124 and fourth rotor 130) and the blade pitch of the plurality of rotor blades 122 corresponding to the rotationally correlated second pair 150 (second rotor 126 and third rotor 128).

Collectively varying the blade pitch of the plurality of rotor blades 122 corresponding to the rotationally correlated first pair 148 and/or the blade pitch of the plurality of rotor blades 122 corresponding to the rotationally correlated second pair 150 creates a torque imbalance between the rotationally correlated first pair 148 and the rotationally correlated second pair 150. The torque imbalance, in turn, generates a rotational moment about the roll axis of the aerial vehicle 100 that induces the rolling motion of the aerial vehicle 100.

For example, a relative collective increase or decrease in the blade pitch of the rotor blades 122 corresponding to the rotationally correlated first pair 148 results in a corresponding relative increase or decrease in the torque produced by the rotationally correlated first pair 148 and acting on the wing body 106. A relative increase or decrease in the blade pitch of the rotor blades 122 corresponding to the rotationally correlated second pair 150 results in a corresponding relative increase or decrease in the torque produced by the rotationally correlated second pair 150 and acting on the wing body 106. A relative increase or decrease in the torque produced by the rotationally correlated first pair 148 and/or the torque produced by the rotationally correlated second pair 150 creates the torque imbalance between the rotationally correlated first pair 148 and the rotationally correlated second pair 150.

As an example, a relative increase in the torque (e.g., additional torque) produced by the rotationally correlated first pair 148, resulting from a collective change in the blade pitch of the plurality of rotor blades 122 of the rotationally correlated first pair 148, relative to the torque produced by the rotationally correlated second pair 150 generates a rotational moment about the roll axis of the aerial vehicle 100 that induces the rolling motion of the aerial vehicle 100 in a first roll direction (e.g., clockwise). As another example, a relative increase in the torque (e.g., additional torque) produced by the rotationally correlated second pair 150, resulting from a collective change in the blade pitch of the plurality of rotor blades 122 of the rotationally correlated second pair 150, relative to the torque produced by the rotationally correlated first pair 148 generates a rotational moment about the roll axis of the aerial vehicle 100 that induces the rolling motion of the aerial vehicle 100 in a second roll direction that is opposite to the first roll direction (e.g., counter clockwise).

FIG. 14 illustrates an example of the first rotor 124, which is also representative of any one of the second rotor 126, the third rotor 128, and the fourth rotor 130 (FIGS. 2-4). In one or more examples, each one of the first rotor 124, the second rotor 126, the third rotor 128, and the fourth rotor 130 is a variable, or controllable, pitch rotor in which each one of the plurality of rotor blades 122 is rotatable along its longitudinal axis relative to the hub 172. In these examples, each one of the first rotor 124, the second rotor 126, the third rotor 128, and the fourth rotor 130 has a dedicated variable pitch mechanism 162.

In one or more examples, the variable pitch mechanism 162 includes a yoke 184 and an actuator 186. The yoke 184 is configured to engage and collectively rotate every one of the plurality of rotor blades 122 of the first rotor 124 (or the corresponding one of second rotor 126, the third rotor 128, and the fourth rotor 130). The actuator 186 that is operably coupled to the yoke 184. The actuator 186 is configured to translate the yoke 184 along the axis of rotation of the first rotor 124 (or the corresponding one of second rotor 126, the third rotor 128, and the fourth rotor 130). Movement of the yoke 184 in a first linear direction rotates every one of the plurality of rotor blades 122 of the first rotor 124 (or the corresponding one of second rotor 126, the third rotor 128, and the fourth rotor 130) in a first rotational direction that increases the blade pitch. Movement of the yoke 184 in a second linear direction, opposite the first linear direction, rotates every one of the plurality of rotor blades 122 of the first rotor 124 (or the corresponding one of second rotor 126, the third rotor 128, and the fourth rotor 130) in a second rotational direction, opposite the first rotational direction, that decreases the blade pitch. Collective, rotation of every one of the plurality of rotor blades 122 about their respective longitudinal axis collectively adjusts the blade pitch of every one of the plurality of rotor blades 122. Other types and/or configurations of the variable pitch mechanism 162 are also contemplated.

Referring generally to FIG. 1 and particularly to FIGS. 2-4, in another example, the drive assembly 118, such as the first motor 164, the second motor 166, the third motor 168, and the fourth motor 170, is configured to manipulate the rotational speed of a corresponding one of the first rotor 124, the second rotor 126, the third rotor 128 and the fourth rotor 130 (i.e., the rotational speed of the plurality of rotor blades 122 of each one of the first rotor 124, the second rotor 126, the third rotor 128 and the fourth rotor 130). For example, under direction from the controller 120, the drive assembly 118 is configured to selectively vary the rotational speed of the plurality of rotors 116 corresponding to the rotationally correlated first pair 148 (first rotor 124 and third rotor 128) and the rotational speed of the plurality of rotors 116 corresponding to the rotationally correlated second pair 150 (second rotor 126 and fourth rotor 130).

In one or more examples, selectively varying the rotational speed of the plurality of rotor blades 122 corresponding to the rotationally correlated first pair 148 (formed by the first rotor 124 and the fourth rotor 130) and/or the rotational speed of the plurality of rotor blades 122 corresponding to the rotationally correlated second pair 150 (formed by the second rotor 126 and the fourth rotor 130) creates the torque imbalance between the rotationally correlated first pair 148 and the rotationally correlated second pair 150. The torque imbalance, in turn, generates the rotational moment about the roll axis of the aerial vehicle 100 that induces the rolling motion of the aerial vehicle 100. Additionally, varying the rotational speed of the rotor blades 122 also changes torque, which generates moment to induce the rolling motion.

For example, a relative increase or decrease in the rotational speed of the rotor blades 122 corresponding to the rotationally correlated first pair 148 results in a corresponding relative increase or decrease in the torque produced by the rotationally correlated first pair 148 and acting on the wing body 106. A relative increase or decrease in the rotational speed of the rotor blades 122 corresponding to the rotationally correlated second pair 150 results in a corresponding relative increase or decrease in the torque produced by the rotationally correlated second pair 150 and acting on the wing body 106. A relative increase or decrease in the torque produced by the rotationally correlated first pair 148 and/or the thrust produced by the rotationally correlated second pair 150 creates the torque imbalance between the rotationally correlated first pair 148 and/or the thrust produced by the rotationally correlated second pair 150.

As an example, a relative increase or decrease in the torque produced by one of the rotationally correlated first pair 148 or the rotationally correlated second pair 150 relative to an opposing one of the rotationally correlated second pair 150 or the rotationally correlated first pair 148 generates a rotational moment about the roll axis of the aerial vehicle 100 that induces the rolling motion of the aerial vehicle 100 in one of the first roll direction (e.g., clockwise) or the second roll direction (e.g., counter clockwise).

In one or more examples, selectively varying the rotational speed of the plurality of rotor blades 122 corresponding to the counter-rotationally correlated first pair (formed by the first rotor 124 and the second rotor 126) and/or the rotational speed of the plurality of rotor blades 122 corresponding to the counter-rotationally correlated second pair (formed by the third rotor 128 and the fourth rotor 130) creates the thrust imbalance between the counter-rotationally correlated first pair and the counter-rotationally correlated second pair. The thrust imbalance, in turn, generates the rotational moment about the yaw axis of the aerial vehicle 100 that induces the yaw motion of the aerial vehicle 100.

For example, a relative increase or decrease in the rotational speed of the rotor blades 122 corresponding to the counter-rotationally correlated first pair results in a corresponding relative increase or decrease in the thrust produced by the counter-rotationally correlated first pair. A relative increase or decrease in the rotational speed of the rotor blades 122 corresponding to the counter-rotationally correlated second pair results in a corresponding relative increase or decrease in the thrust produced by the counter-rotationally correlated second pair. A relative increase or decrease in the thrust produced by the counter-rotationally correlated first pair and/or the thrust produced by the counter-rotationally correlated second pair creates the thrust imbalance between the counter-rotationally correlated first pair and/or the thrust produced by the counter-rotationally correlated second pair.

As an example, a relative increase in the thrust (e.g., additional thrust) produced by the counter-rotationally correlated first pair relative to the thrust produced by the counter-rotationally correlated second pair generates a rotational moment about the yaw axis of the aerial vehicle 100 that induces the yaw motion of the aerial vehicle 100 in a first yaw direction (e.g., leftward). As an example, a relative increase in the thrust (e.g., additional thrust) produced by the counter-rotationally correlated second pair relative to the thrust produced by the counter-rotationally correlated first pair generates a rotational moment about the yaw axis of the aerial vehicle 100 that induces the yaw motion of the aerial vehicle 100 in a second yaw direction that is opposite to the first yaw direction (e.g., rightward).

In one or more examples, selectively varying the rotational speed of the plurality of rotor blades 122 corresponding to the counter-rotationally correlated third pair (formed by the first rotor 124 and the third rotor 128) and/or the rotational speed of the plurality of rotor blades 122 corresponding to the counter-rotationally correlated fourth pair (formed by the second rotor 126 and the fourth rotor 130) creates the thrust imbalance between the counter-rotationally correlated third pair and the counter-rotationally correlated fourth pair. The thrust imbalance, in turn, generates the rotational moment about the pitch axis of the aerial vehicle 100 that induces the pitch motion of the aerial vehicle 100.

For example, a relative increase or decrease in the rotational speed of the rotor blades 122 corresponding to the counter-rotationally correlated third pair results in a corresponding relative increase or decrease in the thrust produced by the counter-rotationally correlated third pair. A relative increase or decrease in the rotational speed of the rotor blades 122 corresponding to the counter-rotationally correlated fourth pair results in a corresponding relative increase or decrease in the thrust produced by the counter-rotationally correlated fourth pair. A relative increase or decrease in the thrust produced by the counter-rotationally correlated third pair and/or the thrust produced by the counter-rotationally correlated fourth pair creates the thrust imbalance between the counter-rotationally correlated third pair and/or the thrust produced by the counter-rotationally correlated fourth pair.

As an example, a relative increase in the thrust (e.g., additional thrust) produced by the counter-rotationally correlated third pair relative to the thrust produced by the counter-rotationally correlated fourth pair generates a rotational moment about the pitch axis of the aerial vehicle 100 that induces the pitch motion of the aerial vehicle 100 in a first pitch direction (e.g., downward). As an example, a relative increase in the thrust (e.g., additional thrust) produced by the counter-rotationally correlated fourth pair relative to the thrust produced by the counter-rotationally correlated third pair generates a rotational moment about the pitch axis of the aerial vehicle 100 that induces the pitch motion of the aerial vehicle 100 in a second pitch direction that is opposite to the first pitch direction (e.g., upward).

The first rotor 124 and the third rotor 128 are configured to rotate in opposite rotational directions and form a counter-rotationally correlated third pair of the plurality of rotors 116. The second rotor 126 and the fourth rotor 130 are configured to rotate in opposite rotational directions and form a counter-rotationally correlated fourth pair of the plurality of rotors 116.

Referring generally to 1 and particularly to FIGS. 5-11, in one or more examples, the plurality of rotors 116 includes two rotors 116. In one or more examples, as illustrated in FIGS. 5-11, the aerial vehicle 100 includes a first coaxial rotor 136 and a second coaxial rotor 138. The first coaxial rotor 136 is configured to rotate in a first rotational direction 146. The second coaxial rotor 138 is configured to rotate in a second rotational direction 158 that is opposite to the first rotational direction 146. The first coaxial rotor 136 and the second coaxial rotor 138 share a common axis of rotation and may also be referred to as a pair of coaxial contra-rotating rotors.

Figure 15:
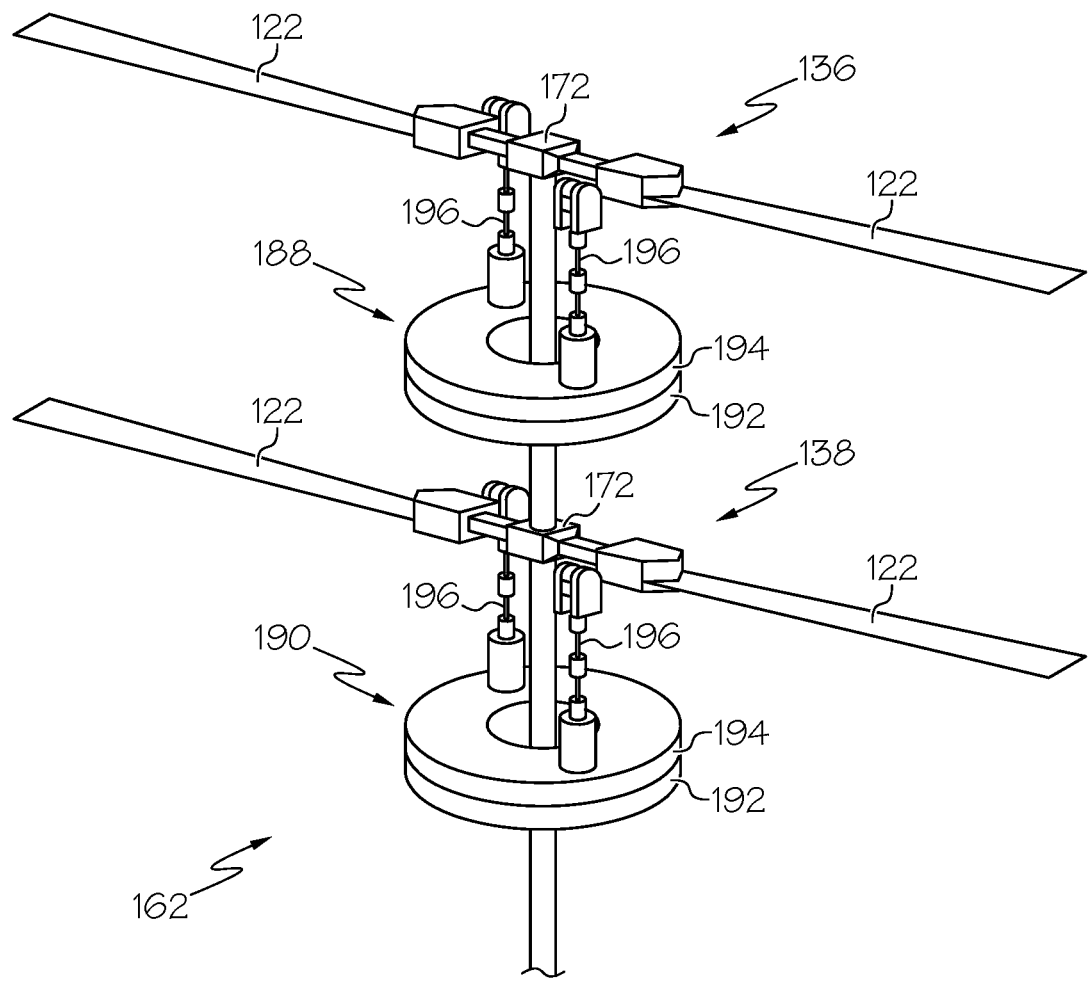
FIG. 15 is a schematic illustration of an example of the variable pitch mechanism of the aerial vehicle.

Referring generally to FIGS. 1 and 5-11 and particularly to FIG. 15, in one or more examples, the variable pitch mechanism 162 is configured to collectively manipulate the blade pitch of the plurality of rotor blades 122. For example, under direction from the controller 120, the variable pitch mechanism 162 is configured to collectively vary the blade pitch of the plurality of rotor blades 122 of the first coaxial rotor 136 and the blade pitch of the plurality of rotor blades 122 of the second coaxial rotor 138.

Collectively varying the blade pitch of the plurality of rotor blades 122 of the first coaxial rotor 136 and/or the blade pitch of the plurality of rotor blades 122 of the second coaxial rotor 138 creates a torque imbalance between the first coaxial rotor 136 and the second coaxial rotor 138. The torque imbalance, in turn, generates a rotational moment about the roll axis of the aerial vehicle 100 that induces the rolling motion of the aerial vehicle 100.

For example, a relative collective increase or decrease in the blade pitch of the rotor blades 122 of the first coaxial rotor 136 results in a corresponding relative increase or decrease in the torque produced by the first coaxial rotor 136 and acting on the wing body 106. A relative increase or decrease in the blade pitch of the rotor blades 122 corresponding to the second coaxial rotor 138 results in a corresponding relative increase or decrease in the torque produced by the second coaxial rotor 138 and acting on the wing body 106. A relative increase or decrease in the torque produced by the first coaxial rotor 136 and/or the torque produced by the second coaxial rotor 138 creates the torque imbalance between the first coaxial rotor 136 and the second coaxial rotor 138.

As an example, a relative increase in the torque (e.g., additional torque) produced by the first coaxial rotor 136, resulting from a collective change in the blade pitch of the plurality or rotor blades 122 of the first coaxial rotor 136, relative to the torque produced by the second coaxial rotor 138 generates a rotational moment about the roll axis of the aerial vehicle 100 that induces the rolling motion of the aerial vehicle 100 in a first roll direction (e.g., clockwise). As another example, a relative increase in the torque (e.g., additional torque) produced by the second coaxial rotor 138, resulting from a collective change in the blade pitch of the plurality of rotor blades 122 of the second coaxial rotor 138, relative to the torque produced by the first coaxial rotor 136 generates a rotational moment about the roll axis of the aerial vehicle 100 that induces the rolling motion of the aerial vehicle 100 in a second roll direction that is opposite to the first roll direction (e.g., counter clockwise).

In one or more examples, the variable pitch mechanism 162 is configured to independently, or cyclically, manipulate the blade pitch of each one of the plurality of rotor blades 122. For example, under direction from the controller 120, the variable pitch mechanism 162 is configured to at least one of cyclically vary the blade pitch of each one of the plurality of rotor blades 122 of the first coaxial rotor 136 through different sectors of a rotation cycle of the first coaxial rotor 136 and cyclically vary the blade pitch of each one of the plurality of rotor blades 122 of the second coaxial rotor 138 through different sectors of a rotation cycle of the second coaxial rotor 138.

At least one of cyclically varying the blade pitch of each one of the plurality of rotor blades 122 of the first coaxial rotor 136 at different sectors of the rotation cycle of the first coaxial rotor 136 and cyclically varying the blade pitch of the plurality of rotor blades 122 of the second coaxial rotor 138 at different sectors of the rotation cycle of the second coaxial rotor 138 creates a thrust imbalance between the different sectors of at least one of the respective rotation cycles of the first coaxial rotor 136 and the second coaxial rotor 138. The thrust imbalance between different sectors of the respective rotation cycles of the first coaxial rotor 136 and the second coaxial rotor 138, in turn, generates at least one of a rotational moment about the pitch axis of the aerial vehicle 100 that induces the pitch motion of the aerial vehicle 100 and a rotational moment about the yaw axis of the aerial vehicle 100 that induces the yaw motion of the aerial vehicle 100.

For example, a relative cyclical increase or decrease in the blade pitch of the rotor blades 122 of the first coaxial rotor 136 through different sectors of the rotation cycle of the first coaxial rotor 136 results in a corresponding relative increase or decrease in the thrust produced by the first coaxial rotor 136 at the different sectors of the rotation cycle. A relative cyclical increase or decrease in the blade pitch of the rotor blades 122 of the second coaxial rotor 138 through different sectors of the rotation cycle of the second coaxial rotor 138 results in a corresponding relative increase or decrease in the thrust produced by the second coaxial rotor 138 at the different sectors of the rotation cycle. A relative increase or decrease in the thrust produced by at least one of the first coaxial rotor 136 and the second coaxial rotor 138 through different sectors of their respective rotation cycles creates the thrust imbalance between the different sectors of the respective rotation cycle of at least one of the first coaxial rotor 136 and the second coaxial rotor 138.

As an example, a relative increase in the thrust (e.g., additional thrust) produced by at least one of the first coaxial rotor 136 and the second coaxial rotor 138 through a first sector (e.g., right sector) of the respective rotation cycle, resulting from a cyclical change in the blade pitch of the plurality of rotor blades 122 of at least one of the first coaxial rotor 136 and the second coaxial rotor 138, relative to the thrust produced by at least one of the first coaxial rotor 136 and the second coaxial rotor 138 through a second sector that is opposite the first sector (e.g., left sector) of the respective rotation cycle generates a rotational moment about the yaw axis of the aerial vehicle 100 that induces the yaw motion of the aerial vehicle in a first yaw direction (e.g., leftward). As another example, a relative increase in the thrust (e.g., additional thrust) produced by at least one of the first coaxial rotor 136 and the second coaxial rotor 138 through the second sector (e.g., left sector) of the respective rotation cycle, resulting from a cyclical change in the blade pitch of the plurality of rotor blades 122 of at least one of the first coaxial rotor 136 and the second coaxial rotor 138, relative to the thrust produced by at least one of the first coaxial rotor 136 and the second coaxial rotor 138 through the first sector (e.g., right sector) of the respective rotation cycle generates a rotational moment about the yaw axis of the aerial vehicle 100 that induces the yaw motion of the aerial vehicle in a second yaw direction that is opposite the first yaw direction (e.g., rightward).

As an example, a relative increase in the thrust (e.g., additional thrust) produced by at least one of the first coaxial rotor 136 and the second coaxial rotor 138 through a third sector (e.g., upper sector in the horizontal flight state or rear sector in the vertical flight state) of the respective rotation cycle, resulting from a cyclical change in the blade pitch of the plurality of rotor blades 122 of at least one of the first coaxial rotor 136 and the second coaxial rotor 138, relative to the thrust produced by at least one of the first coaxial rotor 136 and the second coaxial rotor 138 through a fourth sector that is opposite the third sector (e.g., lower sector in the horizontal flight state or forward sector in the vertical flight state) of the respective rotation cycle generates a rotational moment about the pitch axis of the aerial vehicle 100 that induces the pitch motion of the aerial vehicle in a first pitch direction (e.g., downward). As another example, a relative increase in the thrust (e.g., additional thrust) produced by at least one of the first coaxial rotor 136 and the second coaxial rotor 138 through the fourth sector (e.g., lower sector in the horizontal flight state or forward sector in the vertical flight state) of the respective rotation cycle, resulting from a cyclical change in the blade pitch of the plurality of rotor blades 122 of at least one of the first coaxial rotor 136 and the second coaxial rotor 138, relative to the thrust produced by at least one of the first coaxial rotor 136 and the second coaxial rotor 138 through the third sector (e.g., upper sector in the horizontal flight state or rear sector in the vertical flight state) of the respective rotation cycle generates a rotational moment about the pitch axis of the aerial vehicle 100 that induces the pitch motion of the aerial vehicle in a second pitch direction that is opposite the first pitch direction (e.g., upward).

FIG. 15 schematically illustrates an example of a coaxial rotor system that includes the first coaxial rotor 136, the second coaxial rotor 138 and the variable pitch mechanism 162. In one or more examples, each one of the first coaxial rotor 136 and the second coaxial rotor 138 is a variable, or controllable, pitch rotor in which each one of the plurality of rotor blades 122 is rotatable along its longitudinal axis relative to the hub 172. In one or more examples, the first coaxial rotor 136 and the second coaxial rotor 138 share a common variable pitch mechanism 162.

In one or more examples, the variable pitch mechanism 162 includes a first swashplate assembly 188 and a second swashplate assembly 190. The first swashplate assembly 188 is operatively coupled with the first coaxial rotor 136 and is configured to selectively control the blade pitch of each one of the plurality of rotor blades 122 of the first coaxial rotor 136. The second swashplate assembly 190 is operatively coupled with the second coaxial rotor 138 and is configured to selectively control the blade pitch of each one of the plurality of rotor blades 122 of the second coaxial rotor 138.

In one or more examples, each one of the first swashplate assembly 188 and the second swashplate assembly 190 includes a stationary, or non-rotating, swashplate 192 and a rotating swashplate 194. The stationary swashplate 192 is coupled to the main rotor mast, or the main drive shaft. The stationary swashplate 192 is configured to tilt in all directions and move linearly along the axis of rotation shared by the first coaxial rotor 136 and the second coaxial rotor 138. The rotating swashplate 194 is mounted to the stationary swashplate 192 by means of a bearing and is configured to rotate with the main rotor mast, or main drive shaft. Both the stationary swashplate 192 and the rotating swashplate 194 tilt as one unit. The rotating swashplate 194 is coupled to pitch horns by a plurality of pitch links 196. Each one of the first swashplate assembly 188 and the second swashplate assembly 190 also includes a plurality of actuators and/or pushrods coupled to the stationary swashplate 192 and configured to selectively translate and selectively tilt the stationary swashplate 192 and the rotating swashplate 194. Selective tilting motion of the stationary swashplate 192 and the rotating swashplate 194 independently rotates each one of the plurality of rotor blades 122, corresponding to at least one of the first coaxial rotor 136 and the second coaxial rotor 138, about its longitudinal axis to independently vary the blade pitch of each one of the plurality of rotor blades 122. Selective linear motion of the stationary swashplate 192 and the rotating swashplate 194 collectively rotates every one of the plurality of rotor blades 122, corresponding to at least one of the first coaxial rotor 136 and the second coaxial rotor 138, about their respective longitudinal axis to collectively vary the blade pitch of every one of the plurality of rotor blades 122.

It should be appreciated that the example of the coaxial rotor system schematically illustrated in FIG. 15 is only one example of such a system and is not intended to be limiting. It should also be appreciated that some components and mechanical detail of the coaxial rotor system are not shown in FIG. 15 for the purpose of clarity of illustration. In other examples, different coaxial rotor systems, as known in the art, having additional components and/or alternative configurations may be used. As an example, the coaxial rotor system may include additional or alternative operational component common to such systems, such as upper, middle and lower submodules, actuators, rocker arms, drag arms, hubs, connecting rods, pitch-changing assemblies and the like. As another example, each one of the first swashplate assembly 188 and the second swashplate assembly 190 may also include other operational components common to multiple swashplate assemblies used to control the blade pitch of rotor blades of two rotors mounted on the same shaft. Other types and/or configurations of the variable pitch mechanism 162 are also contemplated.

Figure 5:
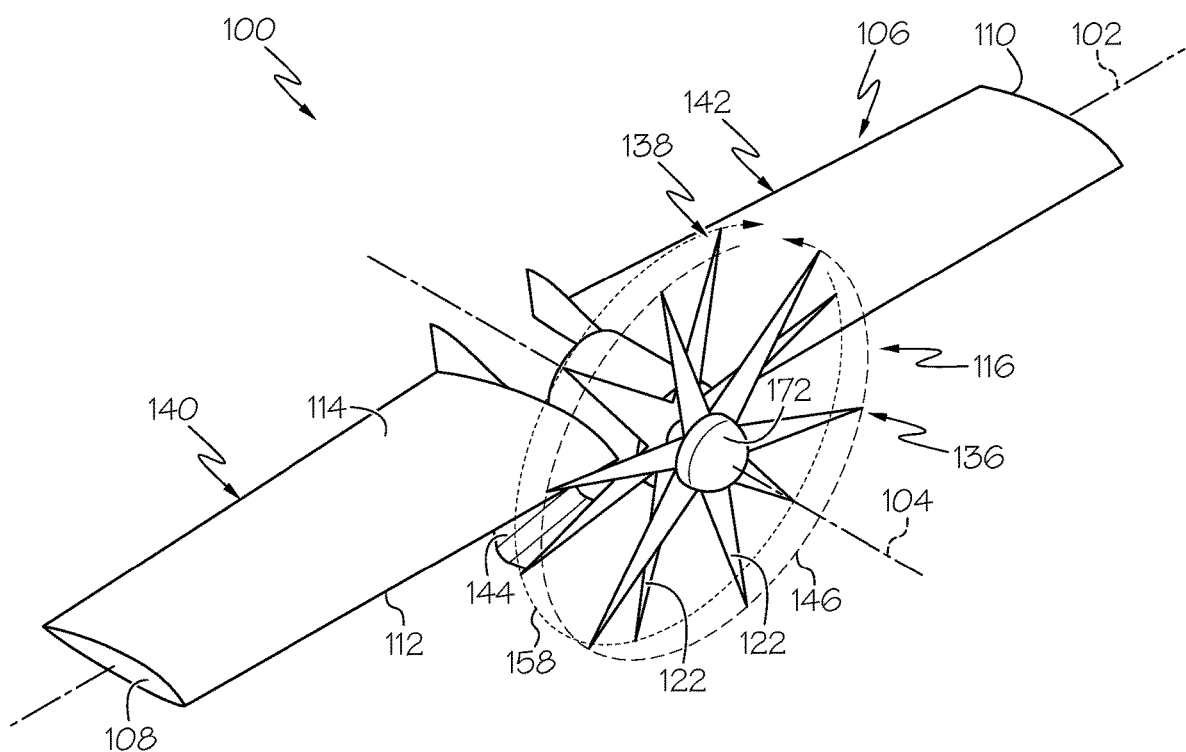
FIG. 5 is a schematic, perspective view of an example of the aerial vehicle, depicted in the horizontal flight state.
Figure 6:
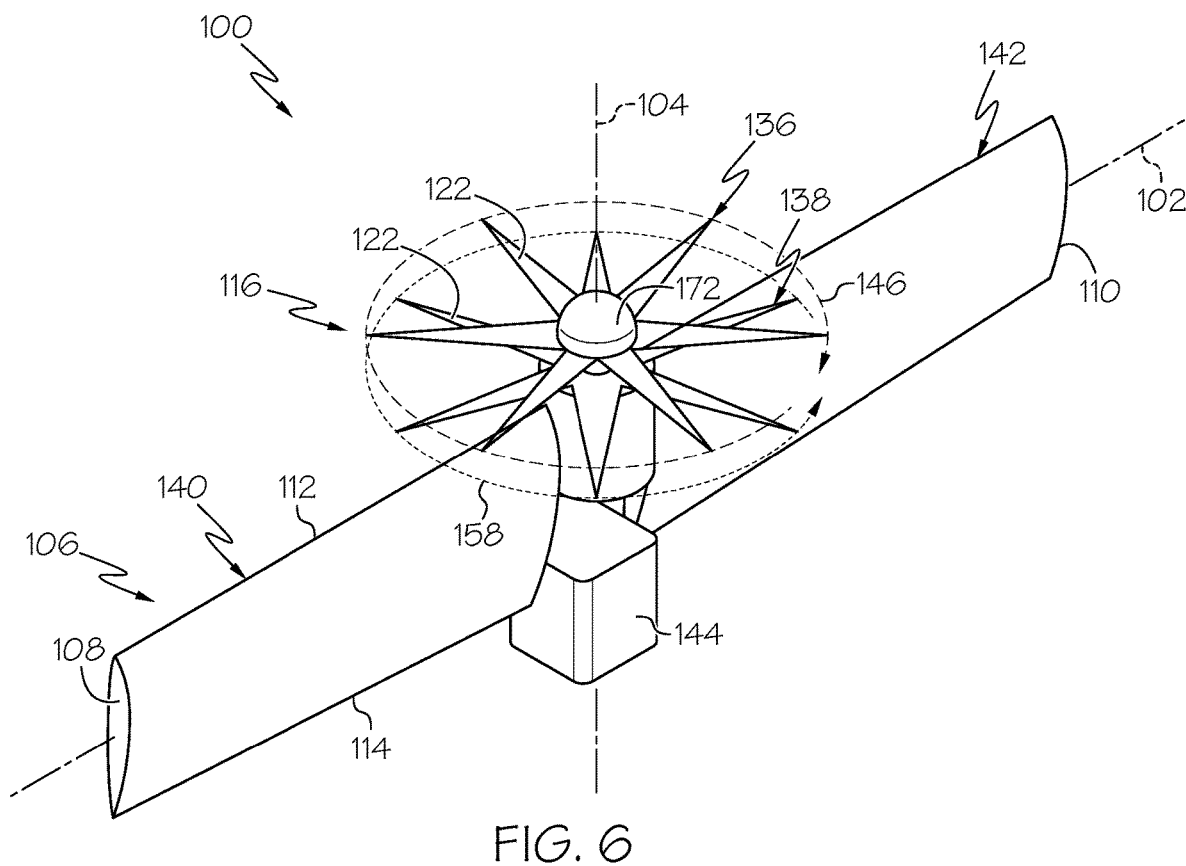
FIG. 6 is a schematic, perspective view of an example of the aerial vehicle of FIG. 5, depicted in a vertical flight state.
Figure 7:
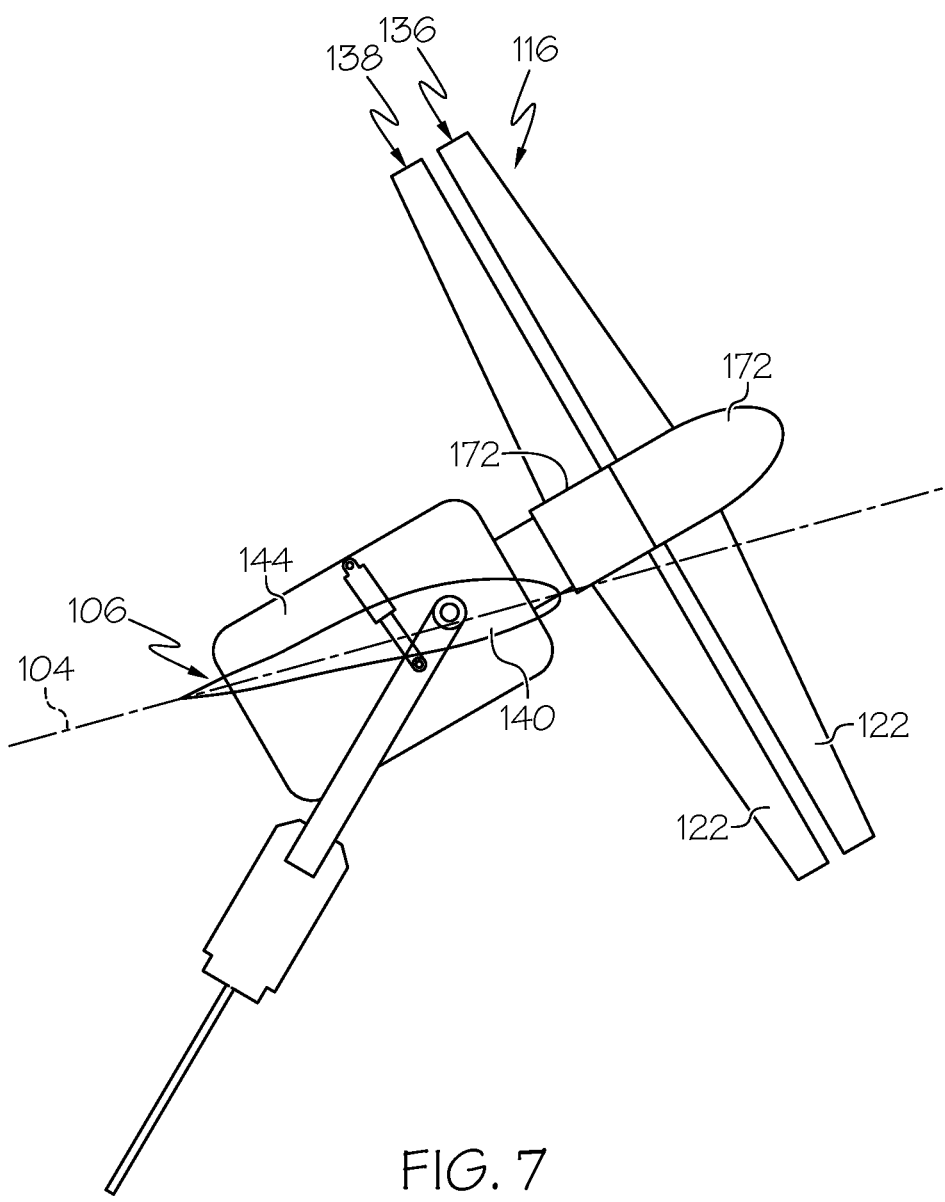
FIG. 7 is schematic elevation view of an example of the aerial vehicle of FIG. 5.
Figure 8:
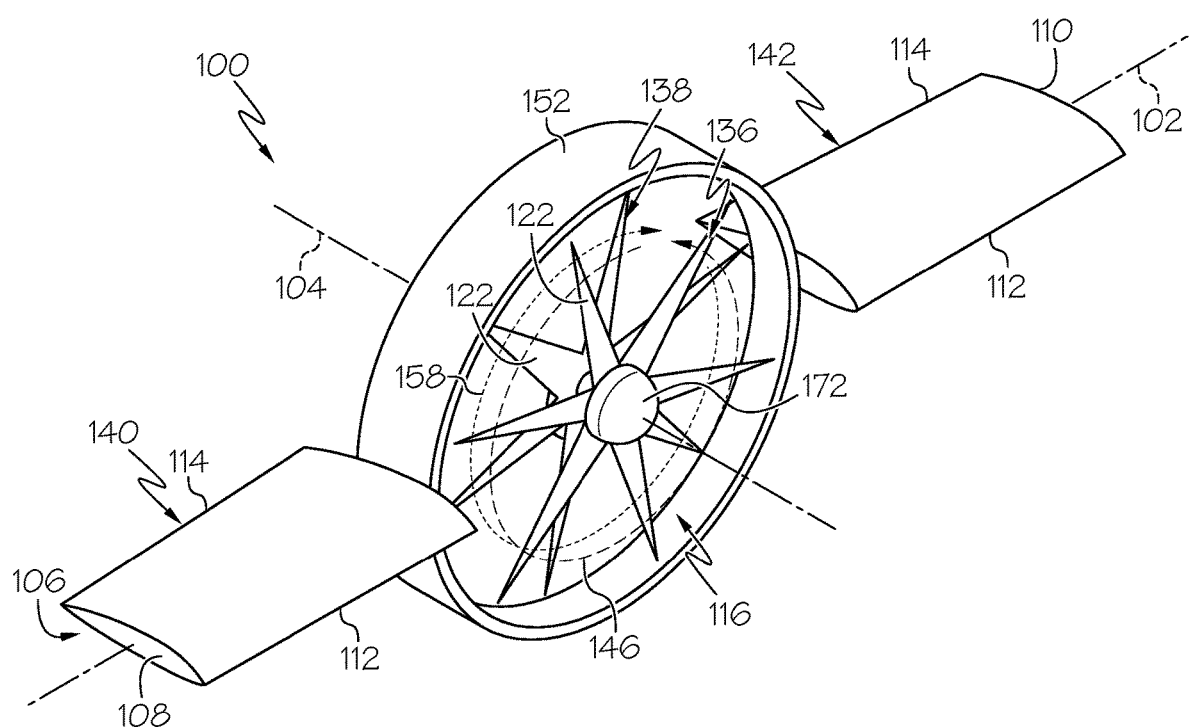
FIG. 8 is a schematic, perspective view of an example of the aerial vehicle, depicted in the horizontal flight state.

Referring generally to FIG. 1 and particularly to FIGS. 5-7, in one or more examples, the drive assembly 118 includes one motor 144. The wing body 106 includes the wing first section 140 and the wing second section 142. The wing first section 140 is coupled to the motor 144. The wing second section 142 is coupled to the motor 144 opposite to the wing first section 140 along the first vehicle axis 102.

In one or more examples, each one of the wing first section 140 and the wing second section 142 are rotatable about the first vehicle axis 102 relative to the motor 144. As such, the orientation of the first coaxial rotor 136 and the second coaxial rotor 138 and the orientation of the wing body 106 (the wing first section 140 and the wing second section 142) may be different to a certain degree in different flight states, as illustrated in FIG. 7. In other words, an orientation angle between the axis of rotation (of the first coaxial rotor 136 and the second coaxial rotor 138) and the second vehicle axis 104 (of the wing first section 140 and the wing second section 142) may vary between being approximately parallel (or coincident) in the horizontal and vertical flight states and being oblique when transitioning between the horizontal and vertical flight states. For example, as illustrated in FIG. 7, as the aerial vehicle 100 transitions from the horizontal flight state (FIG. 5) to the vertical flight state (FIG. 6), the pitch motion of the wing body 106 may trail the pitch motion of the first coaxial rotor 136 and the second coaxial rotor 138.

Referring to FIGS. 8-11, in one or more examples, the aerial vehicle 100 includes the duct 152. The duct 152 is concentric to the first coaxial rotor 136 and the second coaxial rotor 138. The wing body 106 includes the wing first section 140 and the wing second section 142. The wing first section 140 is coupled to the duct 152. The wing second section 142 is coupled to the duct 152 opposite to the wing first section 140 along the first vehicle axis 102.

In one or more examples, each one of the wing first section 140 and the wing second section 142 are rotatable about the first vehicle axis 102 relative to the duct 152. As such, the orientation of the first coaxial rotor 136 and the second coaxial rotor 138 and the orientation of the wing body 106 (the wing first section 140 and the wing second section 142) may be different to a certain degree in different flight states, as illustrated in FIG. 11.

Figure 11:
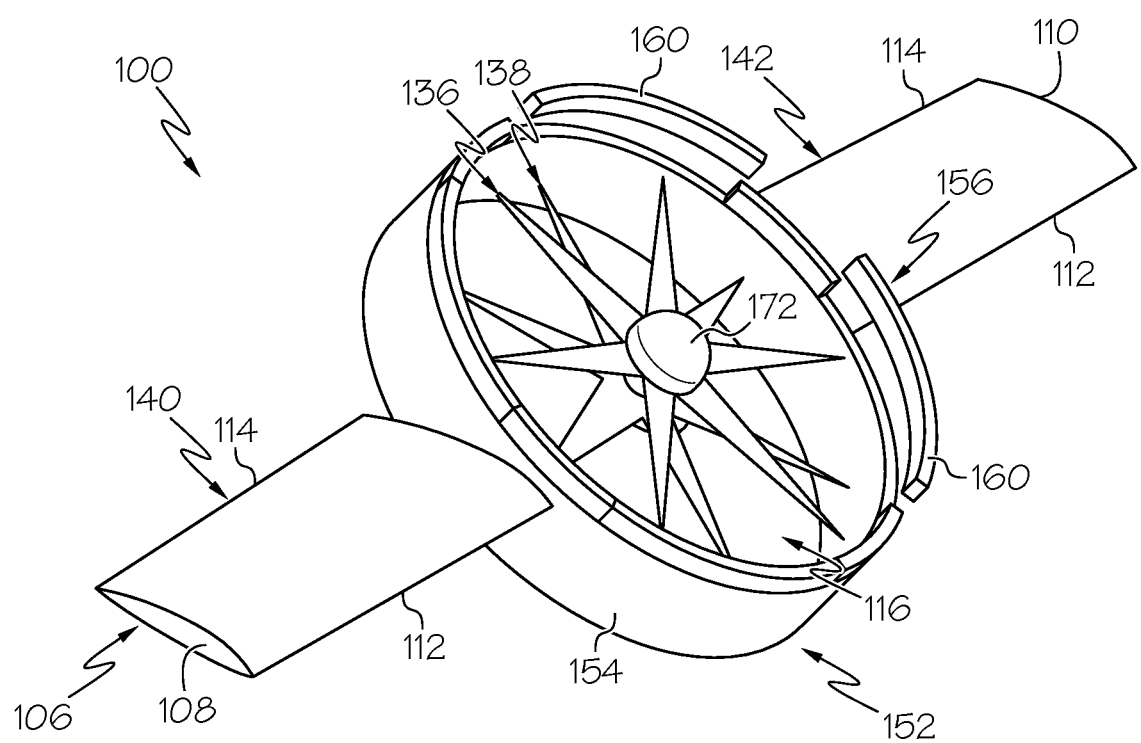
FIG. 11 is a schematic, perspective view of an example of the aerial vehicle
Figure 12:
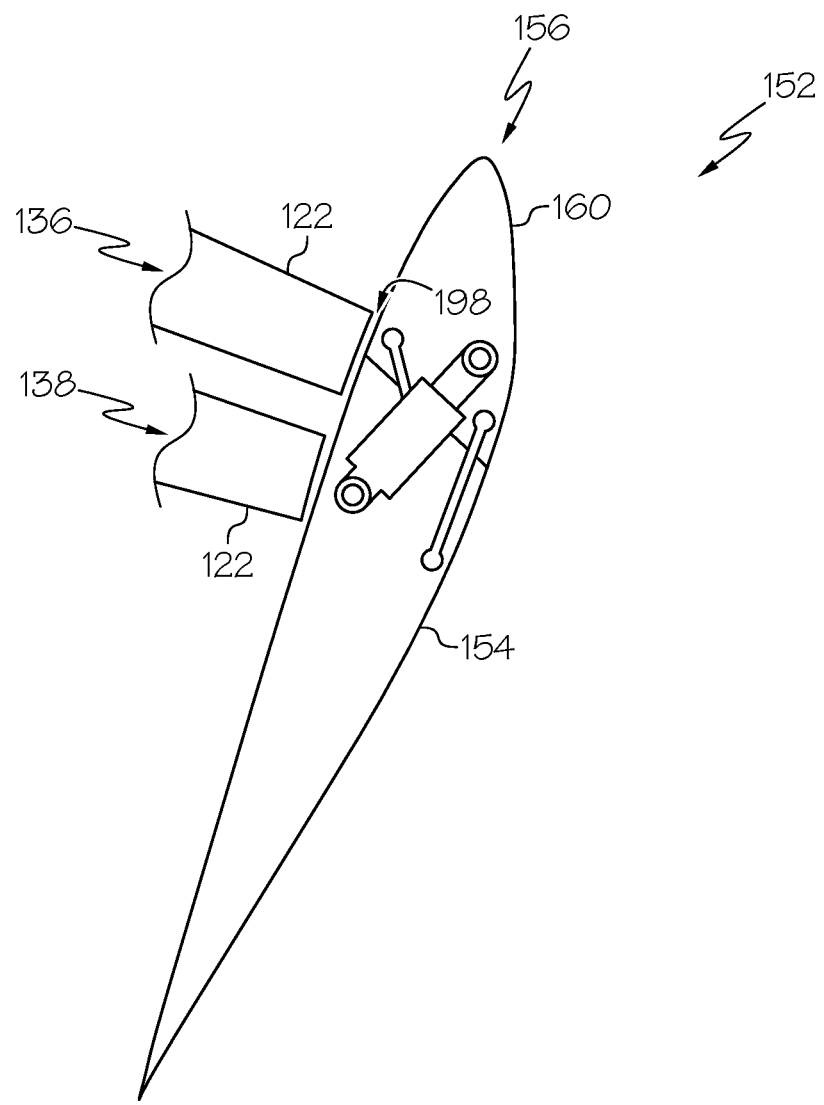
FIG. 12 is a schematic illustration of an example of a portion of a duct of the aerial vehicle of FIG. 11, depicted with a vent selectively closed.
Figure 13:
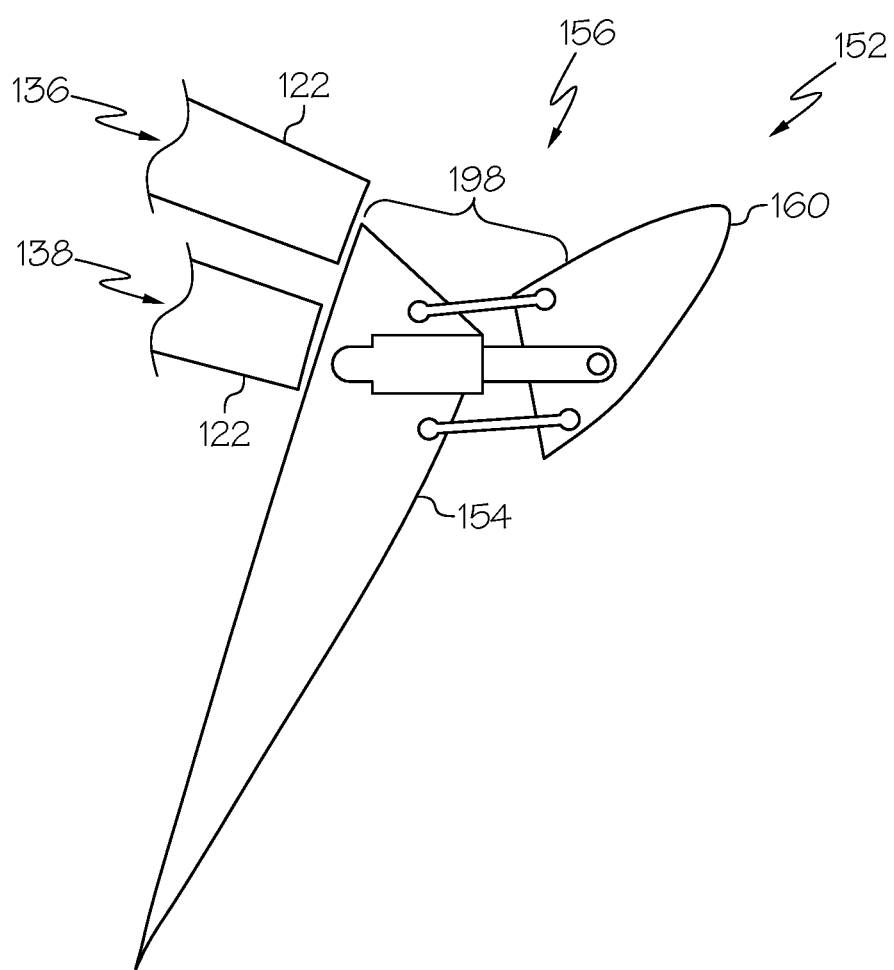
FIG. 13 is a schematic, sectional view of an example of the portion of the duct of the aerial vehicle of FIG. 11, depicted with the vent selectively open.

Referring to FIGS. 11-13, in one or more examples, the duct 152 includes a leading end 156. The duct 152 also includes a plurality of slats 160 located at the leading end 156. Each one of the plurality of slats is configured to extend (FIG. 13) and retract (FIG. 12) relative to at least one of the first coaxial rotor 136 and the second coaxial rotor 138. For example, the plurality of slats 160 is coupled to a duct wall 154 and form a portion of the leading end 156 of the duct 152. In one or more examples, each one of the plurality of slats 160 is located on the duct 152 to correspond with an associated one of a plurality of different sectors of the rotation cycles of the first coaxial rotor 136 and the second coaxial rotor 138. Selective extension or retraction of any one of the plurality of slats 160 changes the dimension of a gap 198 formed between an end of each one of the plurality of rotor blades 122 and slat 160. In other words, selectively extending or retracting the plurality of slats 160 varies the cross-sectional dimensions of the leading end 156 of the duct 152.

For example, under direction from the controller 120, each one of the plurality of slats 160 is selectively extended or retracted to produce a thrust differential (e.g., thrust imbalance) between different sectors of the respective rotation cycle of at least one of the first coaxial rotor 136 and the second coaxial rotor 138. The thrust imbalance between different sectors of the respective rotation cycle of at least one of the first coaxial rotor 136 and the second coaxial rotor 138, in response to selective extension or retraction of select ones of the plurality of slats 160, generates at least one of a rotational moment about the pitch axis of the aerial vehicle 100 that induces the pitch motion of the aerial vehicle 100 and a rotational moment about the yaw axis of the aerial vehicle 100 that induces the yaw motion of the aerial vehicle 100.

As an example, as illustrated in FIG. 13, selectively extending a select one of the plurality of slats 160, corresponding to an associated one of the plurality of sectors of the respective rotation cycles of the first coaxial rotor 136 and the second coaxial rotor 138, increases the gap 198 between the end of each one of the plurality of rotor blades 122 and a portion of the duct wall 154 formed by the select one of the plurality of slats 160 at the associated one of the plurality of sectors of the rotation cycle. The increase in the gap 198, between the end of each one of the plurality of rotor blades 122 and the slat 160, along the associated sector of the rotation cycle results in a decrease in the thrust produced by at least one of the first coaxial rotor 136 and the second coaxial rotor 138 through the associated sector.

As an example, a relative decrease in the thrust produced by at least one of the first coaxial rotor 136 and the second coaxial rotor 138 through a first sector (e.g., right sector) of the respective rotation cycle, resulting from selectively extending a first one (e.g., a right one) of the plurality of slats 160 associated with the first sector, relative to the thrust produced by at least one of the first coaxial rotor 136 and the second coaxial rotor 138 through a second sector that is opposite the first sector (e.g., left sector) of the respective rotation cycle, resulting from selectively retracting a second one (e.g., left one) of the plurality of slats 160 associated with the second sector, generates a rotational moment about the yaw axis of the aerial vehicle 100 that induces the yaw motion of the aerial vehicle in a first yaw direction (e.g., rightward). As another example, a relative decrease in the thrust produced by at least one of the first coaxial rotor 136 and the second coaxial rotor 138 through second sector (e.g., left sector) of the respective rotation cycle, resulting from selectively extending the second one (e.g., a left one) of the plurality of slats 160 associated with the second sector, relative to the thrust produced by at least one of the first coaxial rotor 136 and the second coaxial rotor 138 through the first sector (e.g., right sector) of the respective rotation cycle, resulting from selectively retracting the first one (e.g., right one) of the plurality of slats 160 associated with the first sector, generates a rotational moment about the yaw axis of the aerial vehicle 100 that induces the yaw motion of the aerial vehicle in a second yaw direction that is opposite the first yaw direction (e.g., leftward).

As an example, a relative decrease in the thrust produced by at least one of the first coaxial rotor 136 and the second coaxial rotor 138 through a third sector (e.g., upper sector in the horizontal flight state or rear sector in the vertical flight state) of the respective rotation cycle, resulting from selectively extending a third one (e.g., upper one in the horizontal flight state or rear one in the vertical flight state) of the plurality of slats 160 associated with the third sector, relative to the thrust produced by at least one of the first coaxial rotor 136 and the second coaxial rotor 138 through a fourth sector that is opposite the third sector (e.g., lower sector in the horizontal flight state or forward sector in the vertical flight state) of the respective rotation cycle, resulting from selectively retracting a fourth one (e.g., lower one in the horizontal flight state or forward one in the vertical flight state) of the plurality of slats 160 associated with the fourth sector, generates a rotational moment about the pitch axis of the aerial vehicle 100 that induces the pitch motion of the aerial vehicle in a first pitch direction (e.g., upward). As an example, a relative decrease in the thrust produced by at least one of the first coaxial rotor 136 and the second coaxial rotor 138 through the fourth sector (e.g., lower sector in the horizontal flight state or forward sector in the vertical flight state) of the respective rotation cycle, resulting from selectively extending the fourth one (e.g., lower one in the horizontal flight state or forward one in the vertical flight state) of the plurality of slats 160 associated with the fourth sector, relative to the thrust produced by at least one of the first coaxial rotor 136 and the second coaxial rotor 138 through the third sector (e.g., upper sector in the horizontal flight state or rear sector in the vertical flight state) of the respective rotation cycle, resulting from selectively retracting the third one (e.g., upper one in the horizontal flight state or rear one in the vertical flight state) of the plurality of slats 160 associated with the third sector, generates a rotational moment about the pitch axis of the aerial vehicle 100 that induces the pitch motion of the aerial vehicle in a second pitch direction that is opposite the first pitch direction (e.g., downward).

Accordingly, with reference to FIGS. 1-10, in one or more examples, variations in at least one of the blade pitch of the plurality of rotor blades 122 of the plurality of rotors 116 and the rotational speed of the plurality of rotors 116 selectively controls the pitch motion, the yaw motion, and the rolling motion of the aerial vehicle 100. With reference to FIGS. 11-13, in one or more examples, variations in at least one of the blade pitch of the plurality of rotor blades 122 of the plurality of rotors 116, the rotational speed of the plurality of rotors 116, and the selective position of the plurality of slats 160 selectively controls the pitch motion, the yaw motion, and the rolling motion of the aerial vehicle 100.

Figure 16:
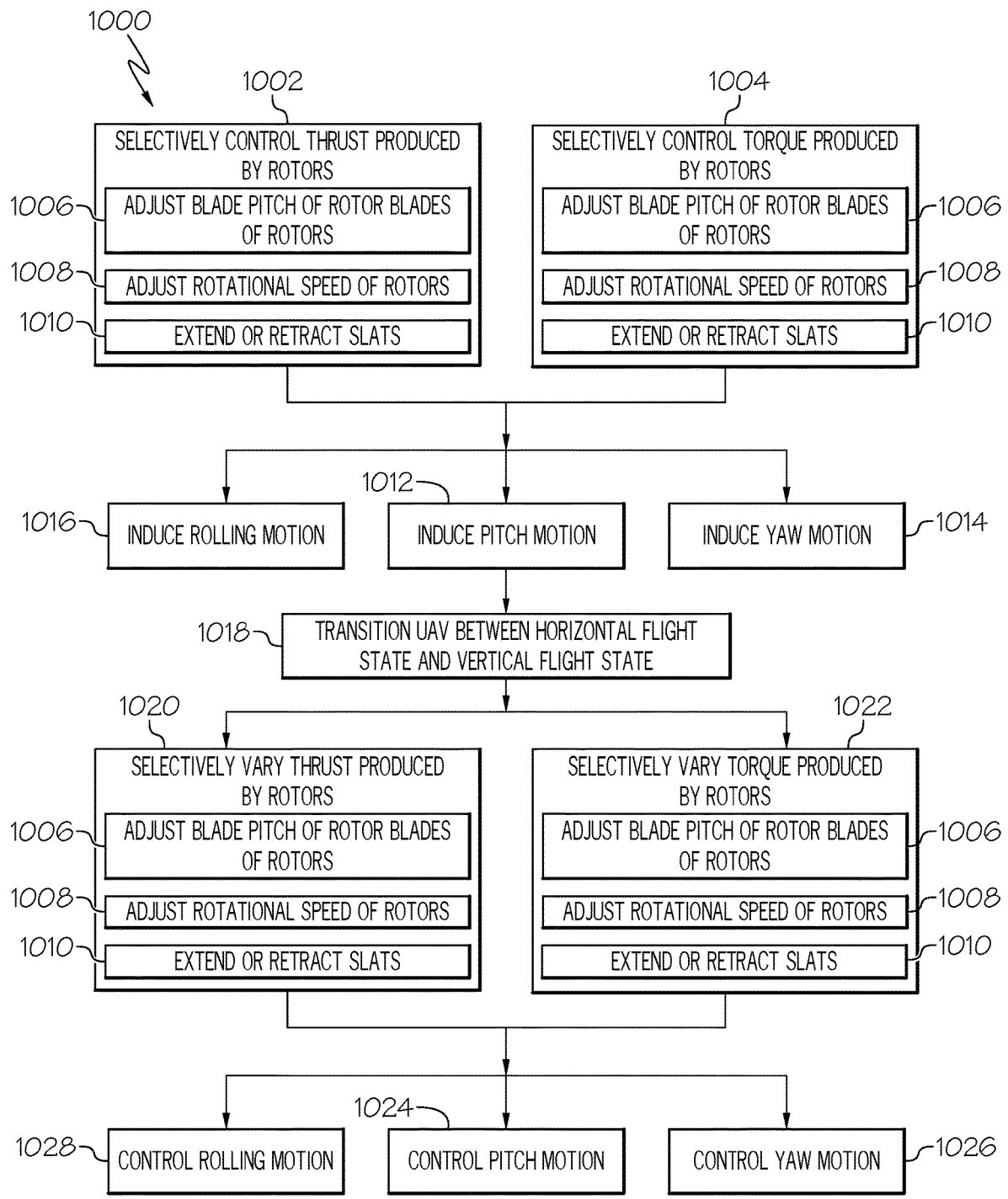
FIG. 16 is a flow diagram of an example of a method for controlling an aerial vehicle.

Referring generally to FIGS. 1-15 and particularly to FIG. 16, by way of examples, the present disclosure is also directed to a method 1000 of controlling the aerial vehicle 100. In accordance with the method 1000, the aerial vehicle 100 includes the wing body 106 having the airfoil shape, the plurality of rotors 116 coupled to the wing body 106, and the drive assembly 118 configured to rotate the plurality of rotors 116.

Referring generally to FIG. 1 and particularly to FIG. 16, in one or more examples, the method 1000 includes at least one of a step of (block 1002) selectively controlling the thrust produced by each one of the plurality of rotors 116 and a step of (block 1004) selectively controlling the torque produced by each one of the plurality of rotors 116.

In one or more examples, according to the method 1000, the step of (block 1002) selectively controlling the thrust produced by each one of the plurality of rotors 116 includes a step of (block 1006) selectively adjusting the blade pitch of the plurality of rotor blades 122 corresponding to each one of the plurality of rotors 116.

In one or more examples, according to the method 1000, the step of (block 1004) selectively controlling the torque produced by each one of the plurality of rotors 116 includes the step of (block 1006) selectively adjusting the blade pitch of the plurality of rotor blades 122 corresponding to each one of the plurality of rotors 116.

In one or more examples, according to the method 1000, the step of (block 1002) selectively controlling the thrust produced by each one of the plurality of rotors 116 includes a step of (block 1008) selectively adjusting the rotational speed of at least one of the plurality of rotors 116.

In one or more examples, according to the method 1000, the step of (block 1004) selectively controlling the torque produced by each one of the plurality of rotors 116 includes the step of (block 1008) selectively adjusting the rotational speed of at least one of the plurality of rotors 116.

In one or more examples, according to the method 1000, the step of (block 1002) selectively controlling the thrust produced by each one of the plurality of rotors 116 includes a step of (block 1010) selectively extending or selectively retracting each one of the plurality of slats 160.

In one or more examples, according to the method 1000, the step of (block 1004) selectively controlling the torque produced by each one of the plurality of rotors 116 includes the step of (block 1010) selectively extending or selectively retracting each one of the plurality of slats 160.

The method 1000 includes a step of (block 1012) inducing the pitch motion of the aerial vehicle 100 in response to selectively controlling at least one of the thrust and the torque produced by at least one of the plurality of rotors 116. The method 1000 includes a step of (block 1014) inducing the yaw motion of the aerial vehicle 100 in response to selectively varying at least one of the thrust and the torque produced by at least one of the plurality of rotors 116.

The method 1000 includes a step of (block 1016) inducing the rolling motion of the aerial vehicle 100 in response to selectively varying at least one of the thrust and the torque produced by at least one of the plurality of rotors 116.

Referring to FIGS. 1-4 and 14, in one or more examples, according to the method 1000, the plurality of rotors 116 includes the rotationally correlated first pair 148 and the rotationally correlated second pair 150. The rotationally correlated first pair 148 is configured to rotate in the first rotational direction 146. The rotationally correlated second pair 150 is configured to rotate in the second rotational direction 158 that is opposite to the first rotational direction 146.

Referring generally to FIGS. 1-4 and particularly to FIG. 16, in one or more examples, according to the method 1000, the step of (block 1006) selectively adjusting the blade pitch of the plurality of rotor blades 122 corresponding to each one of the plurality of rotors 116 includes at least one of a step of collectively varying the blade pitch of the plurality of rotor blades 122 corresponding to the rotationally correlated first pair 148 and a step of collectively varying the blade pitch of the plurality of rotor blades 122 corresponding to the rotationally correlated second pair 150. The method 1000 includes a step of creating the torque imbalance between the rotationally correlated first pair 148 and the rotationally correlated second pair 150 in response to collectively varying the blade pitch of the plurality of rotor blades 122 corresponding to at least one of the rotationally correlated first pair 148 and the rotationally correlated second pair 150. The method 1000 includes a step of generating the rotational moment about the roll axis of the aerial vehicle 100 in response to creating the torque imbalance. In accordance with the method 1000, the step of (block 1016) inducing the rolling motion of the aerial vehicle 100 is in response to generating the rotational moment about the roll axis of the aerial vehicle 100.

Referring to FIGS. 1, 5-10 and 15, in one or more examples, according to the method 1000, the plurality of rotors 116 includes the first coaxial rotor 136 and the second coaxial rotor 138. The first coaxial rotor 136 is configured to rotate in the first rotational direction 146. The second coaxial rotor 138 is configured to rotate in the second rotational direction 158 that is opposite to the first rotational direction 146.

Referring generally to FIGS. 1, 5-10 and 15 and particularly to FIG. 16, in one or more examples, according to the method 1000, the step of (block 1006) selectively adjusting the blade pitch of the plurality of rotor blades 122 corresponding to each one of the plurality of rotors 116 includes at least one of a step of collectively varying the blade pitch of the plurality of rotor blades corresponding to the first coaxial rotor 136 and a step of collectively varying the blade pitch of the plurality of rotor blades corresponding to the second coaxial rotor 138. The method 1000 includes a step of creating the torque imbalance between the first coaxial rotor 136 and the second coaxial rotor 138 in response to collectively varying the blade pitch of the plurality of rotor blades corresponding to at least one of the first coaxial rotor 136 and the second coaxial rotor 138. The method 1000 includes a step of generating the rotational moment about the roll axis of the aerial vehicle 100 in response to the torque imbalance. In accordance with the method 1000, the step of (block 1016) inducing the rolling motion of the aerial vehicle 100 is in response to generating the rotational moment about the roll axis of the aerial vehicle 100.

In one or more examples, according to the method 1000, the step of (block 1006) selectively adjusting the blade pitch of the plurality of rotor blades 122 corresponding to each one of the plurality of rotors 116 includes at least one of a step of cyclically varying the blade pitch of each one of the plurality of rotor blades 122 corresponding to at least one of the first coaxial rotor 136 through different sectors of the rotation cycle of the first coaxial rotor 136 and a step of cyclically varying the blade pitch of each one of the plurality of rotor blades 122 corresponding to the second coaxial rotor 138 through different sectors of the rotation cycle of the second coaxial rotor 138. The method 1000 includes a step of creating the torque imbalance between the first coaxial rotor 136 and the second coaxial rotor 138 in response to cyclically varying the blade pitch of each one of rotor blades corresponding to at least one of the first coaxial rotor 136 and the second coaxial rotor 138. The method 1000 includes a step of generating the rotational moment about at least one of the pitch axis of the aerial vehicle 100 and the yaw axis of the aerial vehicle 100 in response to the torque imbalance. In accordance with the method 1000, the step of (block 1012) inducing the pitch motion of the aerial vehicle 100 is in response to the rotational moment about the pitch axis of the aerial vehicle 100. In accordance with the method 1000, the step of (block 1014) inducing the yaw motion of the aerial vehicle 100 is in response to the rotational moment about the yaw axis of the aerial vehicle 100.

Figure 9:
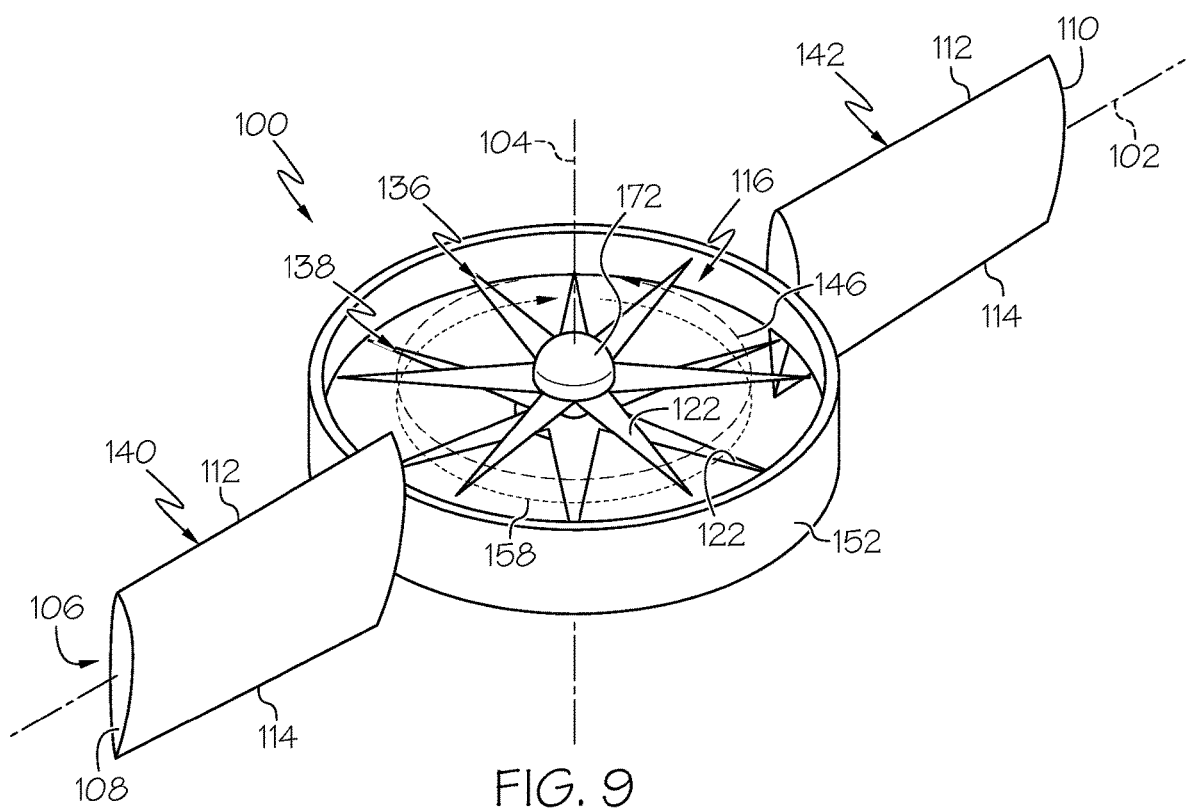
FIG. 9 is a schematic, perspective view of an example of the aerial vehicle of FIG. 8, depicted in a vertical flight state.
Figure 10:
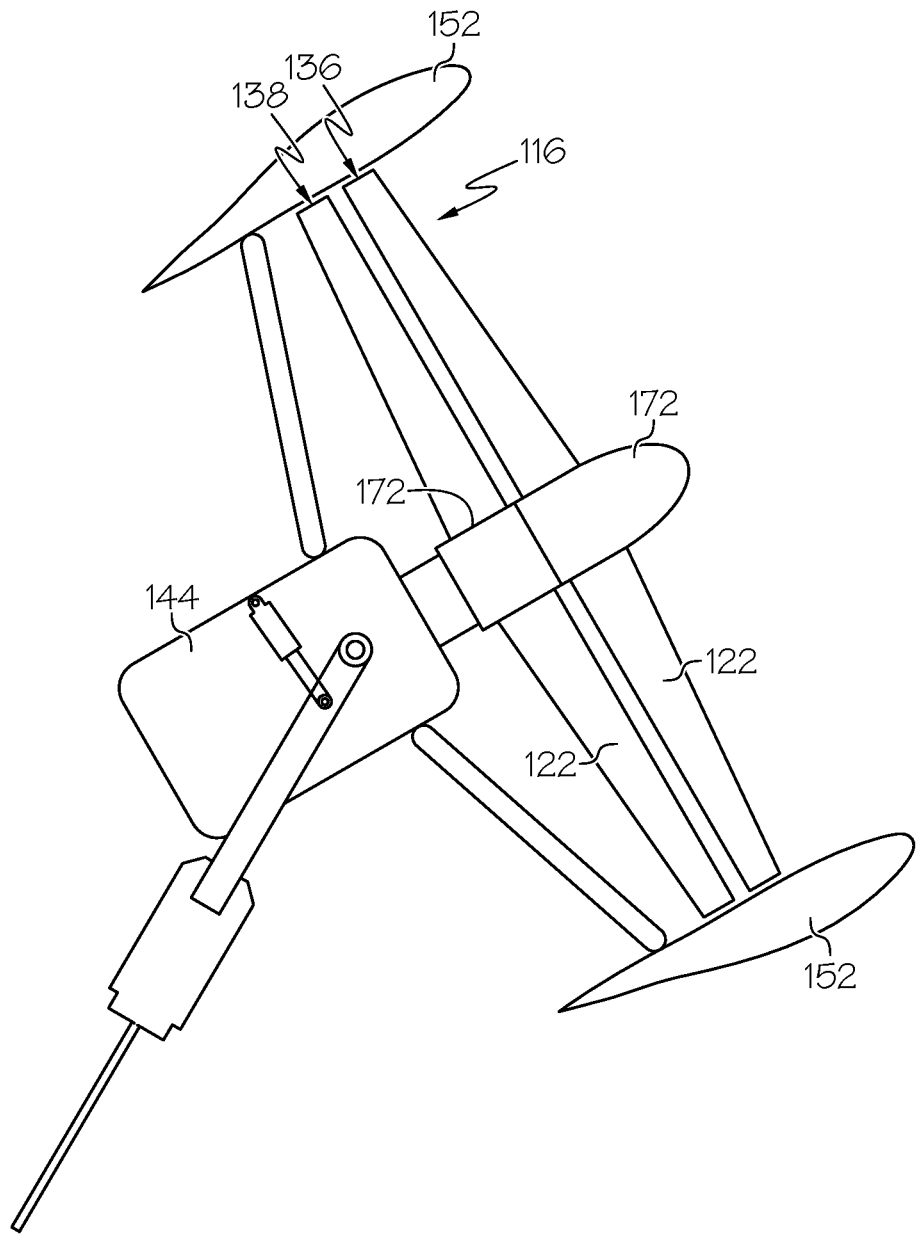
FIG. 10 is schematic elevation view, in partial section, of an example of the aerial vehicle of FIG. 8.

Referring generally to FIGS. 1-11 and particularly to FIG. 16, the method 1000 also includes a step of (block 1018) transitioning the aerial vehicle 100 between the horizontal flight state and the vertical flight state in response to the pitch motion. In the horizontal flight state, the wing body 106 is oriented horizontally and the collective thrust from the plurality of rotors 116 is directed forward, as illustrated in FIGS. 2, 4, 5 and 8. In the vertical flight state, the wing body 106 is oriented vertically and the collective thrust from the plurality of rotors 116 is directed upward, as best illustrated in FIGS. 3, 6 and 9.

In one or more examples, the method 1000 includes at least one of a step of (block 1020) selectively varying the thrust produced by at least one of the plurality of rotors 116 and a step of (block 1022) selectively varying the torque produced by at least one of the plurality of rotors 116.

In one or more examples, according to the method 1000, the step of (block 1020) selectively varying the thrust produced by each one of the plurality of rotors 116 includes the step of (block 1006) selectively adjusting the blade pitch of the plurality of rotor blades 122 corresponding to each one of the plurality of rotors 116.

In one or more examples, according to the method 1000, the step of (block 1022) selectively varying the torque produced by each one of the plurality of rotors 116 includes the step of (block 1006) selectively adjusting the blade pitch of the plurality of rotor blades 122 corresponding to each one of the plurality of rotors 116.

In one or more examples, according to the method 1000, the step of (block 1020) selectively varying the thrust produced by each one of the plurality of rotors 116 includes the step of (block 1008) selectively adjusting the rotational speed of at least one of the plurality of rotors 116.

In one or more examples, according to the method 1000, the step of (block 1022) selectively varying the torque produced by each one of the plurality of rotors 116 includes the step of (block 1008) selectively adjusting the rotational speed of at least one of the plurality of rotors 116.

In one or more examples, according to the method 1000, the step of (block 1020) selectively varying the thrust produced by each one of the plurality of rotors 116 includes the step of (block 1010) selectively extending or selectively retracting each one of the plurality of slats 160.

In one or more examples, according to the method 1000, the step of (block 1022) selectively varying the torque produced by each one of the plurality of rotors 116 includes the step of (block 1010) selectively extending or selectively retracting each one of the plurality of slats 160.

The method 1000 includes a step of (block 1024) controlling the pitch motion of the aerial vehicle 100 while the aerial vehicle 100 is in the horizontal flight state or the vertical flight state in response to selectively varying at least one of the thrust and the torque produced by at least one of the plurality of rotors 116.

The method 1000 includes a step of (block 1026) controlling the yaw motion of the aerial vehicle 100 while the aerial vehicle 100 is in the horizontal flight state or the vertical flight state in response to selectively varying at least one of the thrust and the torque produced by at least one of the plurality of rotors 116.

The method 1000 includes a step of (block 1028) controlling the rolling motion of the aerial vehicle 100 while the aerial vehicle 100 is in the horizontal flight state or the vertical flight state in response to selectively varying at least one of the thrust and the torque produced by at least one of the plurality of rotors 116.

Referring generally to FIGS. 17-32, by way of examples, the present disclosure is further directed to a cooperative system of aerial vehicles, referred to herein as "system" 200. The system 200 is formed by a plurality of aerial vehicles, such as a plurality of the disclosed aerial vehicles 100 (FIGS. 1-15) that are coupled together in flight. Flight of each of the aerial vehicles 100 may be individually controlled in accordance with the method 1000 (FIG. 16).

Figure 17:
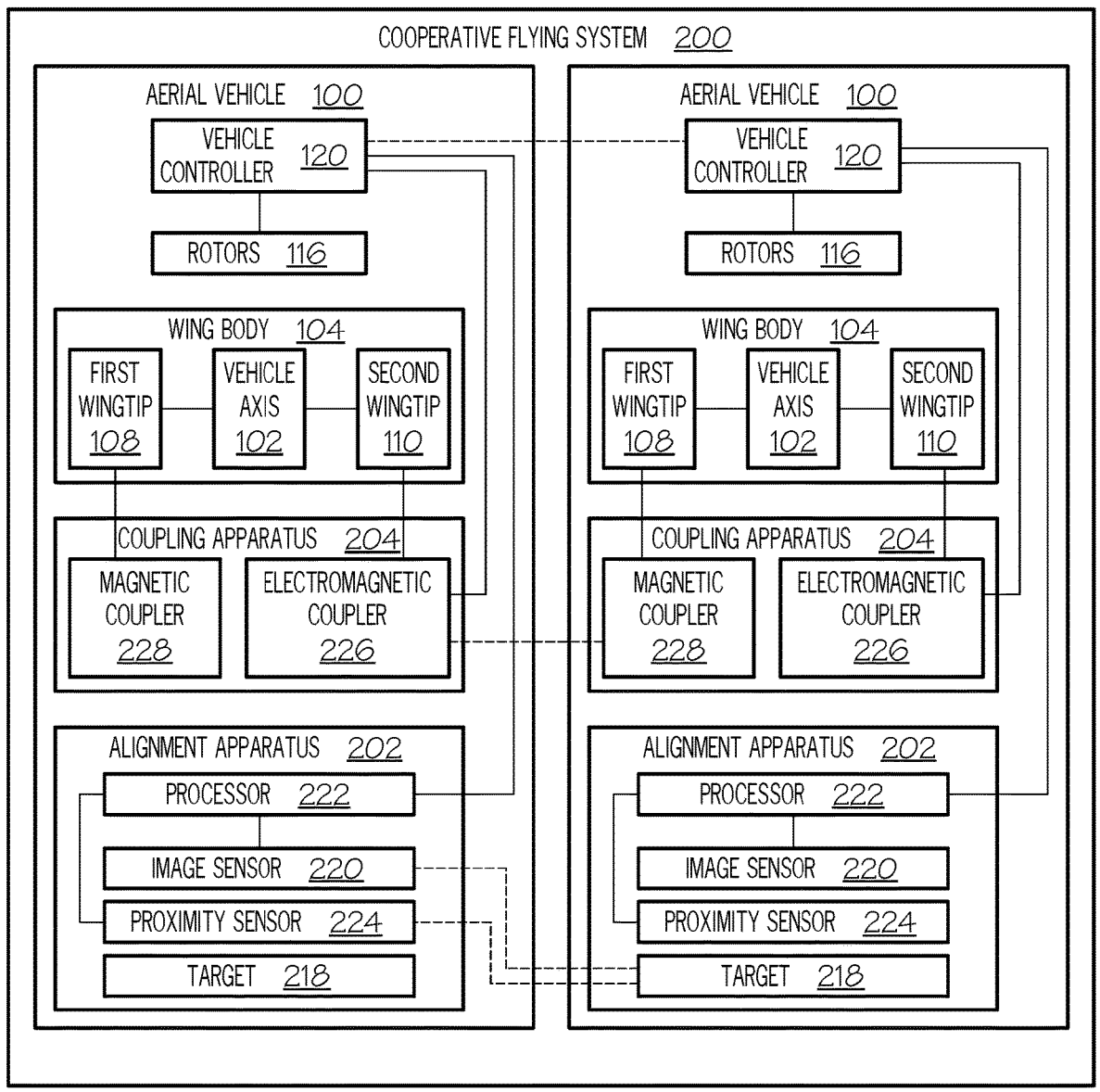
FIG. 17 is a schematic block diagram of an example of a cooperative flying system formed of a plurality of aerial vehicles.

Referring to FIG. 17, in one or more examples, the system 200 includes a plurality of aerial vehicles 100 configured to be coupled together in flight. In one or more examples, each one of the plurality of aerial vehicles 100 includes the wing body 106 having the first vehicle axis 102 and that includes the first wingtip 108 and the second wingtip 110, located opposite to the first wingtip 108 along the first vehicle axis 102. Each one of the plurality of aerial vehicles 100 also includes the plurality of rotors 116 coupled to the wing body 106.

In one or more examples, the system 200 includes an alignment apparatus 202. The alignment apparatus 202 is configured to align the first wingtip 108 of each one of the plurality of aerial vehicles 100 with the second wingtip 110 of a directly adjacent one of the plurality of aerial vehicles 100.

In one or more examples, the system 200 includes a coupling apparatus 204. The coupling apparatus 204 is configured to couple the first wingtip 108 of each one of the plurality of aerial vehicles 100 to the second wingtip 110 of the directly adjacent one of the plurality of aerial vehicles 100.

In one or more examples, the system 200 includes a set of vehicle controllers 120. The set of vehicle controllers 120 is configured to coordinate thrust produced by the plurality of rotors 116 of each one of the plurality of aerial vehicles 100 to alter at least one of a pitch angle, a yaw angle, and a roll angle of the cooperative flying system 200 and a velocity of the cooperative flying system 200.

In one or more examples, each one of the set of vehicle controllers 120 is a corresponding controller 120 (FIG. 1) of each aerial vehicle 100. In one or more examples, the aerial vehicles 100 cooperate and network in the following manner to control the formation of aerial vehicles 100.

Figure 18:
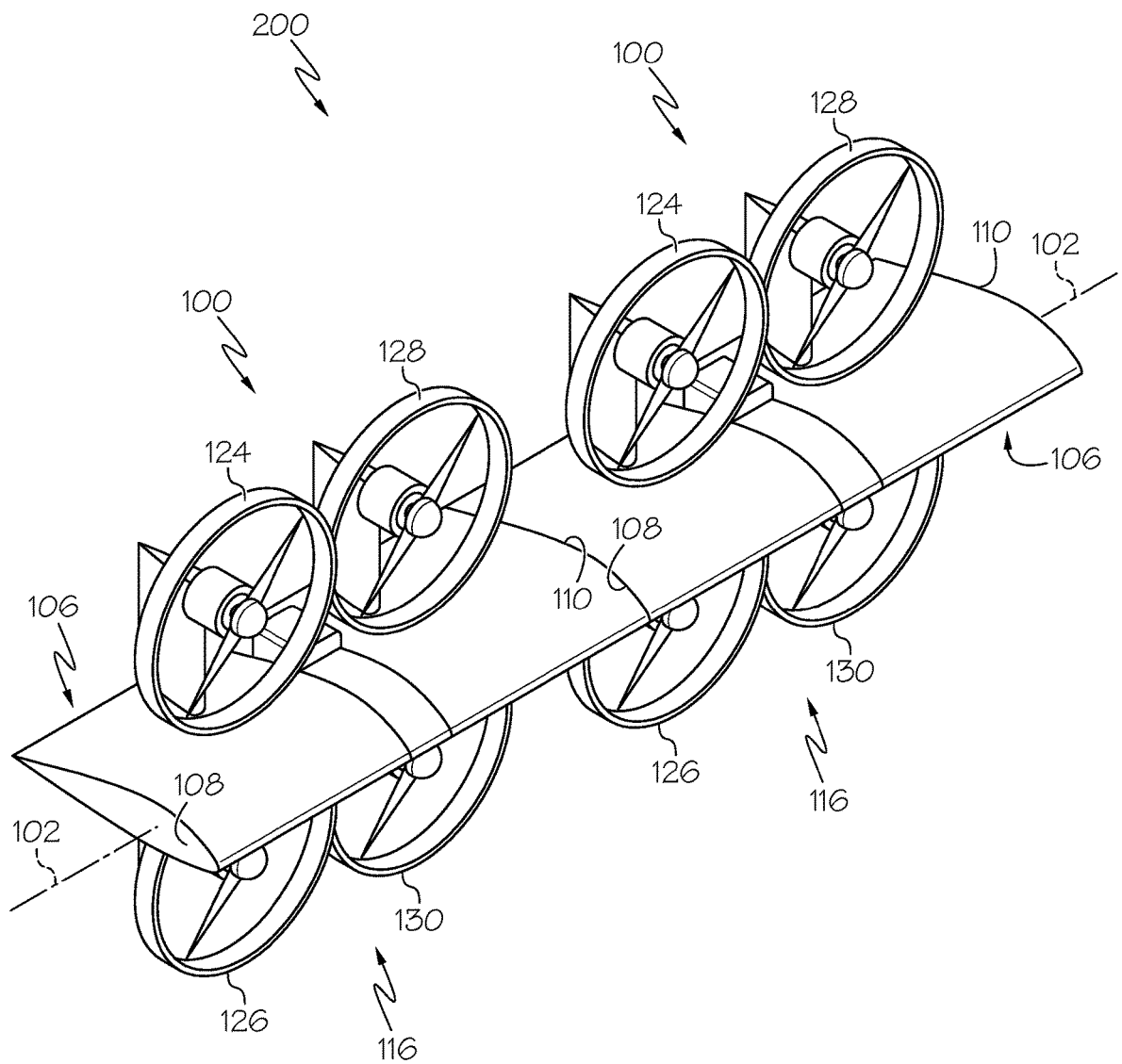
FIG. 18 is a schematic, perspective view of an example of the cooperative flying system.
Figure 19:
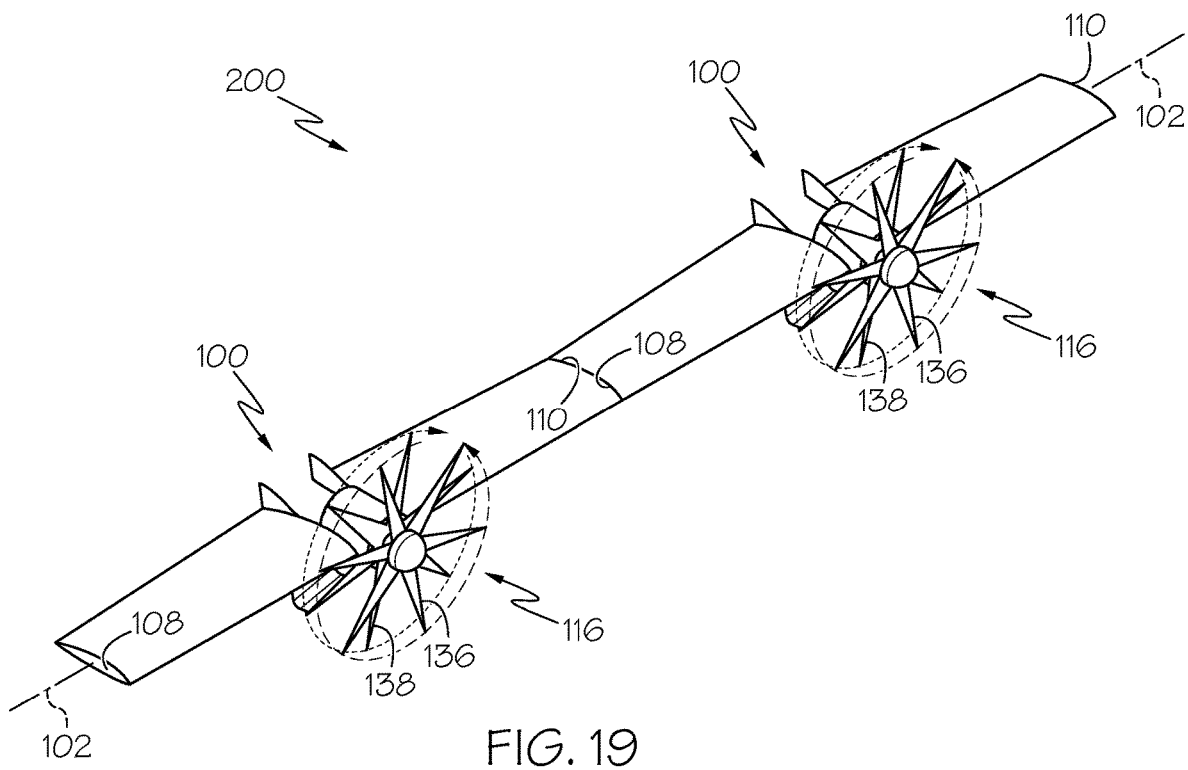
FIG. 19 is a schematic, perspective view of an example of the cooperative flying system.
Figure 20:
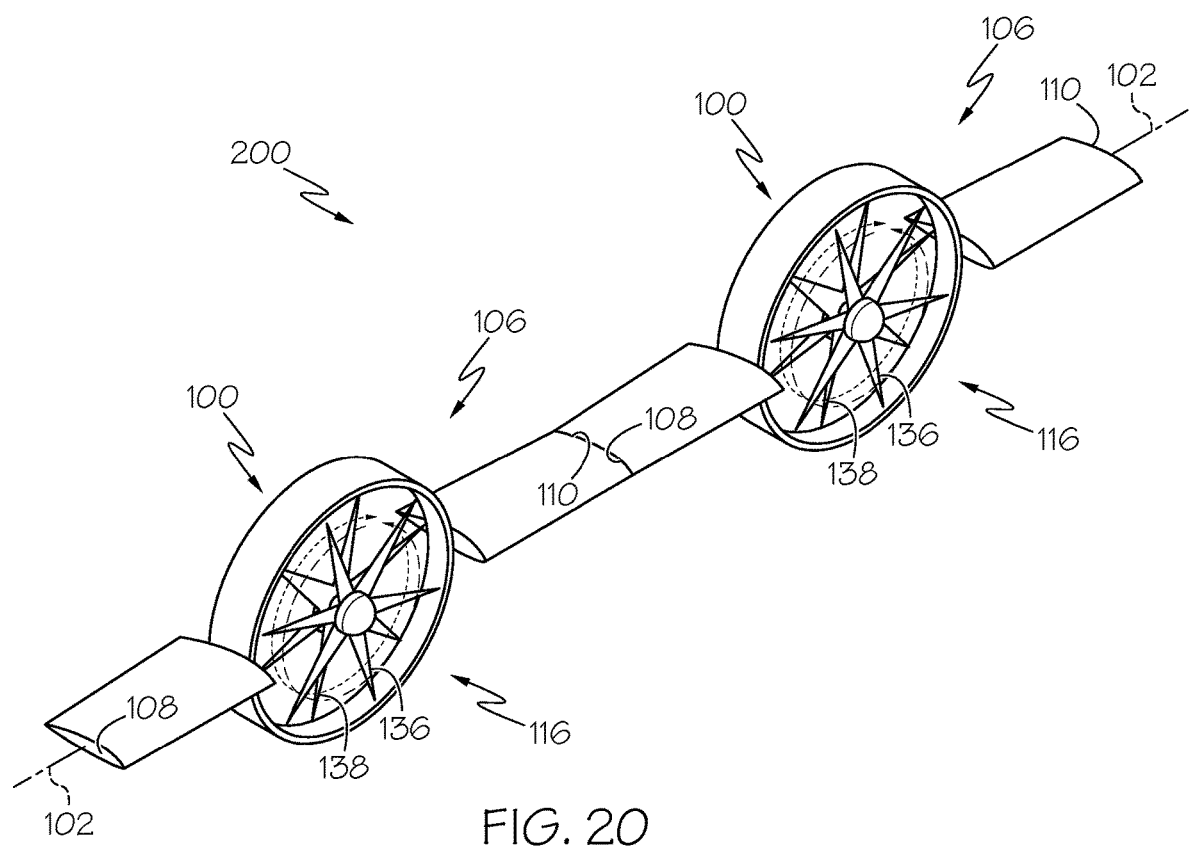
FIG. 20 is a schematic, perspective view of an example of the cooperative flying system.

Referring to FIGS. 18-20, in one or more examples, the wing body 106 of each one of the plurality of aerial vehicles 100 includes the airfoil shape and forms substantially an entirety of the mechanical load bearing structure of the aerial vehicle 100 and the lifting structure of the aerial vehicle 100. The first wingtip 108 forms a first end of the aerial vehicle 100 and the second wingtip 110 forms a second end of the aerial vehicle 100 that is opposite the first end along the first vehicle axis 102. Accordingly, FIG. 18 schematically illustrates an example of the system 200 formed of aerial vehicles 100 illustrated by example in FIGS. 2-4. FIG. 19 schematically illustrates an example of the system 200 formed of aerial vehicles 100 illustrated by example in FIGS. 5 and 6. FIG. 19 schematically illustrates an example of the system 200 formed of aerial vehicles 100 illustrated by example in FIGS. 8 and 9.

It can be appreciated that the disclosed system 200 is not limited to the examples of the aerial vehicles 100 described and illustrated herein, such as aerial vehicles 100 having the airfoil-shaped wing body 106. Accordingly, in other examples, a body of the aerial vehicle 100 may have other configurations, shapes and/or geometries (e.g., a central fuselage and pair of outwardly extending wings) in which the first end of one of the plurality of aerial vehicles 100 is aligned with and coupled to the second end of a directly adjacent one of the plurality of aerial vehicles 100 to form the system 200 as guided by the teachings of the present disclosure.

Figure 21:
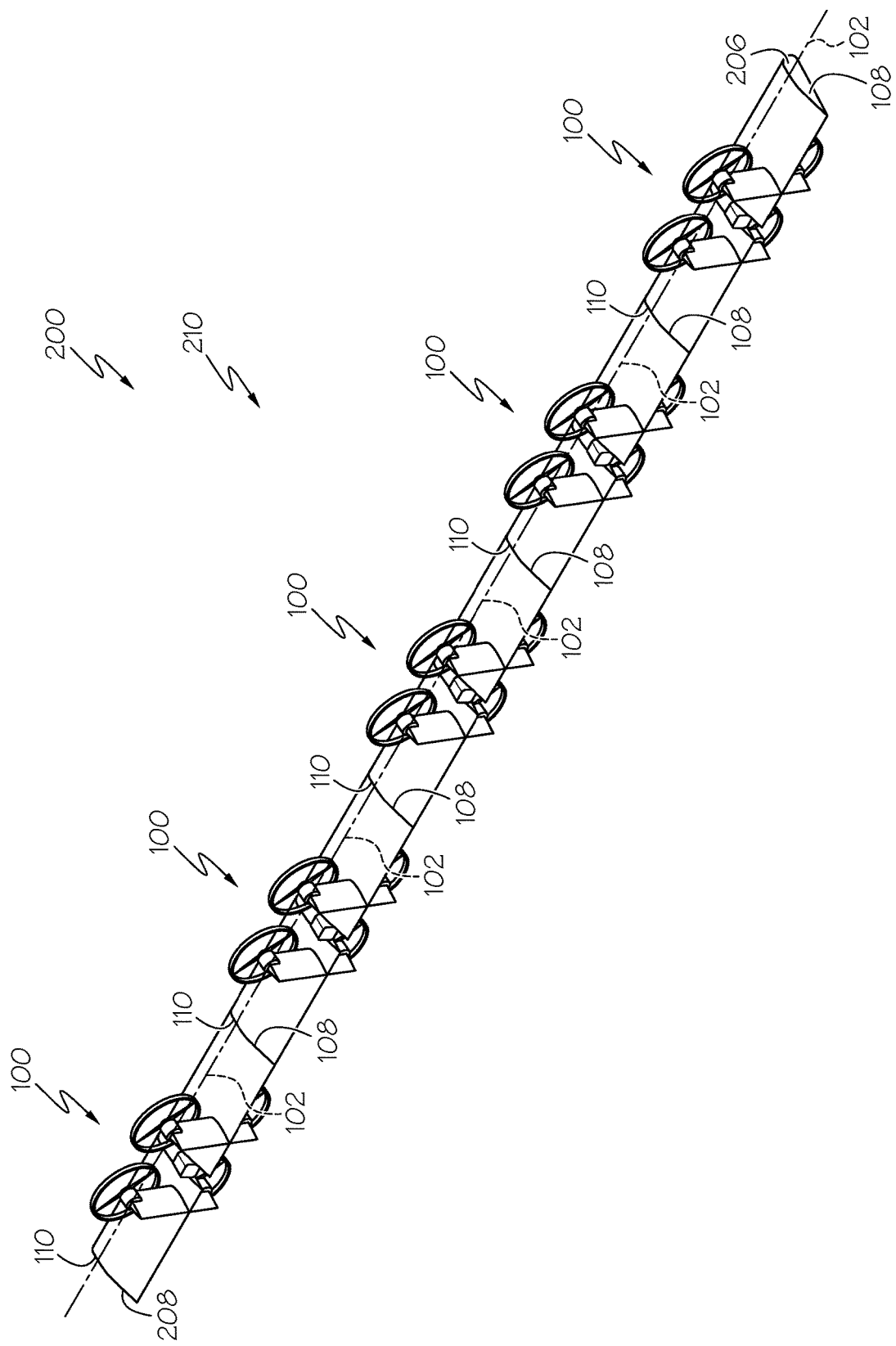
FIG. 21 is a schematic, perspective view of an example of the cooperative flying system in an open formation.
Figure 22:
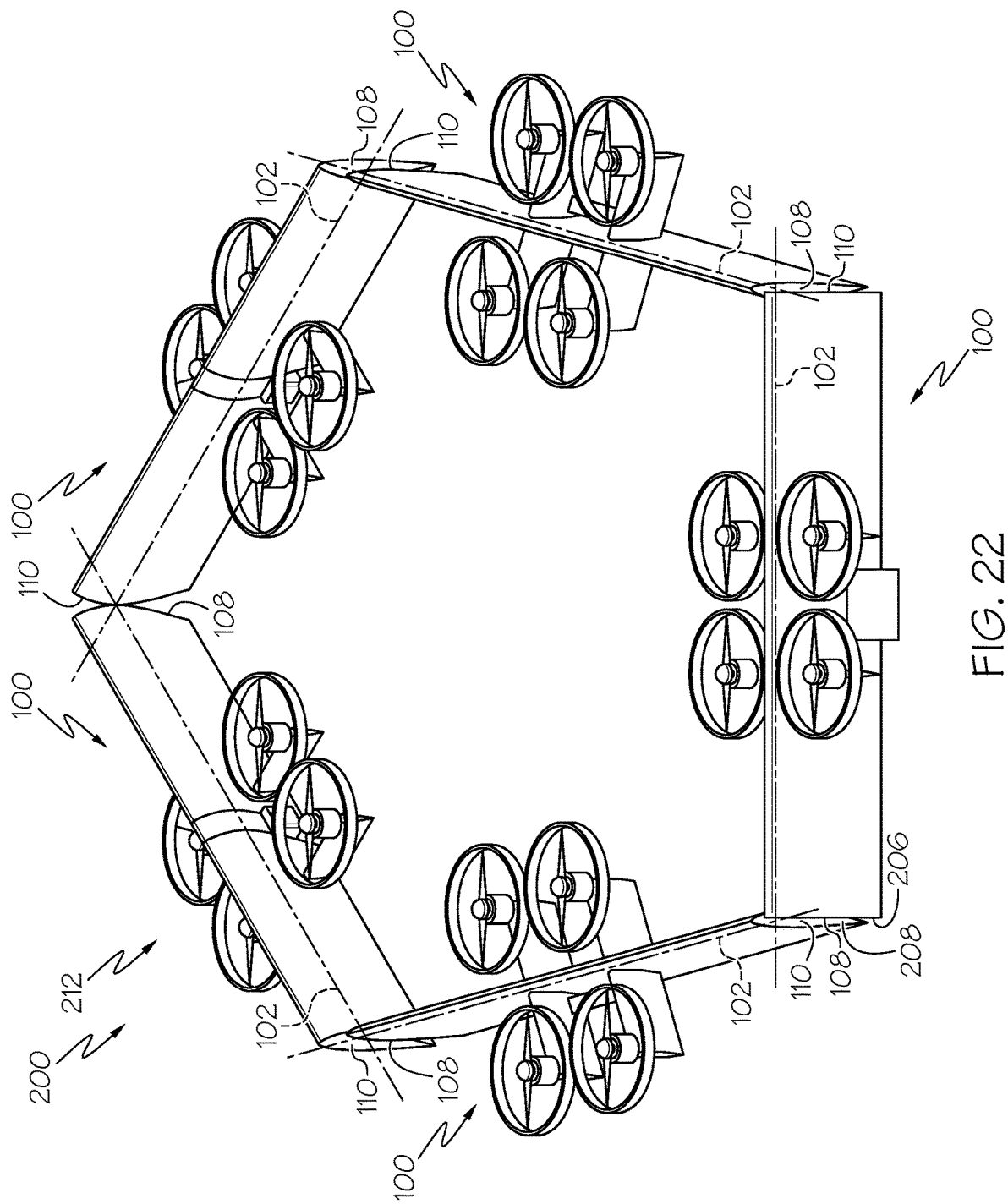
FIG. 22 is a schematic, perspective view of an example of the cooperative flying system in a closed formation.

Referring now to FIGS. 21-22, which schematically illustrate examples of the system 200 in an open formation 210 (e.g., open configuration) and a closed formation 212 (e.g., closed configuration), respectively. In one or more examples, the system 200 includes a first formation-end 206 and a second formation-end 208 that is opposite the first formation-end 206. The first formation-end 206 is formed by the first wingtip 108 of one (e.g., a first end one) of the plurality of aerial vehicles 100. The second formation-end 208 is formed by the second wingtip 110 of another one (e.g., a second end one) of the plurality of aerial vehicles 100. In one or more examples, the plurality of aerial vehicles 100 is arranged in one of the open formation 210 (e.g., as shown in FIG. 21) or the closed formation 212 (e.g., as shown in FIG. 22). In the open formation 210, the first vehicle axis 102 of each one of the plurality of aerial vehicles 100 is coincident with the first vehicle axis 102 of the directly adjacent one of the plurality of aerial vehicles 100 and the first formation-end 206 is axially opposed to the second formation-end 208. In the closed formation, the first vehicle axis 102 of each one of the plurality of aerial vehicles 100 intersects the first vehicle axis 102 of the directly adjacent one of the plurality of aerial vehicles 100 and the first formation-end 206 is connected to the second formation-end 208.

Figure 23:
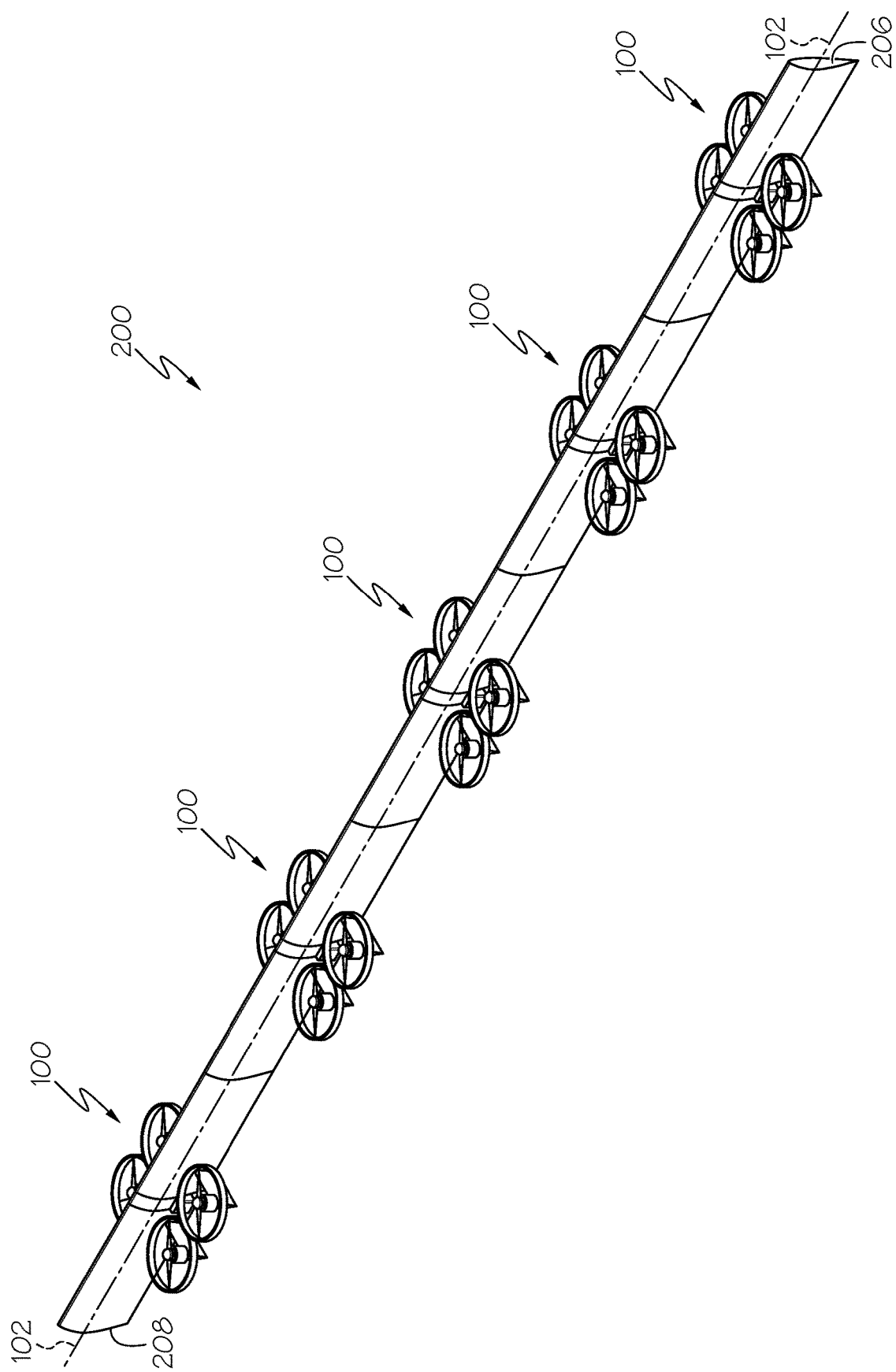
FIGS. 23 and 24, in combination, schematically illustrated an example of the cooperative flying system transitioning from the open formation to the closed formation.
Figure 24:
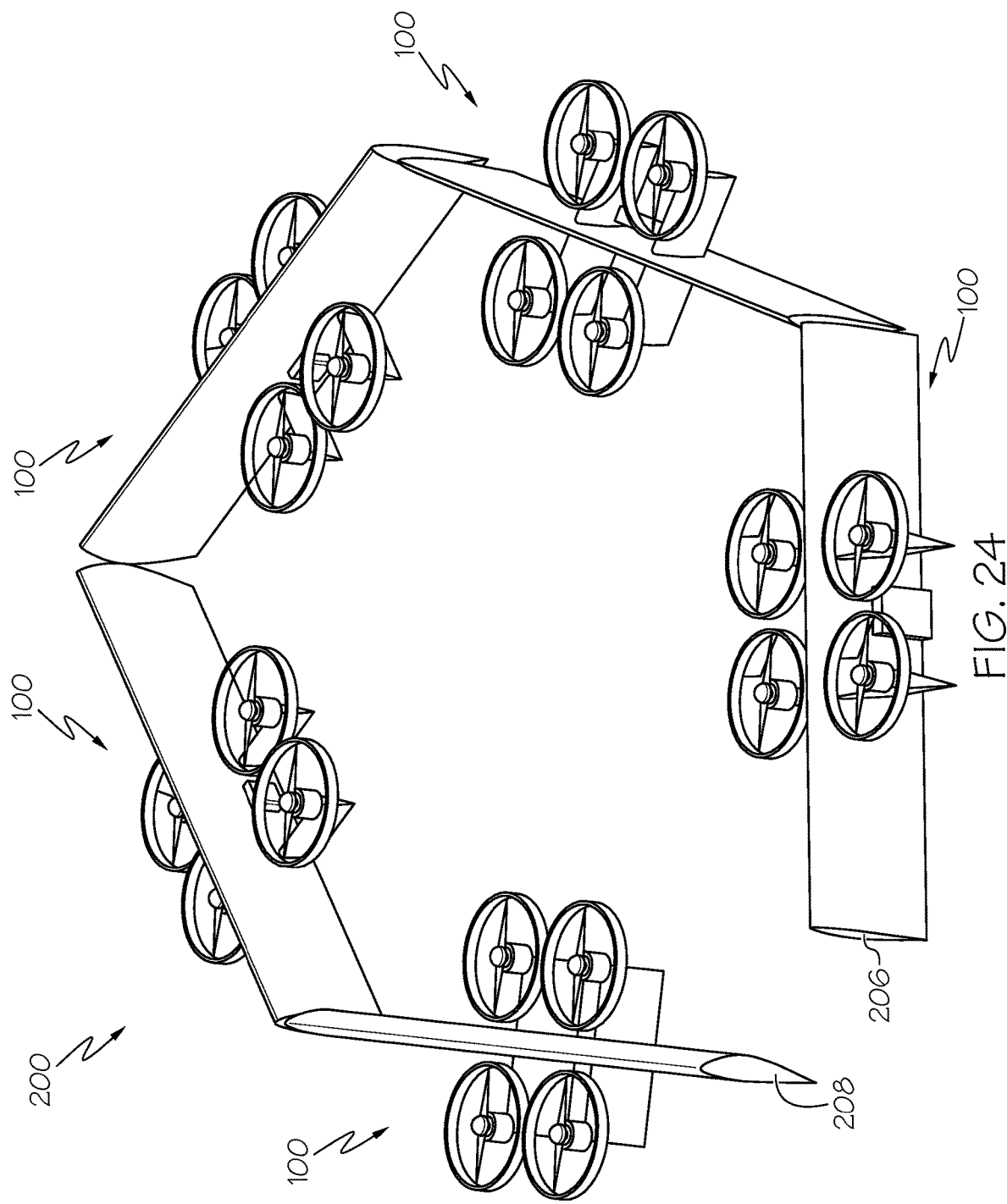

FIGS. 23 and 24 schematically illustrate stages in a transition of the system 200 from the open formation 210 to the closed formation 212. The system 200 is configured to transition between the open formation 210 and the closed formation 212 while in flight and with the plurality of aerial vehicles 100 coupled together. For example, the system 200 may transition from an open horizontal flight state (e.g., as shown in FIG. 21) in which the second vehicle axis 104 of the aerial vehicles 100 is approximately horizontal and a collective thrust from the plurality of rotors 116 is directed forward to an open vertical flight state (e.g., as shown in FIG. 23) in which the second vehicle axis 104 of the aerial vehicles 100 is approximately vertical and the collective thrust from the plurality of rotors 116 is directed upward. As will be described in more detail herein below, the system 200 may then transition from the open vertical flight state to a closed vertical flight state in which the second vehicle axis 104 of the aerial vehicles 100 is approximately vertical and the collective thrust from the plurality of rotors 116 is directed upward by pivotally maneuvering each one of the aerial vehicles 100 relative to the directly adjacent one of the aerial vehicles 100 (e.g., as shown in FIG. 24). Accordingly, the plurality of aerial vehicles 100 is configured to transition between the open formation 210 and the closed formation 212 while coupled together.

Figure 25:
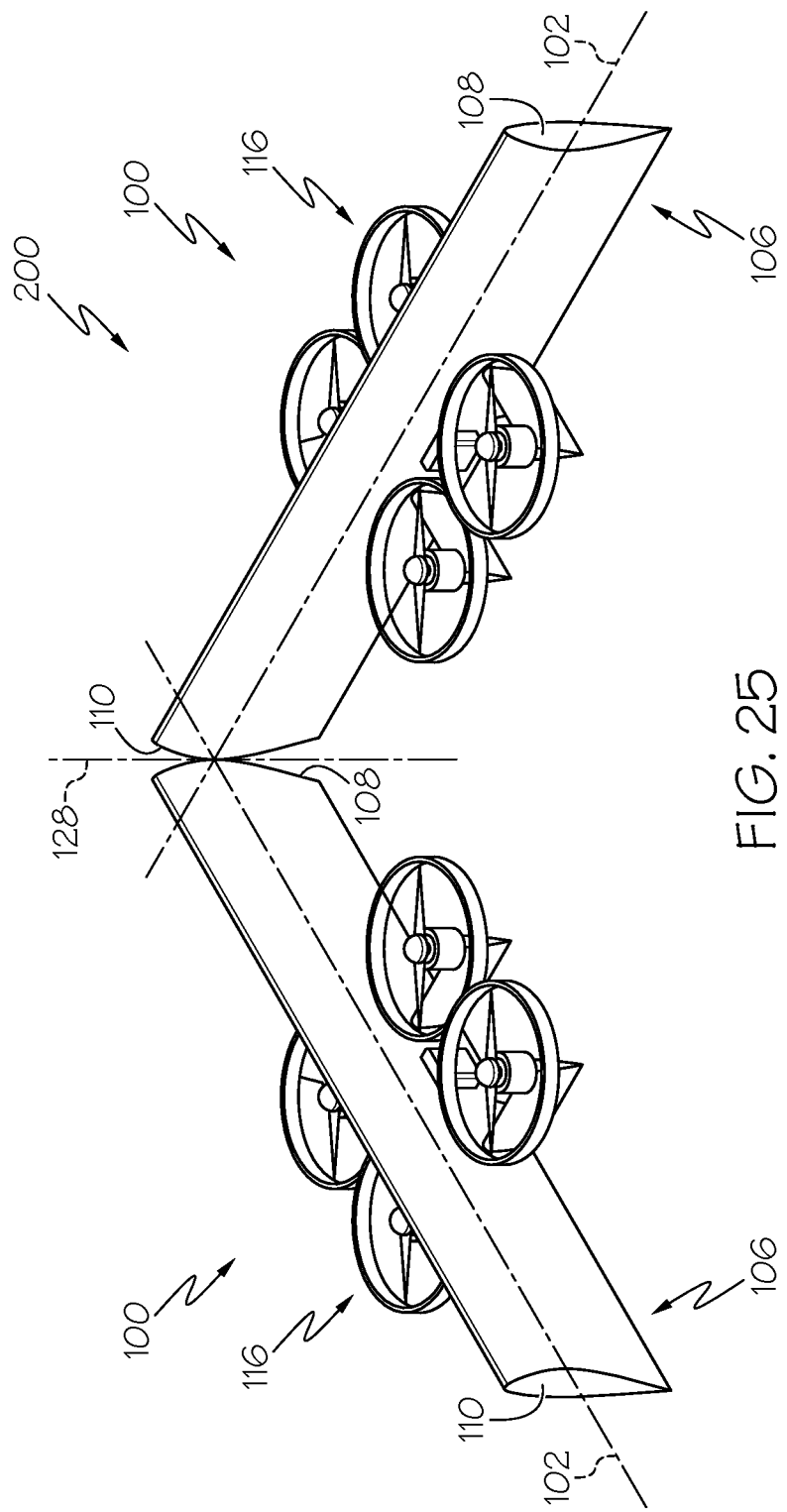
FIG. 25 is a schematic, perspective view of an example of a portion of the cooperative flying system, depicting one of the plurality of aerial vehicles pivoting relative to a directly adjacent one of the plurality of aerial vehicles.

Referring now to FIG. 25, which schematically illustrates an example of two aerial vehicles 100 of the system 200. In one or more examples, each one of the plurality of aerial vehicles 100 is pivotable about a pivot axis 214 relative to the directly adjacent one of the plurality of aerial vehicles 100. The pivot axis 214 is perpendicular to the first vehicle axis 102. In one or more examples, the pivot axis 214 may intersect the first vehicle axis 102.

Figure 26:
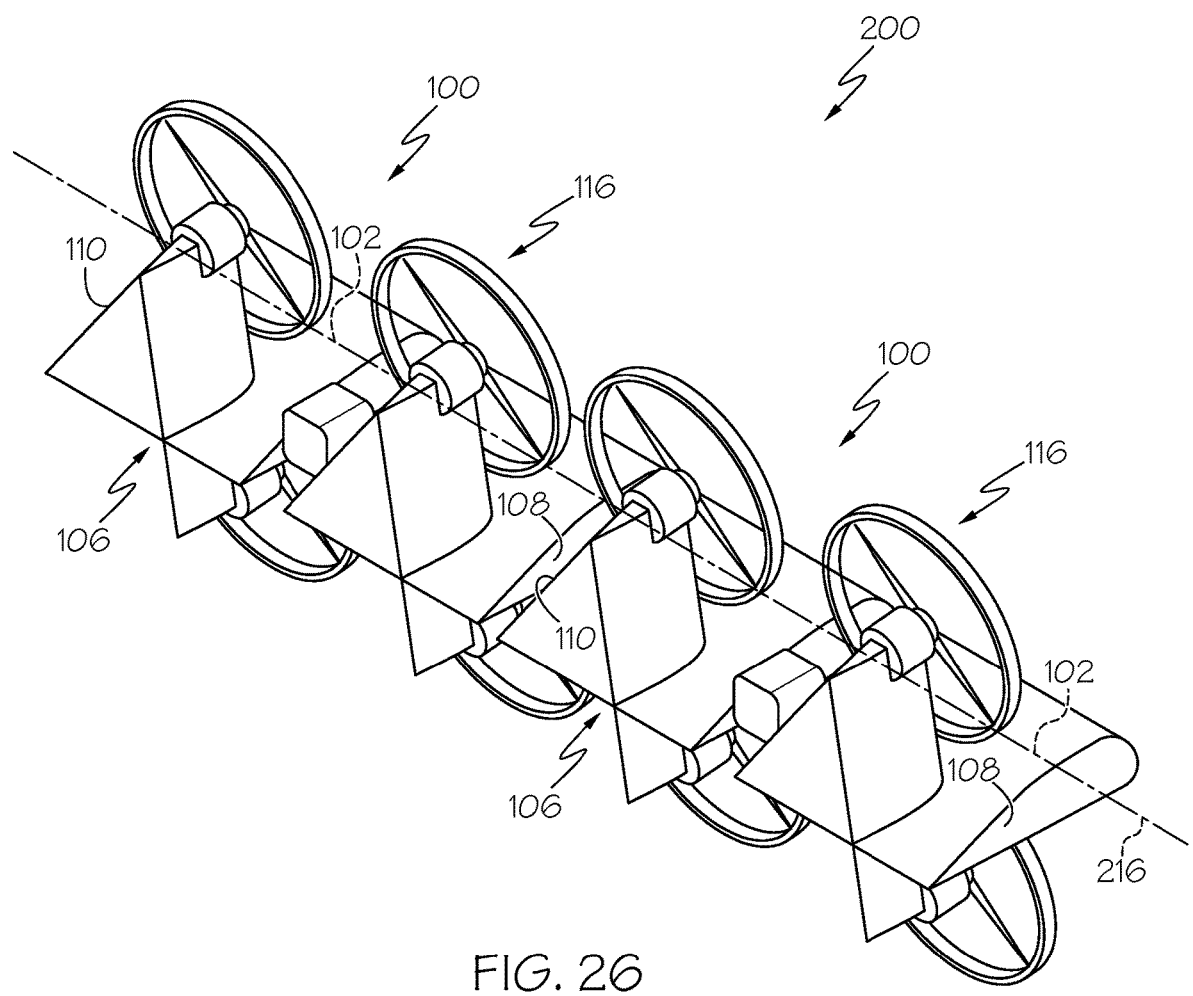
FIG. 26 is a schematic, perspective view of an example of a portion of the cooperative flying system, depicting one of the plurality of aerial vehicles rotating relative to the directly adjacent one of the plurality of aerial vehicles.

Referring now to FIG. 26, which schematically illustrates an example of two aerial vehicles 100 of the system 200. In one or more examples, each one of the plurality of aerial vehicles 100 is rotatable about a rotation axis 216 relative to the directly adjacent one of the plurality of aerial vehicles 100. In an example, the rotation axis 216 is parallel to the first vehicle axis 102. In an example, the rotation axis 216 is coincident with the first vehicle axis 102.

In one or more examples, each aerial vehicle 100 is freely rotatable relative to the directly adjacent aerial vehicle 100 (e.g., via a magnetic coupling apparatus) and thrust variations between the connected pair of aerial vehicles 100 rotates one aerial vehicle 100 relative to the other aerial vehicle 100 to vary the pitch between the connected pair of aerial vehicles 100. In other examples, rotational motion between the connected pair of aerial vehicles 100 is selectively controlled (e.g., via an actuator) to selectively vary pitch between the connected pair of aerial vehicles 100 and lock the connected pair of aerial vehicles 100 together at a desired relative rotational orientation to prevent rotation.

It can be appreciated that the system 200 can be formed by any suitable number of aerial vehicles 100. As such, the examples of the system 200 formed by two aerial vehicles 100 (e.g., as shown in FIGS. 18-20, 25 and 26) and the examples of the system 200 formed by five aerial vehicles 100 are not intended to be limiting.

Referring to FIGS. 17-24, in one or more examples, the set of vehicle controllers 120 (FIG. 17) is further configured to selectively control the thrust produced by each one of the plurality of rotors 116 of each one of the plurality of aerial vehicles 100. Selective control of the thrust produced by each one of the plurality of rotors 116 of each one of the plurality of aerial vehicles 100 controls a pitch motion of each one of the plurality of aerial vehicles 100 relative to another one of the plurality of aerial vehicles 100.

In one or more examples, the set of vehicle controllers 120 is configured to oppositely vary an angle of attack of opposing ones of the plurality of aerial vehicles 100 to induce a rolling motion of the cooperative flying system 200. In one or more examples, the set of vehicle controllers 120 is configured to oppositely vary the thrust produced by the plurality of rotors 116 of opposing ones of the plurality of aerial vehicles 100 to induce a yaw motion of the cooperative flying system 200. In one or more examples, the set of vehicle controllers 120 is configured to oppositely vary the thrust of upper ones of the plurality of rotors 116 (e.g., first rotor 124 and third rotor 128) and lower ones of the plurality of rotors 116 (e.g., second rotor 126 and fourth rotor 130) of each of the plurality of aerial vehicles 100 to induce a pitching motion of the cooperative flying system 200.

In one or more examples, control of roll, yaw and pitch are achieved in different manners in the open formation 210 (FIG. 21) and the closed formation 212 (FIG. 22). For example, control of roll, yaw and pitch are achieved more like a traditional quadrotor aircraft when the system 200 is in the closed formation 212.

Figure 27:
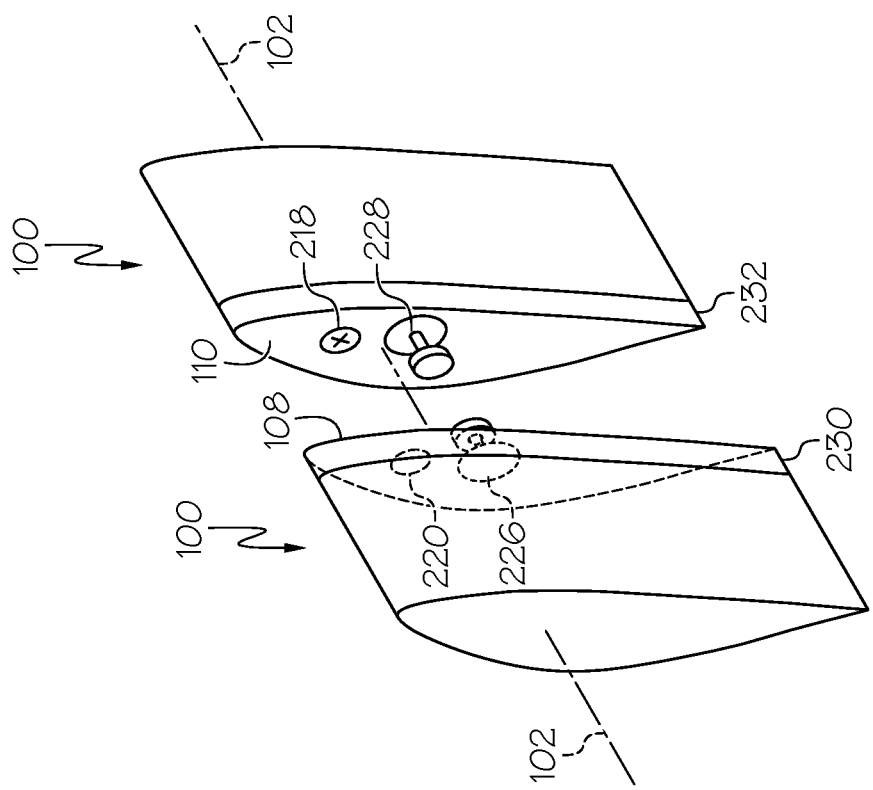
FIG. 27 is a schematic, perspective view of an example of a first wingtip of one the plurality of aerial vehicles pivoting relative to a second wingtip of the directly adjacent one of the plurality of aerial vehicles.
Figure 28:
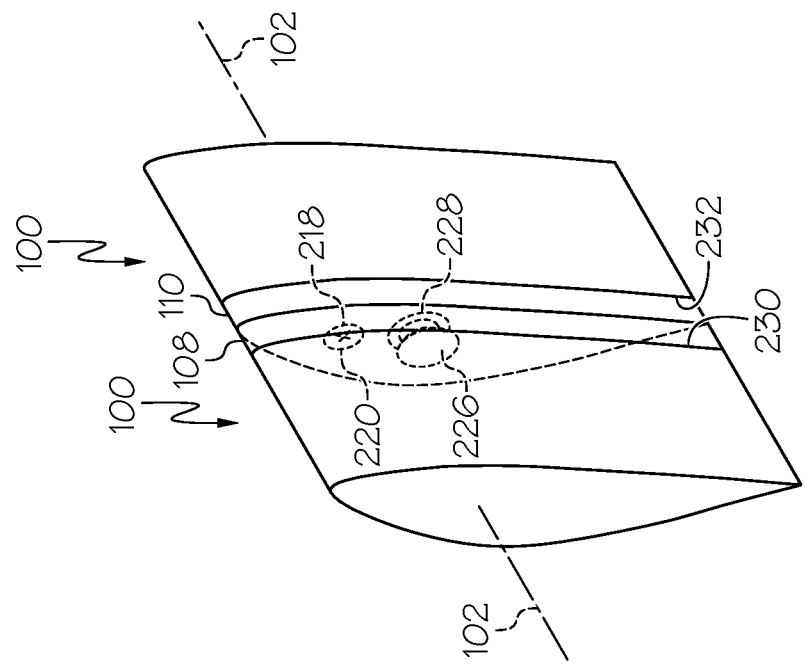
FIG. 28 is a schematic, perspective view of an example of the first wingtip of one the plurality of aerial vehicles rotating relative to the second wingtip of the directly adjacent one of the plurality of aerial vehicles.

Referring now to FIGS. 27 and 28, which schematically illustrate a portion of two aerial vehicles 100 of the system 200. In one or more examples, the alignment apparatus 202 includes a target 218 and an image sensor 220. The target 218 is located on the second wingtip 110 of each one of the plurality of aerial vehicles 100. The image sensor 220 located on the first wingtip 108 of each one of the plurality of aerial vehicles 100. The image sensor 220 is configured to capture image data representing the target 218. The alignment apparatus 202 also includes a processor 222 (FIG. 17) that is configured to determine position data representing the position of the first wingtip 108 of each one of the plurality of aerial vehicles 100 relative to the second wingtip 110 of the directly adjacent one of the plurality of aerial vehicles 100 based on the image data. The set of vehicle controllers 120 (FIG. 17) is configured to control at least one of the pitch angle, the yaw angle, the roll angle, and the thrust output of each one of the plurality of aerial vehicles 100 to align the first wingtip 108 of each one of the plurality of aerial vehicles 100 with the second wingtip 110 of the directly adjacent one of the plurality of aerial vehicles 100 based on the position data.

For example, a second aerial vehicle 100 aligns with a first aerial vehicle 100. A third aerial vehicle 100 then aligns with the second aerial vehicle 100. This process repeats until formation of the system 200 is complete.

Referring to FIG. 17, in one or more examples, the system 200 includes a proximity sensor 224 associated with each aligned and connected pair of aerial vehicles 100. For example, the proximity sensor 224 is located on the first wingtip 108 of each one of the plurality of aerial vehicles 100. The proximity sensor 224 is configured indicate when the target 218 is within a predefined threshold distance.

Figure 30:
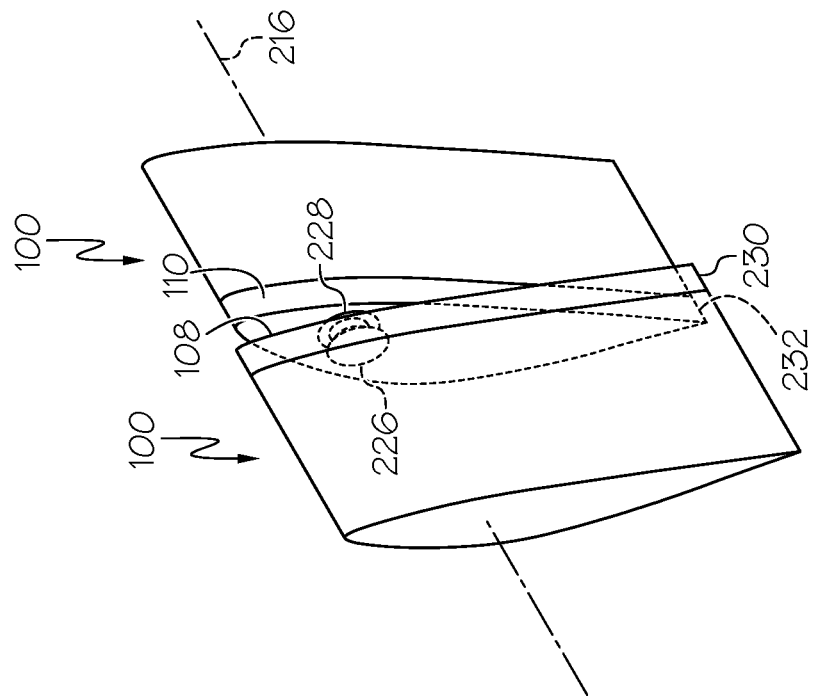
FIG. 30 schematically illustrates an example of the first wingtip of one the plurality of aerial vehicles coupled to the second wingtip of the directly adjacent one of the plurality of aerial vehicles.
Figure 29:
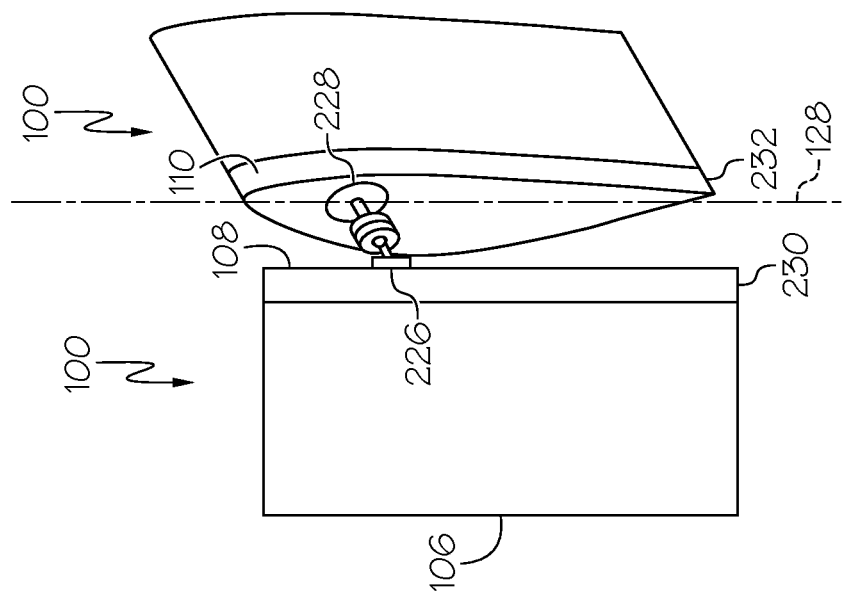
FIG. 29 schematically illustrates an example of the first wingtip of one the plurality of aerial vehicles aligned with the second wingtip of the directly adjacent one of the plurality of aerial vehicles.
Figure 31:
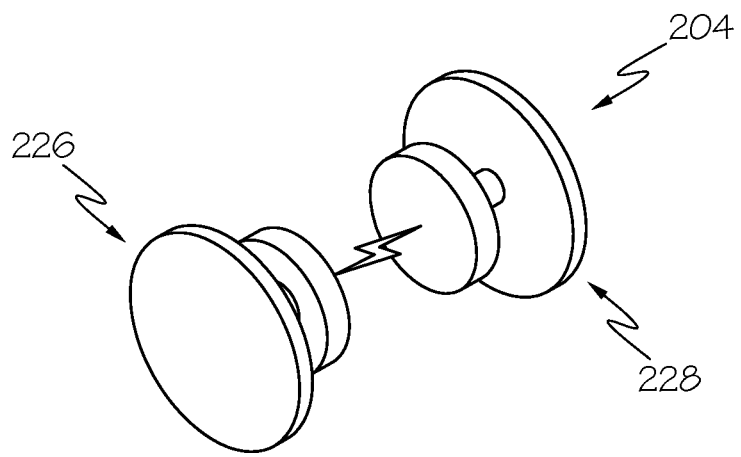
FIG. 31 is a schematic perspective view of an electromagnetic coupler and a magnetic coupler aligned with each other.
Figure 32:
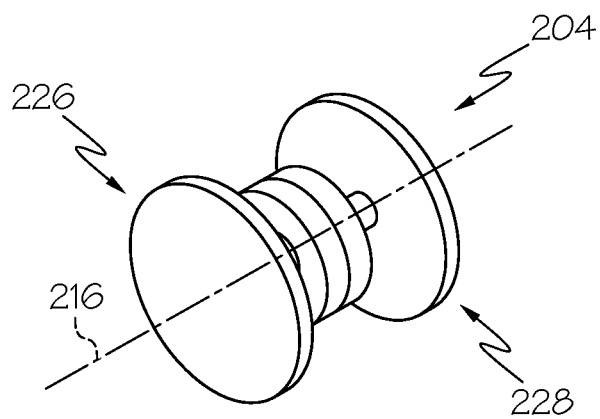
FIG. 32 is a schematic perspective view of the electromagnetic coupler and the magnetic coupler magnetically coupled together.
Figure 33:
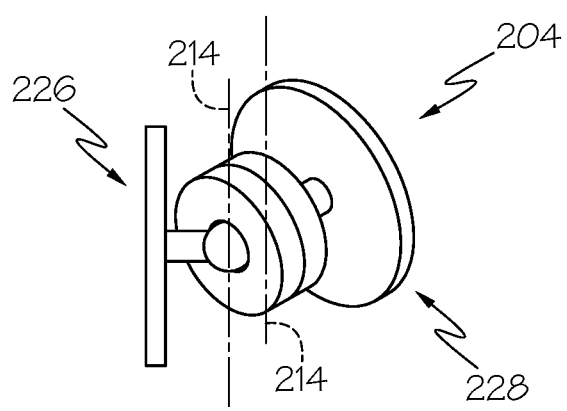
FIG. 33 schematically illustrates the electromagnetic coupler and the magnetic coupler magnetically pivoting relative to each other.

Referring now to FIGS. 29 and 30, which schematically illustrate a portion of two aerial vehicles 100 of the system 200 and FIGS. 31-33, which schematically illustrate the coupling apparatus 204. In one or more examples, the coupling apparatus 204 includes an electromagnetic coupler 226 and a magnetic coupler 228. The electromagnetic coupler 226 is located on the first wingtip 108 of each one of the plurality of aerial vehicles 100. The magnetic coupler 228 is located on the second wingtip 110 of each one of the plurality of aerial vehicles 100. Each one of the set of vehicle controllers 120 is configured to energize the electromagnetic coupler 226 to magnetically couple the electromagnetic coupler 226 and the magnetic coupler 228 together in response to alignment of the first wingtip 108 of each one of the plurality of aerial vehicles 100 with the second wingtip 110 of the directly adjacent one of the plurality of aerial vehicles 100 (e.g., as shown in FIG. 31).

In one or more examples, the coupling apparatus 204 is configured to enable a first one of aerial vehicles 100 to rotate about the rotation axis 216 relative to a directly adjacent second one of the aerial vehicles 100 (e.g., as shown in FIG. 32). In one or more examples, the coupling apparatus 204 is configured to enable the first one of aerial vehicles 100 to pivot about the pivot axis 214 relative to the directly adjacent second one of the aerial vehicles 100 (e.g., as shown in FIG. 33). For example, each one of the electromagnetic coupler 226 and the magnetic coupler 228 may be coupled to the wing body 106 via a spherical joint.

Referring to FIGS. 27-30, in one or more examples, each one of the plurality of aerial vehicles 100 includes a first resilient member 230 that is coupled to the first wingtip 108 and a second resilient member 232 that is coupled to the second wingtip 110. The first resilient member 230 and the second resilient member 232 form a continuous aerodynamic surface between the first wingtip 108 of each one of the plurality of aerial vehicles 100 and the second wingtip 110 of the directly adjacent one of the plurality of aerial vehicles 100.

Figure 34:
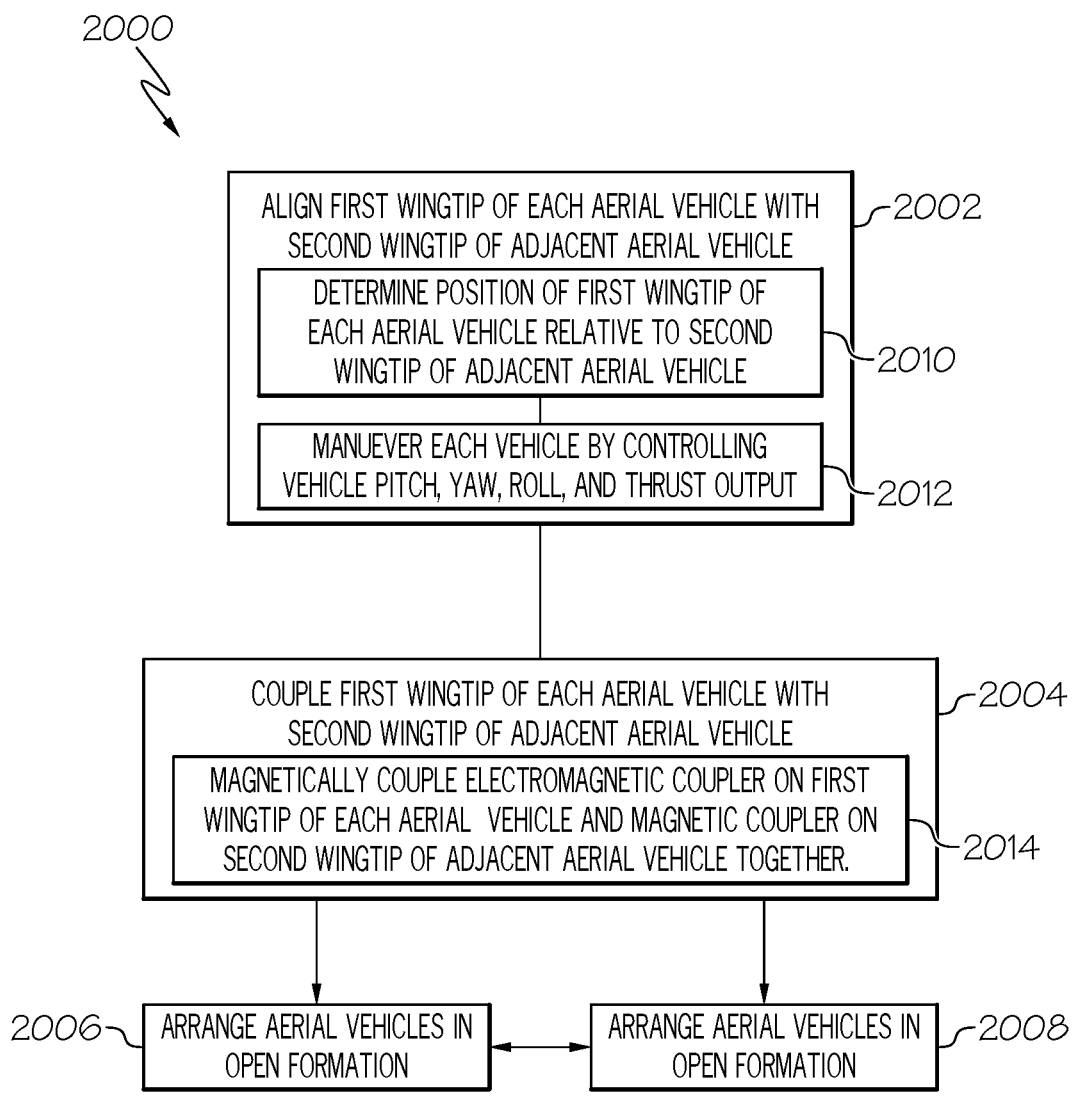
FIG. 34 is a flow diagram of an example of a method of coupling the plurality of aerial vehicles together in flight to form the cooperative flying system.

Referring generally to FIGS. 17-33 and particularly to FIG. 34, by way of examples, the present disclosure is also directed to a method 2000 of coupling the plurality of aerial vehicles 100 together in flight to form the system 200.

In one or more examples, the method 2000 includes a step of (block 2002) aligning the first wingtip 108 of each one of the plurality of aerial vehicles 100 with the second wingtip 110 of the directly adjacent one of the plurality of aerial vehicles 100. The method 2000 also includes a step of (block 2004) coupling the first wingtip 108 of each one of the plurality of aerial vehicles 100 to the second wingtip 110 of the directly adjacent one of the plurality of aerial vehicles 100.

In one or more examples, the method 2000 includes a step of (block 2006) arranging the plurality of aerial vehicles 100 in the open formation 210 in which the first vehicle axis 102 of each one of the plurality of aerial vehicles 100 is coincident with the first vehicle axis 102 of the directly adjacent one of the plurality of aerial vehicles 100 and the first formation-end 206 of the system 200 is axially opposed to the second formation-end 208 of the system 200.

In one or more examples, the method 2000 includes a step of (block 2008) arranging the plurality of aerial vehicles 100 in the closed formation 212 in which the first vehicle axis 102 of each one of the plurality of aerial vehicles 100 intersects the first vehicle axis 102 of the directly adjacent one of the plurality of aerial vehicles 100 and the first formation-end 206 of the system 200 is connected to the second formation-end 208 of the system 200.

In one or more examples, the method 2000 includes a step of transitioning between the open formation 210 and the closed formation 212 while in flight and with the plurality of aerial vehicles 100 coupled together.

In one or more examples, the step of (block 2002) aligning includes a step of (block 2010) determining a position of the first wingtip 108 of a first one of the plurality of aerial vehicles 100 relative to the second wingtip 110 of a second one of the plurality of aerial vehicles 100 that is directly adjacent to the first one of the plurality of aerial vehicles 100. The step of (block 2002) aligning also includes a step of (block 2012) maneuvering the first one of the plurality of aerial vehicles 100 and the second one of the plurality of aerial vehicles 100 into alignment by controlling at least one of a pitch angle, a yaw angle, a roll angle and a thrust output of at least one of the first one and the second one of the plurality of aerial vehicles 100 to align the first wingtip 108 of the first one of the plurality of aerial vehicles 100 with the second wingtip 110 of the second one of the plurality of aerial vehicles 100 based on a determined position of the first wingtip 108 of the first one of the plurality of aerial vehicles 100 relative to the second wingtip 110 of the second one of the plurality of aerial vehicles 100.

Alignment is accomplished by maneuvering the aerial vehicles 100 toward one another. Each aerial vehicle 100 maneuvers toward coupling in a horizontal flight mode. As used herein, the terms "maneuver," "maneuvering" and variations thereof refer to a change of relative position and a change in angularity. Therefore, maneuvering is accomplished via altering pitch, roll, and yaw angularity along with collective thrust of each aerial vehicle 100.

In one or more examples, the step of (block 2004) coupling includes a step of (block 2014) magnetically coupling the electromagnetic coupler 226, located on the first wingtip 108 of the first one of the plurality of aerial vehicles 100, and the magnetic coupler 228, located on the second wingtip 110 of the second one of the plurality of aerial vehicles 100 that is directly adjacent to the first one of the plurality of aerial vehicles 100, together in response to alignment of the first wingtip 108 of the first one of the plurality of aerial vehicles 100 with the second wingtip 110 of the second one of the plurality of aerial vehicles 100.

As an example of the method 2000, a first aerial vehicle 100 is designated as "lead" for the formation. In an example, the aerial vehicle 100 closest to the target designates itself as the lead for the formation. In another example, a land-based director (e.g., human or artificial intelligence) may assign one aerial vehicle 100 as the lead. In yet another example, some other criteria may be used to designate a lead for the formation. A first (e.g., lead) vehicle controller 120 (e.g., the controller 120 of the first aerial vehicle 100) initiates straight, level and constant-speed flight for the lead aerial vehicle 100.

A second aerial vehicle 100 maneuvers into the vicinity of the first aerial vehicle 100. For example, a navigation system, such as a Global Positioning System (GPS), is used by the second aerial vehicle 100 to bring the second aerial vehicle 100 into the vicinity of the first aerial vehicle 100. The second aerial vehicle 100 then maneuvers into the proximity of the first aerial vehicle 100. The processor 222 receives information from its image sensor 220 to determine distance and angularity between the first wingtip 108 of the second aerial vehicle 100 and the second wingtip 110 of the first aerial vehicle 100. A second vehicle controller 120 (e.g., controller 120 of the second aerial vehicle 100) receives proximity information from its processor 222 and initiates maneuver corrections (roll, pitch, yaw, thrust) to better align its image sensor 220 to the target 218 of the first aerial vehicle 100. The maneuver operation is repeated until the second aerial vehicle 100 couples with the first aerial vehicle 100.

The proximity sensor 224 indicates no distance between the first wingtip 108 of the second aerial vehicle 100 and the second wingtip 110 of the first aerial vehicle 100 indicating that coupling has been completed. The second vehicle controller 120 reads the "coupled" signal from its associated processor 222. The second vehicle controller 120 maneuvers the second aerial vehicle 100 to mimic the straight, level and constant-speed flight of the first aerial vehicle 100.

The second vehicle controller 120 communicates with the first vehicle controller 120 that coupling is complete, such as via wireless communication. The process is repeated for each additional aerial vehicle 100 until the entire system 200 is formed.

Figure 35:
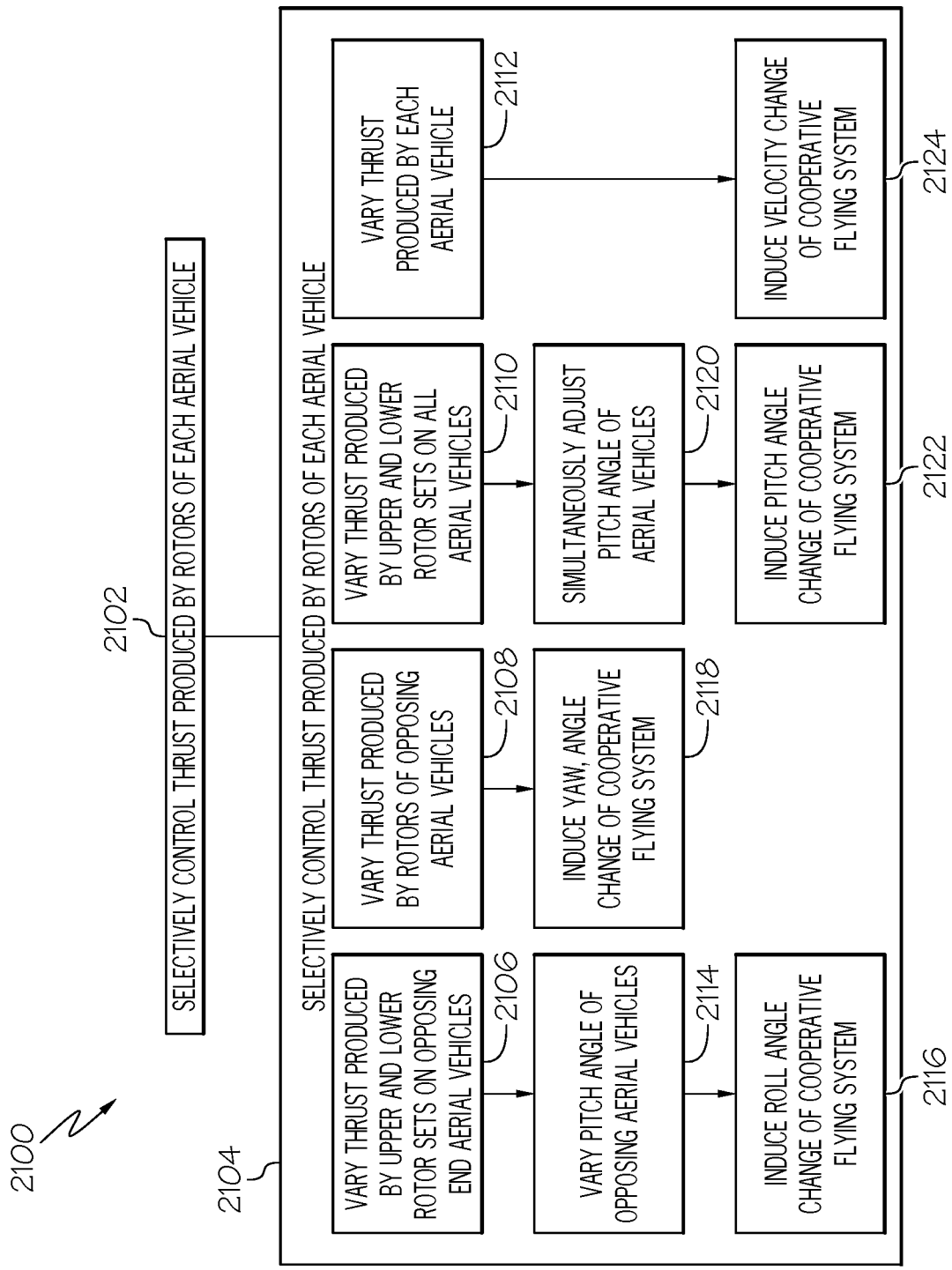
FIG. 35 is a flow diagram of an example of a method of controlling the cooperative flying system.

Referring generally to FIGS. 17-33 and particularly to FIG. 35, by way of examples, the present disclosure is further directed to a method 2100 of controlling the system 200 of aerial vehicles 100 that are coupled together.

In one or more examples, the method 2100 includes a step of (block 2102) selectively controlling thrust produced by the plurality of rotors 116 of each one of the plurality of aerial vehicles 100. The method 2100 also includes a step of (block 2104) coordinating the thrust produced by the plurality of rotors 116 of each one of the plurality of aerial vehicles 100 to induce a pitch motion, a yaw motion, and a rolling motion of the cooperative flying system 200. As an example, the step of (block 2104) coordinating the thrust includes a step of varying the thrust produced by select ones of the rotors 116 (e.g., blocks 2106, 2108, 2110 and 2112).

In one or more examples, the method 2100 includes a step of (block 2106) varying the thrust produced by upper and lower sets of the rotors 116 on opposing end ones of the aerial vehicles 100. The method 2100 includes a step of (block 2114) varying a pitch angle of the opposing end ones of the plurality of aerial vehicles 100 by varying the thrust produced by each one of the plurality of rotors 116 of the opposing end ones of the plurality of aerial vehicles 100 to cause the opposing end ones of the plurality of aerial vehicles 100 to differentially pitch up or down, thereby creating opposing lift and downforce. The method 2100 includes a step of (block 2116) inducing the rolling motion (e.g., a roll angle change) of the system 200 by varying the pitch angle of the opposing end ones of the plurality of aerial vehicles 100.

In one or more examples, the method 2100 includes a step of (block 2108) varying the trust produced by the plurality of rotors 116 of the opposing end ones of the plurality of aerial vehicles 100 to cause the opposing end ones of the plurality of aerial vehicles 100 to horizontally push or pull respective ends of the cooperative flying system 200. The method 2100 includes a step of (block 2118) inducing the yaw motion (e.g., a yaw angle change) of the system 200 by varying the thrust.

In one or more examples, the method 2100 includes a step of (block 2110) varying the thrust produced by upper ones of the plurality of rotors 116 and lower ones of the plurality of rotors 116 of all of the plurality of aerial vehicles 100 to cause the plurality of aerial vehicles 100 to cooperatively pitch upward or downward. The method (2100) includes a step of (block 2120) simultaneously adjusting the pitch angle of the plurality of aerial vehicles 100 by varying the thrust. The method 2100 includes a step of (block 2122) inducing the pitching motion (e.g., pitch angle change) of the system 200.

In one or more examples, the method 2100 includes a step of (block 2112) varying the thrust produced by each one of the plurality of aerial vehicles 100. The method 2100 includes a step of (block 2124) inducing a velocity change of the system 200 by varying the thrust.

Figure 36:
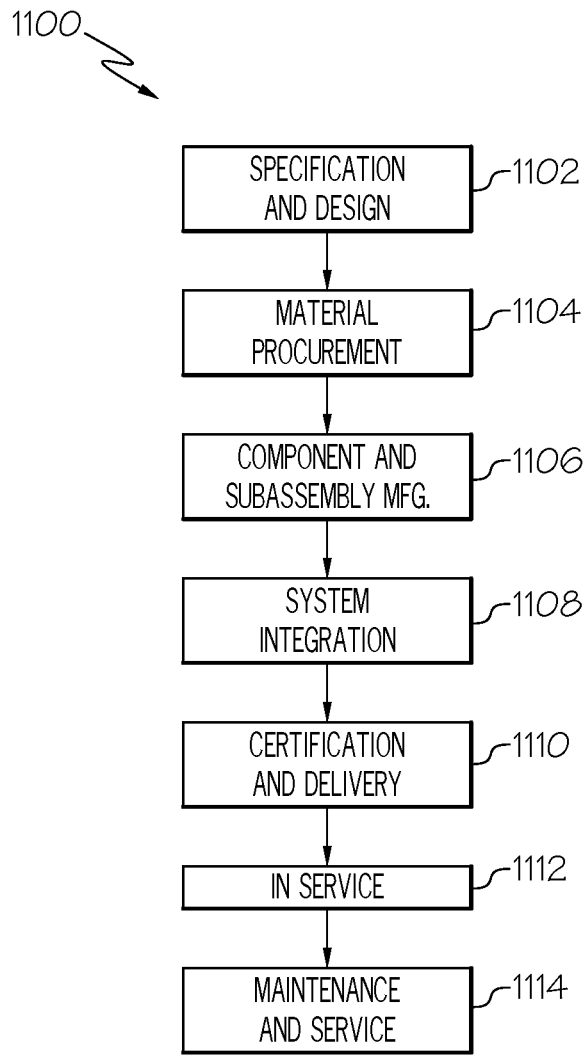
FIG. 36 is a flow diagram of an aircraft manufacturing and service methodology.
Figure 37:
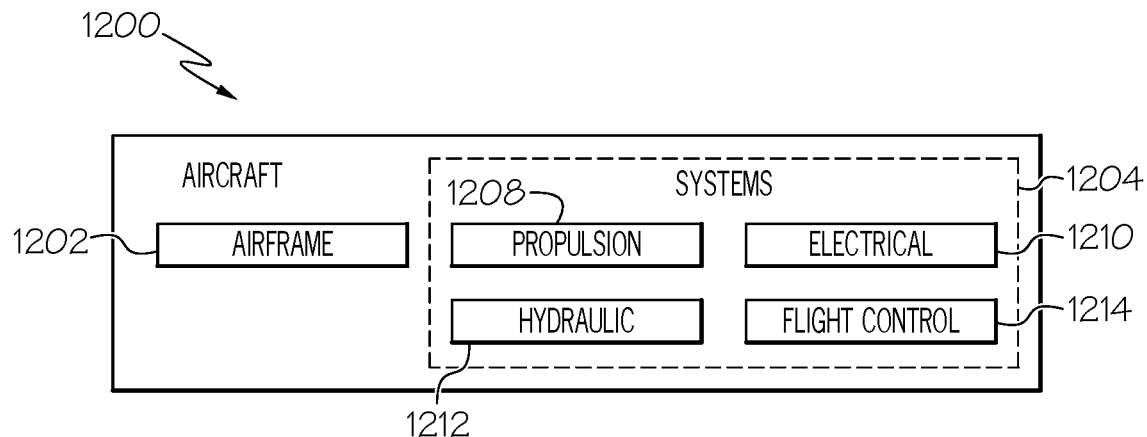
FIG. 37 is a schematic block diagram of an example of an aircraft.

Referring now to FIGS. 36 and 37, examples of the aerial vehicle 100, the system 200 and the methods 1000, 2000 and 2100 may be related to, or used in the context of, an aircraft manufacturing and service method 1100, as shown in the flow diagram of FIG. 36 and the aircraft 1200, as schematically illustrated in FIG. 37.

Referring to FIG. 37, in one or more examples, the aircraft 1200 includes an airframe 1202 and a plurality of high-level systems 1204. Examples of the high-level systems 1204 include one or more of a propulsion system 1208, an electrical system 1210, a hydraulic system 1212, and a flight control system 1214. In other examples, the aircraft 1200 may include any number of other types of systems, such as a communications system, a guidance system, an environmental system, a weapons system, and the like.

In one or more examples, the disclosed aerial vehicle 100 is an example the aircraft 1200. In one or more examples, the wing body 106 is an example of the airframe 1202. In one or more examples, a combination of the plurality of rotors 116, the drive assembly 118, and the variable pitch mechanism 162 is an example of, or forms at least a portion of, the propulsion system 1208. In an example, the controller 120 is an example of, or forms at least a portion of, the flight control system 1214.

Referring to FIG. 36, during pre-production, the method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the method 1100 illustrated in FIG. 36 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

In FIGS. 1, 17 and 37, referred to above, the blocks may represent functional elements, features, or components thereof and lines connecting the various blocks do not necessarily imply any particular structure. Accordingly, modifications, additions and/or omissions may be made to the illustrated structure. Additionally, those skilled in the art will appreciate that not all elements described and illustrated in FIGS. 1-15, 17-33 and 38, referred to above, need be included in every example and not all elements described herein are necessarily depicted in each illustrative example. Unless otherwise explicitly stated, the schematic illustrations of the examples depicted in FIGS. 1-15, 17-33 and 38, referred to above, are not meant to imply structural limitations with respect to the illustrative example. Rather, although one illustrative structure is indicated, it is to be understood that the structure may be modified when appropriate.

In FIGS. 16 and 34-36, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 16 and 34-36 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the aerial vehicle 100, the cooperative flying system 200 and the methods 1000, 2000 and 2100 have been shown and described, modifications may occur to those skilled in the art upon reading the specification. The present application includes such modifications and is limited only by the scope of the claims.

Clause A1. An aerial vehicle (100) having a first vehicle axis (102) and a second vehicle axis (104), perpendicular to the first vehicle axis (102), the aerial vehicle (100) comprising a wing body (106) having an airfoil shape and comprising a first wingtip (108) and a second wingtip (110), located opposite the first wingtip (108) along the first vehicle axis (102); and a first edge (112) and a second edge (114), located opposite the first edge (112) along the second vehicle axis (104); a plurality of rotors (116) coupled to the wing body (106), each one of the plurality of rotors (116) comprising a plurality of rotor blades (122); a drive assembly (118) configured to rotate the plurality of rotors (116); and a controller (120) configured to selectively control thrust produced by each one of the plurality of rotors (116), wherein selective control of the thrust produced by each one of the plurality of rotors (116) induces a pitch motion of the aerial vehicle (100) to transition the aerial vehicle (100) between a horizontal flight state and a vertical flight state; in the horizontal flight state, the second vehicle axis (104) is approximately horizontal and a collective thrust from the plurality of rotors (116) is directed forward; and in the vertical flight state, the second vehicle axis (104) is approximately vertical and the collective thrust from the plurality of rotors (116) is directed upward.

Clause A2. The aerial vehicle (100) of Clause A1, further comprising a variable pitch mechanism (162) configured to selectively manipulate blade pitch of the plurality of rotor blades (122), wherein the controller (120) is configured to selectively adjust the blade pitch of the plurality of rotor blades (122) corresponding to each one of the plurality of rotors (116) to selectively vary at least one of the thrust and torque produced by each one of the plurality of rotors (116) and to induce at least one of the pitch motion, a yaw motion, and a rolling motion of the aerial vehicle (100).

Clause A3. The aerial vehicle (100) of Clause A2, wherein the plurality of rotors (116) further comprises: a first rotor (124) and a second rotor (126), located opposite the first rotor (124) along a third vehicle axis (132) that is perpendicular to the first vehicle axis (102) and the second vehicle axis (104); and a third rotor (128) and a fourth rotor (130), located opposite the third rotor (128) along a fourth vehicle axis (134) that is perpendicular to the first vehicle axis (102) and the second vehicle axis (104); the first rotor (124) and the fourth rotor (130) are configured to rotate in a first rotational direction (146) and form a rotationally correlated first pair (148) of the plurality of rotors (116); and the second rotor (126) and the third rotor (128) are configured to rotate in a second rotational direction (158) that is opposite to the first rotational direction (146) and form a rotationally correlated second pair (150) of the plurality of rotors (116).

Clause A4. The aerial vehicle (100) of Clause A3, wherein: the variable pitch mechanism (162) is configured to collectively manipulate the blade pitch of the plurality of rotor blades (122); and the controller (120) is configured to selectively vary the blade pitch of the plurality of rotor blades (122) corresponding to the rotationally correlated first pair (148) and the blade pitch of the plurality of rotor blades (122) corresponding to the rotationally correlated second pair (150) to create a torque imbalance, which generates a rotational moment about a roll axis of the aerial vehicle (100) that induces the rolling motion of the aerial vehicle (100).

Clause A5. The aerial vehicle (100) of Clause A3 or A4, wherein: the drive assembly (118) is configured to manipulate a rotational speed of each one of the plurality of rotors (116); and the controller (120) is configured to selectively vary the rotational speed of the plurality of rotors (116) corresponding to the rotationally correlated first pair (148) and the blade pitch of the plurality of rotor blades (122) corresponding to the rotationally correlated second pair (150) to create an additional torque, which generates a rotational moment about a roll axis of the aerial vehicle (100) that induces the rolling motion of the aerial vehicle (100).

Clause A6. The aerial vehicle (100) of any of Clauses A3-A5, wherein: the wing body (106) further comprises: a wing first section (140); and a wing second section (142) coupled to the wing first section (140) along the first vehicle axis (102); and the wing first section (140) and the wing second section (142) are rotatable about the first vehicle axis (102) relative to each other in response to a variation in the thrust produced by the plurality of rotors (116) corresponding to the rotationally correlated first pair (148) and the thrust produced by the plurality of rotors (116) corresponding to the rotationally correlated second pair (150) to vary an angle of attack between the wing first section (140) and the wing second section (142) that induces the rolling motion of the aerial vehicle (100).

Clause A7. The aerial vehicle (100) of any of Clauses A2-A6, wherein the plurality of rotors (116) further comprises a first coaxial rotor (136) configured to rotate in a first rotational direction (146); and a second coaxial rotor (138) configured to rotate in a second rotational direction (158) that is opposite to the first rotational direction (146).

Clause A8. The aerial vehicle (100) of Clause A7 wherein the variable pitch mechanism (162) is configured to collectively manipulate the blade pitch of the plurality of rotor blades (122); and the controller (120) is configured to collectively vary the blade pitch of the plurality of rotor blades (122) corresponding to the first coaxial rotor (136) and the blade pitch of the plurality of rotor blades (122) corresponding to of the second coaxial rotor (138) to create a torque imbalance, which generates a rotational moment about a roll axis of the aerial vehicle (100) that induces the rolling motion of the aerial vehicle (100).

Clause A9. The aerial vehicle (100) of Clause A7 or A8, wherein the variable pitch mechanism (162) is configured to independently manipulate the blade pitch of each one of the plurality of rotor blades (122); and the controller (120) is configured to cyclically vary the blade pitch of each one of the plurality of rotor blades (122) corresponding to at least one of the first coaxial rotor (136) and the second coaxial rotor (138) through different sectors of a rotation cycle to induce at least one of the pitch motion and the yaw motion of the aerial vehicle (100).

Clause A10. The aerial vehicle (100) of any of Clauses A7-A9, wherein the drive assembly (118) comprises a motor (144); and the wing body (106) further comprises a wing first section (140) coupled to the motor (144); and a wing second section (142) coupled to the motor (144) opposite to the wing first section (140) along the first vehicle axis (102).

Clause A11. The aerial vehicle (100) of any of Clauses A7-A10, further comprising a duct (152) that is concentric to the first coaxial rotor (136) and the second coaxial rotor (138), wherein the wing body (106) further comprises a wing first section (140) coupled to the duct (152); and a wing second section (142) coupled to the duct (152) opposite to the wing first section (140) along the first vehicle axis (102).

Clause A12. The aerial vehicle (100) of Clause A11, wherein the duct (152) comprises a leading end (156); and a plurality of slats (160) located at the leading end (156) and configured to extend and retract; and the controller (120) is configured to selectively extend or retract each one of the plurality of slats (160) to produce a thrust differential between the first coaxial rotor (136) and the second coaxial rotor (138) adjacent to the plurality of slats (160) at different sectors of a rotation cycle to induce at least one of the pitch motion and the yaw motion of the aerial vehicle (100).

Clause A13. An aerial vehicle (100) comprising a wing body (106) having an airfoil shape; a plurality of rotors (116) coupled to the wing body (106), each one of the plurality of rotors (116) comprising a plurality of rotor blades (122); a drive assembly (118) operatively coupled with the plurality of rotors (116) to rotate each one of the plurality of rotors (116); a variable pitch mechanism (162) operatively coupled with each one of the plurality of rotors (116) to manipulate blade pitch of each one of the plurality of rotor blades (122) of the plurality of rotors (116); and a controller (120) in communication with the variable pitch mechanism (162) and with the drive assembly (118) and configured to selectively adjust the blade pitch of each one of the plurality of rotor blades (122) of the plurality of rotors (116) and to selectively control rotational speed of each one of the plurality of rotors (116), wherein variations in at least one of the blade pitch of the plurality of rotor blades (122) of the plurality of rotors (116) and the rotational speed of the plurality of rotors (116) controls a pitch motion, a yaw motion, and a rolling motion of the aerial vehicle (100); selective control of the pitch motion of the aerial vehicle (100) transitions the aerial vehicle (100) between a horizontal flight state and a vertical flight state; in the horizontal flight state, the wing body (106) is oriented horizontally and a collective thrust from the plurality of rotors (116) is directed forward; and in the vertical flight state, the wing body (106) is oriented vertically and the collective thrust from the plurality of rotors (116) is directed upward.

Clause A14. The aerial vehicle (100) of Clause A13, wherein the variable pitch mechanism (162) is configured to collectively manipulate the blade pitch of the plurality of rotor blades (122) corresponding to each one of the plurality of rotors (116); and the controller (120) is configured to collectively vary the blade pitch of the plurality of rotor blades (122) corresponding to at least one of the plurality of rotors (116) to create a torque imbalance, which generates a rotational moment about a roll axis of the aerial vehicle (100) that induces the rolling motion of the aerial vehicle (100).

Clause A15. The aerial vehicle (100) of Clause A14, wherein the variable pitch mechanism (162) is configured to independently manipulate the blade pitch of each one of the plurality of rotor blades (122) corresponding to each one of the plurality of rotors (116); and the controller (120) is configured to cyclically vary the blade pitch of each one of the plurality of rotor blades (122) corresponding to at least one of the plurality of rotors (116) through different sectors of a rotation cycle to induce the pitch motion and the yaw motion.

Clause A16. A method (1000) of controlling an aerial vehicle (100) comprising a wing body (106) having an airfoil shape, a plurality of rotors (116) coupled to the wing body (106), and a drive assembly (118) configured to rotate the plurality of rotors (116), the method (1000) comprising selectively controlling at least one of thrust and torque produced by each one of the plurality of rotors (116) to induce at least one of a pitch motion, a yaw motion, and a rolling motion of the aerial vehicle (100); and in response to the pitch motion, transitioning the aerial vehicle (100) between a horizontal flight state in which the wing body (106) is oriented horizontally and a collective thrust from the plurality of rotors (116) is directed forward, and a vertical flight state in which the wing body (106) is oriented vertically and the collective thrust from the plurality of rotors (116) is directed upward.

Clause A17. The method (1000) of Clause A16, wherein selectively controlling at least one of the thrust and the torque produced by each one of the plurality of rotors (116) comprises selectively adjusting blade pitch of a plurality of rotor blades (122) corresponding to each one of the plurality of rotors (116).

Clause A18. The method (1000) of Clause A17, wherein the plurality of rotors (116) comprises a rotationally correlated first pair (148) configured to rotate in a first rotational direction (146); and a rotationally correlated second pair (150) configured to rotate in a second rotational direction (158) that is opposite to the first rotational direction (146); and selectively adjusting the blade pitch of the plurality of rotor blades (122) corresponding to each one of the plurality of rotors (116) comprises collectively varying the blade pitch of the plurality of rotor blades (122) corresponding to at least one of the rotationally correlated first pair (148) and the rotationally correlated second pair (150) to create a torque imbalance, which generates a rotational moment about a roll axis of the aerial vehicle (100) that induces the rolling motion of the aerial vehicle (100).

Clause A19. The method (1000) of Clause A17 or A18, wherein the plurality of rotors (116) comprises a first coaxial rotor (136) configured to rotate in a first rotational direction (146); and a second coaxial rotor (138) configured to rotate in a second rotational direction (158) that is opposite to the first rotational direction (146); and selectively adjusting the blade pitch of the plurality of rotor blades (122) corresponding to each one of the plurality of rotors (116) comprises collectively varying the blade pitch of the plurality of rotor blades corresponding to at least one of the first coaxial rotor (136) and the second coaxial rotor (138) to create a torque imbalance, which generates a rotational moment about a roll axis of the aerial vehicle (100) that induces the rolling motion of the aerial vehicle (100).

Clause A20. The method (1000) of Clause A19, wherein selectively adjusting the blade pitch of the plurality of rotor blades (122) corresponding to each one of the plurality of rotors (116) comprises cyclically varying the blade pitch of each one of the plurality of rotor blades (122) corresponding to at least one of the first coaxial rotor (136) and the second coaxial rotor (138) through different sectors of a rotation cycle to create the torque imbalance, which generates at least one of a rotational moment about a pitch axis of the aerial vehicle (100) that induces the pitch motion of the aerial vehicle (100) and a rotational moment about a yaw axis of the aerial vehicle (100) that induces the yaw motion of the aerial vehicle (100).

Clause A21. The method (1000) of any of Clauses A16-A20, further comprising selectively varying at least one the thrust and the torque produced by at least one of the plurality of rotors (116) to control at least one of the pitch motion, the yaw motion, and the rolling motion of the aerial vehicle (100) while the aerial vehicle (100) is in the horizontal flight state or the vertical flight state.

Clause A22. A cooperative flying system (200) comprising a plurality of aerial vehicles (100) configured to be coupled together in flight, wherein each one of the plurality of aerial vehicles (100) comprises a wing body (106) having a first vehicle axis (102) and comprising a first wingtip (108) and a second wingtip (110), located opposite to the first wingtip (108) along the first vehicle axis (102), and a plurality of rotors (116) coupled to the wing body (106); an alignment apparatus (202) configured to align the first wingtip (108) of each one of the plurality of aerial vehicles (100) with the second wingtip (110) of a directly adjacent one of the plurality of aerial vehicles (100); a coupling apparatus (204) configured to couple the first wingtip (108) of each one of the plurality of aerial vehicles (100) to the second wingtip (110) of the directly adjacent one of the plurality of aerial vehicles (100); and a set of vehicle controllers (120) configured to coordinate thrust produced by the plurality of rotors (116) of each one of the plurality of aerial vehicles (100) to alter at least one of a pitch angle, a yaw angle, and a roll angle of the cooperative flying system (200) and a velocity of the cooperative flying system (200).

Clause A23. The cooperative flying system (200) of Clause A22, further comprising a first formation-end (206), formed by the first wingtip (108) of one of the plurality of aerial vehicles (100), and a second formation-end (208), formed by the second wingtip (110) of another one of the plurality of aerial vehicles (100), wherein the plurality of aerial vehicles (100) is arranged in one of an open formation (210) in which the first vehicle axis (102) of each one of the plurality of aerial vehicles (100) is coincident with the first vehicle axis (102) of the directly adjacent one of the plurality of aerial vehicles (100) and the first formation-end (206) is axially opposed to the second formation-end (208); or a closed formation (212) in which the first vehicle axis (102) of each one of the plurality of aerial vehicles (100) intersects the first vehicle axis (102) of the directly adjacent one of the plurality of aerial vehicles (100) and the first formation-end (206) is connected to the second formation-end (208).

Clause A24. The cooperative flying system (200) of Clause A23, wherein the plurality of aerial vehicles (100) is configured to transition between the open formation (210) and the closed formation (212) while coupled together.

Clause A25. The cooperative flying system (200) of Clause A23 or A24, wherein each one of the plurality of aerial vehicles (100) is pivotable about a pivot axis (214), that is perpendicular to the first vehicle axis (102), relative to the directly adjacent one of the plurality of aerial vehicles (100).

Clause A26. The cooperative flying system (200) of any of Clauses A23-A25, wherein each one of the plurality of aerial vehicles (100) is rotatable about a rotation axis (216), that is parallel to the first vehicle axis (102), relative to the directly adjacent one of the plurality of aerial vehicles (100).

Clause A27. The cooperative flying system (200) of any of Clauses A22-A26, wherein the set of vehicle controllers (120) is further configured to selectively control the thrust produced by each one of the plurality of rotors (116) of each one of the plurality of aerial vehicles (100); and selective control of the thrust produced by each one of the plurality of rotors (116) of each one of the plurality of aerial vehicles (100) controls a pitch motion of each one of the plurality of aerial vehicles (100) relative to another one of the plurality of aerial vehicles (100).

Clause A28. The cooperative flying system (200) of Clause A27, wherein the set of vehicle controllers (120) is further configured to oppositely vary an angle of attack of opposing ones of the plurality of aerial vehicles (100) to induce a rolling motion of the cooperative flying system (200); oppositely vary the thrust produced by the plurality of rotors (116) of opposing ones of the plurality of aerial vehicles (100) to induce a yaw motion of the cooperative flying system (200); and oppositely vary the thrust produced by upper ones of the plurality of rotors (116) and lower ones of the plurality of rotors (116) of each of the plurality of aerial vehicles (100) to induce a pitching motion of the cooperative flying system (200).

Clause A29. The cooperative flying system (200) of any of Clauses A22-A28, wherein the alignment apparatus (202) comprises a target (218) located on the second wingtip (110) of each one of the plurality of aerial vehicles (100); an image sensor (220) located on the first wingtip (108) of each one of the plurality of aerial vehicles (100) and configured to capture image data representing the target (218); and a processor (222) configured to determine position data representing the position of the first wingtip (108) of each one of the plurality of aerial vehicles (100) relative to the second wingtip (110) of the directly adjacent one of the plurality of aerial vehicles (100) based on the image data; and the set of vehicle controllers (120) is further configured to control at least one of the pitch angle, the yaw angle, the roll angle, and the thrust output of each one of the plurality of aerial vehicles (100) to align the first wingtip (108) of each one of the plurality of aerial vehicles (100) with the second wingtip (110) of the directly adjacent one of the plurality of aerial vehicles (100) based on the position data.

Clause A30. The cooperative flying system (200) of any of Clauses A22-A29, wherein the coupling apparatus (204) comprises an electromagnetic coupler (226) located on the first wingtip (108) of each one of the plurality of aerial vehicles (100); and a magnetic coupler (228) located on the second wingtip (110) of each one of the plurality of aerial vehicles (100); and each one of the set of vehicle controllers (120) is further configured to energize the electromagnetic coupler (226) to magnetically couple the electromagnetic coupler (226) and the magnetic coupler (228) together in response to alignment of the first wingtip (108) of each one of the plurality of aerial vehicles (100) with the second wingtip (110) of the directly adjacent one of the plurality of aerial vehicles (100).

Clause A31. The cooperative flying system (200) of any of Clauses A22-A30, wherein the wing body (106) of each one of the plurality of aerial vehicles (100) comprises an airfoil shape.

Clause A32. The cooperative flying system (200) of Clause A31, wherein each one of the plurality of aerial vehicles (100) further comprises a first resilient member (230) coupled to the first wingtip (108); and a second resilient member (232) coupled to the second wingtip (110); and the first resilient member (230) and the second resilient member (232) form a continuous aerodynamic surface between the first wingtip (108) of each one of the plurality of aerial vehicles (100) and the second wingtip (110) of the directly adjacent one of the plurality of aerial vehicles (100).

Clause A33. The cooperative flying system (200) of Clause A31 or A32, wherein the plurality of rotors (116) comprises a first rotor (124) and a second rotor (126), located opposite the first rotor (124); and a third rotor (128) and a fourth rotor (130), located opposite the third rotor (128); the first rotor (124) and the fourth rotor (130) are configured to rotate in a first rotational direction (146); and the second rotor (126) and the third rotor (128) are configured to rotate in a second rotational direction (158) that is opposite to the first rotational direction (146).

Clause A34. The cooperative flying system (200) of any of Clauses A31-A33, wherein the plurality of rotors (116) comprises a first coaxial rotor (136) configured to rotate in a first rotational direction (146); and a second coaxial rotor (138) configured to rotate in a second rotational direction (158) that is opposite to the first rotational direction (146).

Clause A35. A method (2000) of coupling a plurality of aerial vehicles (100) together in flight to form a cooperative flying system (200), the method (1300) comprising aligning a first wingtip (108) of each one of the plurality of aerial vehicles (100) with a second wingtip (110) of a directly adjacent one of the plurality of aerial vehicles (100); and coupling the first wingtip (108) of each one of the plurality of aerial vehicles (100) to the second wingtip (110) of the directly adjacent one of the plurality of aerial vehicles (100).

Clause A36. The method (2000) of Clause A35, further comprising arranging the plurality of aerial vehicles (100) in an open formation (210) in which a first vehicle axis (102) of each one of the plurality of aerial vehicles (100) is coincident with the first vehicle axis (102) of the directly adjacent one of the plurality of aerial vehicles (100) and a first formation-end (206) of the cooperative flying system (200) is axially opposed to a second formation-end (208) of the cooperative flying system (200).

Clause A37. The method (2000) of Clause A35 or A36, further comprising arranging the plurality of aerial vehicles (100) in a closed formation (212) in which a first vehicle axis (102) of each one of the plurality of aerial vehicles (100) intersects the first vehicle axis (102) of the directly adjacent one of the plurality of aerial vehicles (100) and a first formation-end (206) of the cooperative flying system (200) is connected to a second formation-end (208) of the cooperative flying system (200).

Clause A38. The method (2000) of any of Clauses A35-A37, wherein aligning the first wingtip (108) of each one of the plurality of aerial vehicles (100) with the second wingtip (110) of the directly adjacent one of the plurality of aerial vehicles (100) comprises determining a position of the first wingtip (108) of a first one of the plurality of aerial vehicles (100) relative to the second wingtip (110) of a second one of the plurality of aerial vehicles (100) that is directly adjacent to the first one of the plurality of aerial vehicles (100); and maneuvering the first one of the plurality of aerial vehicles (100) and the second one of the plurality of aerial vehicles (100) into alignment by controlling at least one of a pitch angle, a yaw angle, a roll angle and a thrust output of at least one of the first one and the second one of the plurality of aerial vehicles (100) to align the first wingtip (108) of the first one of the plurality of aerial vehicles (100) with the second wingtip (110) of the second one of the plurality of aerial vehicles (100) based on a determined position of the first wingtip (108) of the first one of the plurality of aerial vehicles (100) relative to the second wingtip (110) of the second one of the plurality of aerial vehicles (100).

Clause A39. The method (2000) of any of Clauses A35-A38, wherein coupling the first wingtip (108) of each one of the plurality of aerial vehicles (100) to the second wingtip (110) of the directly adjacent one of the plurality of aerial vehicles (100) comprises magnetically coupling an electromagnetic coupler (226), located on the first wingtip (108) of a first one of the plurality of aerial vehicles (100), and a magnetic coupler (228), located on the second wingtip (110) of a second one of the plurality of aerial vehicles (100) that is directly adjacent to the first one of the plurality of aerial vehicles (100), together in response to alignment of the first wingtip (108) of the first one of the plurality of aerial vehicles (100) with the second wingtip (110) of the second one of the plurality of aerial vehicles (100).

Clause A40. A method (2100) of controlling a cooperative flying system (200), comprising a plurality of aerial vehicles (100) that are coupled together, the method (2100) comprising selectively controlling thrust produced by a plurality of rotors (116) of each one of the plurality of aerial vehicles (100); and coordinating the thrust produced by the plurality of rotors (116) of each one of the plurality of aerial vehicles (100) to induce a pitch motion, a yaw motion, and a rolling motion of the cooperative flying system (200).

Clause A41. The method (2100) of Clause A40, further comprising varying a pitch angle of opposing end ones of the plurality of aerial vehicles (100) by varying the thrust produced by each one of the plurality of rotors (116) of the opposing end ones of the plurality of aerial vehicles (100) to cause the opposing end ones of the plurality of aerial vehicles (100) to differentially pitch up or down, thereby creating opposing lift and downforce to induce the rolling motion of the cooperative flying system (200); varying the thrust produced by the plurality of rotors (116) of the opposing end ones of the plurality of aerial vehicles (100) to cause the opposing end ones of the plurality of aerial vehicles (100) to horizontally push or pull respective ends of the cooperative flying system (200) to induce the yaw motion of the cooperative flying system (200); and simultaneously adjusting the pitch angle of the plurality of aerial vehicles (100) by varying the thrust produced by upper ones of the plurality of rotors (116) and lower ones of the plurality of rotors (116) of the plurality of aerial vehicles (100) to cause the plurality of aerial vehicles (100) to cooperatively pitch upward or downward to induce the pitching motion of the cooperative flying system (200).

Clause B1. An aerial vehicle (100) comprising: a wing body (106) having an airfoil shape and comprising: a first wingtip (108) and a second wingtip (110), located opposite the first wingtip (108) along a first vehicle axis (102); and a first edge (112) and a second edge (114), located opposite the first edge (112) along a second vehicle axis (104), perpendicular to the first vehicle axis (102); a first coaxial rotor (116) (136) configured to rotate in a first rotational direction (146) about the second vehicle axis (104); a second coaxial rotor (116) (138) configured to rotate in a second rotational direction (158), opposite to the first rotational direction (146), about the second vehicle axis (104); a drive assembly (118) configured to rotate the first coaxial rotor (116) (136) and the second coaxial rotor (116) (138); and a controller (120) configured to selectively control thrust produced by the first coaxial rotor (116) (136) and the second coaxial rotor (116) (138), wherein: selective control of the thrust produced by the first coaxial rotor (116) (136) and the second coaxial rotor (116) (138) induces a pitch motion of the aerial vehicle (100) to transition the aerial vehicle (100) between a horizontal flight state and a vertical flight state; in the horizontal flight state, the second vehicle axis (104) is approximately horizontal and a collective thrust from the first coaxial rotor (116) (136) and the second coaxial rotor (116) (138) is directed forward; and in the vertical flight state, the second vehicle axis (104) is approximately vertical and the collective thrust from the first coaxial rotor (116) (136) and the second coaxial rotor (116) (138) is directed upward.

Clause B2. The aerial vehicle (100) of Clause B1, further comprising a variable pitch mechanism (162) configured to selectively manipulate blade pitch of first rotor blades (122) of the first coaxial rotor (116) (136) and second rotor blades (122) of the second coaxial rotor (116) (138).

Clause B3. The aerial vehicle (100) of Clause B1 or B2, wherein the controller (120) is configured to selectively adjust the blade pitch of the first rotor blades (122) and the second rotor blades (122) to selectively vary at least one of the thrust and torque produced by the first coaxial rotor (116) (136) and the second coaxial rotor (116) (138) and to induce at least one of the pitch motion, a yaw motion, and a rolling motion of the aerial vehicle (100).

Clause B4. The aerial vehicle (100) of Clause B2 or B3, wherein the variable pitch mechanism (162) is configured to collectively manipulate the blade pitch of the first rotor blades (122) of the first coaxial rotor (116) (136) and the second rotor blades (122) of the second coaxial rotor (116) (136).

Clause B5. The aerial vehicle (100) of Clause B4, wherein the controller (120) is configured to collectively vary the blade pitch of the first rotor blades (122) of the first coaxial rotor (116) (136) and the blade pitch of the second rotor blades (122) of the second coaxial rotor (116) to create a torque imbalance, which generates a rotational moment about a roll axis of the aerial vehicle (100) that induces the rolling motion of the aerial vehicle (100).

Clause B6. The aerial vehicle (100) of any one of Clauses B2-B5, wherein the variable pitch mechanism (162) is configured to independently manipulate the blade pitch of the first rotor blades (122) of the first coaxial rotor (116) (136) and the second rotor blades (122) of the second coaxial rotor (116) (138).

Clause B7. The aerial vehicle (100) of any one of Clauses B2-B6, wherein the controller (120) is configured to cyclically vary the blade pitch of each one of the first rotor blades (122) of the first coaxial rotor (116) (136) through different sectors of a rotation cycle to induce at least one of the pitch motion and the yaw motion of the aerial vehicle (100).

Clause B8. The aerial vehicle (100) of any one of Clause s B2-B7, wherein the controller (120) is further configured to cyclically vary the blade pitch of each one of the second rotor blades (122) of the second coaxial rotor (116) (138) through different sectors of the rotation cycle to induce at least one of the pitch motion and the yaw motion of the aerial vehicle (100).

Clause B9. The aerial vehicle (100) of any one of Clauses B1-B8, wherein: the drive assembly (118) comprises a motor (144); and the first coaxial rotor (116) (136) and the second coaxial rotor (116) (138) are coupled to the motor (144).

Clause B10. The aerial vehicle (100) of Claim B9, wherein the wing body (106) further comprises: a wing first section (140) coupled to the motor (144); and a wing second section (142) coupled to the motor (144) opposite the wing first section (140) along the first vehicle axis (102).

Clause B11. The aerial vehicle (100) of Claim B10, wherein the wing first section (140) and the wing second section (142) are rotatable about the first vehicle axis (102) relative to each other.

Clause B12. The aerial vehicle (100) of any one of Clauses B1-B9, further comprising a duct (152) that is concentric to the first coaxial rotor (116) (136) and the second coaxial rotor (116) (138).

Clause B13. The aerial vehicle (100) of Clause B12, wherein the wing body (106) further comprises: a wing first section (140) coupled to the duct (152); and a wing second section (142) coupled to the duct (152) opposite the wing first section (140) along the first vehicle axis (102).

Clause B14. The aerial vehicle (100) of Clause B12 or B13, wherein: the duct (152) comprises: a leading end (156); and a plurality of slats (160) located at the leading end (156) and configured to extend and retract; and the controller (120) is configured to selectively extend or retract each one of the plurality of slats (160) to produce a thrust differential between the first coaxial rotor (116) (136) and the second coaxial rotor (116) (138) adjacent to the plurality of slats (160) at different sectors of a rotation cycle to induce at least one of the pitch motion and the yaw motion of the aerial vehicle (100).

Clause B15. The aerial vehicle (100) of any one of Clauses B1-B14, further comprising: an alignment apparatus (202) configured to align one of the first wingtip (108) and the second wingtip (110) of the aerial vehicle (100) with a wingtip of an adjacent aerial vehicle (100); and a coupling apparatus (204) configured to couple one of the first wingtip (108) and the second wingtip (110) of the aerial vehicle (100) with the wingtip of the adjacent aerial vehicle (100).

Clause B16. The aerial vehicle (100) of Clause B15, wherein: the alignment apparatus (202) comprises: an image sensor (220) located on the first wingtip (108); and a target (218) located on the second wingtip (110); the image sensor (220) is configured to detect an adjacent target (218) located on the wingtip of the adjacent aerial vehicle (100); and the target (218) is configured to be detected by an adjacent image sensor (220) located on the wingtip of the adjacent aerial vehicle (100).

Clause B17. The aerial vehicle (100) of Clause B15 or B16, wherein: the coupling apparatus (204) comprises: an electromagnetic coupler (226) located on the first wingtip (108); and a magnetic coupler (228) located on the second wingtip (110); the electromagnetic coupler (226) is configured to be magnetically coupled to an adjacent magnetic coupler (228) located on the wingtip of the adjacent aerial vehicle (100); and the magnetic coupled is configured to be magnetically coupled to an adjacent electromagnetic coupler (226) located on the wingtip of the adjacent aerial vehicle (100).

Clause B18. A method for controlling an aerial vehicle (100) comprising a wing body (106) having an airfoil shape, a pair of coaxial rotors (116) coupled to the wing body (106), and a drive assembly (118) configured to rotate the pair of coaxial rotors (116) (136) (138), the method comprising: selectively controlling at least one of thrust and torque produced by the pair of coaxial rotors (116) (136) (138) to induce at least one of a pitch motion, a yaw motion, and a rolling motion of the aerial vehicle (100); and in response to the pitch motion, transitioning the aerial vehicle (100) between a horizontal flight state in which the wing body (106) is oriented horizontally and a collective thrust from the pair of coaxial rotors (116) is directed forward, and a vertical flight state in which the wing body (106) is oriented vertically and the collective thrust from the pair of coaxial rotors (116) (136) (138) is directed upward.

Clause B19. The method of Clause B18, wherein: the pair of coaxial rotors (116) comprises: a first coaxial rotor (116) (136) configured to rotate in a first rotational direction (146); and a second coaxial rotor (116) (138) configured to rotate in a second rotational direction (158) that is opposite to the first rotational direction (146); and selectively controlling at least one of the thrust and the torque produced by the pair of coaxial rotors (116) (136) (138) comprises at least one of: collectively varying blade pitch of a plurality of rotor blades (122) corresponding to at least one of the first coaxial rotor (116) (136) and the second coaxial rotor (116) (138) to create a torque imbalance, which generates a rotational moment about a roll axis of the aerial vehicle (100) that induces the rolling motion of the aerial vehicle (100); and cyclically varying the blade pitch of each one of the plurality of rotor blades (122) corresponding to at least one of the first coaxial rotor (116) (136) and the second coaxial rotor (116) (138) through different sectors of the rotation cycle to create the torque imbalance, which generates at least one of a rotational moment about a pitch axis of the aerial vehicle (100) that induces the pitch motion of the aerial vehicle (100) and a rotational moment about a yaw axis of the aerial vehicle (100) that induces the yaw motion of the aerial vehicle (100).

Clause B20. A cooperative flying system (200) comprising: a plurality of aerial vehicles (100) configured to be coupled together in flight, wherein each one of the plurality of aerial vehicles (100) comprises: a wing body (106) comprising a first wingtip (108) and a second wingtip (110), located opposite to the first wingtip (108) along a first vehicle axis (102); a first coaxial rotor (116) (136) configured to rotate in a first rotational direction (146) about a second vehicle axis (104), perpendicular to the first vehicle axis (102); and a second coaxial rotor (116) (138) configured to rotate in a second rotational direction (158), opposite to the first rotational direction (146), about the second vehicle axis (104); an alignment apparatus (202) configured to align the first wingtip (108) of each one of the plurality of aerial vehicles (100) with the second wingtip (110) of a directly adjacent one of the plurality of aerial vehicles (100); a coupling apparatus (204) configured to couple the first wingtip (108) of each one of the plurality of aerial vehicles (100) to the second wingtip (110) of the directly adjacent one of the plurality of aerial vehicles (100); and a set of vehicle controllers (120) configured to coordinate thrust produced by the first coaxial rotor (116) (136) and the second coaxial rotor (116) (138) of each one of the plurality of aerial vehicles (100) to alter at least one of a pitch angle, a yaw angle, and a roll angle of the cooperative flying system (200) and a velocity of the cooperative flying system (200).

What is claimed is:

1. An aerial vehicle comprising:
    a wing body having an airfoil shape and comprising:
        a wing first section;
        a wing second section, opposite the wing first section along a first vehicle axis;
        a first wingtip and a second wingtip, located opposite the first wingtip along the first vehicle axis; and
        a first edge and a second edge, located opposite the first edge along a second vehicle axis, perpendicular to the first vehicle axis;
    a first coaxial rotor configured to rotate in a first rotational direction about the second vehicle axis;
    second coaxial rotor configured to rotate in a second rotational direction, opposite to the first rotational direction, about the second vehicle axis;
    a drive assembly positioned between the wing first section and the wing second section and configured to rotate the first coaxial rotor and the second coaxial rotor; and
    a controller configured to selectively control thrust produced by the first coaxial rotor and the second coaxial rotor,
    wherein:
        the wing first section and the wing second section are rotatable about the first vehicle axis relative to the drive assembly;
        selective control of the thrust produced by the first coaxial rotor and the second coaxial rotor induces a pitch motion of the aerial vehicle to transition the aerial vehicle between a horizontal flight state and a vertical flight state;
        in the horizontal flight state, the second vehicle axis is approximately horizontal and a collective thrust from the first coaxial rotor and the second coaxial rotor is directed forward; and
        in the vertical flight state, the second vehicle axis is approximately vertical and the collective thrust from the first coaxial rotor and the second coaxial rotor is directed upward.

2. The aerial vehicle of claim 1, further comprising a variable pitch mechanism configured to selectively manipulate blade pitch of first rotor blades of the first coaxial rotor and second rotor blades of the second coaxial rotor.

3. The aerial vehicle of claim 2, wherein the controller is configured to selectively adjust the blade pitch of the first rotor blades and the second rotor blades to selectively vary at least one of the thrust and torque produced by the first coaxial rotor and the second coaxial rotor and to induce at least one of the pitch motion, a yaw motion, and a rolling motion of the aerial vehicle.

4. The aerial vehicle of claim 3, wherein the variable pitch mechanism is configured to collectively manipulate the blade pitch of the first rotor blades of the first coaxial rotor and the second rotor blades of the second coaxial rotor.

5. The aerial vehicle of claim 4, wherein the controller is configured to collectively vary the blade pitch of the first rotor blades of the first coaxial rotor and the blade pitch of the second rotor blades of the second coaxial rotor to create a torque imbalance, which generates a rotational moment about a roll axis of the aerial vehicle that induces the rolling motion of the aerial vehicle.

6. The aerial vehicle of claim 3, wherein the variable pitch mechanism is configured to independently manipulate the blade pitch of the first rotor blades of the first coaxial rotor and the second rotor blades of the second coaxial rotor.

7. The aerial vehicle of claim 6, wherein the controller is configured to cyclically vary the blade pitch of each one of the first rotor blades of the first coaxial rotor through different sectors of a rotation cycle to induce at least one of the pitch motion and the yaw motion of the aerial vehicle.

8. The aerial vehicle of claim 7, wherein the controller is further configured to cyclically vary the blade pitch of each one of the second rotor blades of the second coaxial rotor through different sectors of the rotation cycle to induce at least one of the pitch motion and the yaw motion of the aerial vehicle.

9. The aerial vehicle of claim 1, wherein:
    the drive assembly comprises a motor; and
    the first coaxial rotor and the second coaxial rotor are coupled to the motor.

10. The aerial vehicle of claim 9, wherein:
    the wing first section is coupled to the motor; and
    the wing second section is coupled to the motor opposite the wing first section along the first vehicle axis.

11. The aerial vehicle of claim 9, further comprising a duct that is concentric to the first coaxial rotor and the second coaxial rotor.

12. The aerial vehicle of claim 11, wherein:
    the wing first section is coupled to the duct; and
    the wing second section is coupled to the duct opposite the wing first section along the first vehicle axis.

13. The aerial vehicle of claim 11, wherein:
    the duct comprises:
        a leading end; and
        a plurality of slats located at the leading end and configured to extend and retract; and
    the controller is configured to selectively extend or retract each one of the plurality of slats to produce a thrust differential between the first coaxial rotor and the second coaxial rotor adjacent to the plurality of slats at different sectors of a rotation cycle to induce at least one of the pitch motion and a yaw motion of the aerial vehicle.

14. The aerial vehicle of claim 1, further comprising:
    an alignment guide configured to align one of the first wingtip and the second wingtip of the aerial vehicle with a wingtip of an adjacent aerial vehicle; and
    a coupler configured to couple one of the first wingtip and the second wingtip of the aerial vehicle with the wingtip of the adjacent aerial vehicle.

15. The aerial vehicle of claim 14, wherein:
    the alignment guide comprises:
        an image sensor located on the first wingtip; and
        a target located on the second wingtip;
    the image sensor is configured to detect an adjacent target located on the wingtip of the adjacent aerial vehicle; and
    the target is configured to be detected by an adjacent image sensor located on the wingtip of the adjacent aerial vehicle.

16. The aerial vehicle of claim 14, wherein:
    the coupler comprises:
        an electromagnetic coupler located on the first wingtip; and
        a magnetic coupler located on the second wingtip;
    the electromagnetic coupler is configured to be magnetically coupled to an adjacent magnetic coupler located on the wingtip of the adjacent aerial vehicle; and the magnetic coupled is configured to be magnetically coupled to an adjacent electromagnetic coupler located on the wingtip of the adjacent aerial vehicle.

17. A method for controlling an aerial vehicle comprising a wing body comprising a wing first section and a wing second section, opposite the wing first section along a first vehicle axis, having an airfoil shape, a pair of coaxial rotors coupled to the wing body, and a drive assembly positioned between the wing first section and the wing second section and configured to rotate the pair of coaxial rotors, the method comprising:
- selectively controlling an angle of attack of the wing body by selectively rotating the wing first section and the wing second section about the first vehicle axis relative to the drive assembly;
- selectively controlling at least one of thrust and torque produced by the pair of coaxial rotors to induce at least one of a pitch motion, a yaw motion, and a rolling motion of the aerial vehicle; and
- in response to the pitch motion, transitioning the aerial vehicle between a horizontal flight state in which the wing body is oriented horizontally and a collective thrust from the pair of coaxial rotors is directed forward, and a vertical flight state in which the wing body is oriented vertically and the collective thrust from the pair of coaxial rotors is directed upward.

18. The method of claim 17, wherein:
the pair of coaxial rotors comprises:
- a first coaxial rotor configured to rotate in a first rotational direction; and
- a second coaxial rotor configured to rotate in a second rotational direction that is opposite to the first rotational direction; and selectively controlling at least one of the thrust and the torque produced by the pair of coaxial rotors comprises at least one of:
- collectively varying blade pitch of a plurality of rotor blades corresponding to at least one of the first coaxial rotor and the second coaxial rotor to create a torque imbalance, which generates a rotational moment about a roll axis of the aerial vehicle that induces the rolling motion of the aerial vehicle; and
- cyclically varying the blade pitch of each one of the plurality of rotor blades corresponding to at least one of the first coaxial rotor and the second coaxial rotor through different sectors of a rotation cycle to create the torque imbalance, which generates at least one of a rotational moment about a pitch axis of the aerial vehicle that induces the pitch motion of the aerial vehicle and a rotational moment about a yaw axis of the aerial vehicle that induces the yaw motion of the aerial vehicle.

19. A cooperative flying system comprising:
a plurality of aerial vehicles configured to be coupled together in flight, wherein each one of the plurality of aerial vehicles comprises:
- a wing body comprising a first wingtip and a second wingtip, located opposite to the first wingtip along a first vehicle axis;
- a first coaxial rotor configured to rotate in a first rotational direction about a second vehicle axis, perpendicular to the first vehicle axis;
- a second coaxial rotor configured to rotate in a second rotational direction, opposite to the first rotational direction, about the second vehicle axis; and
- a drive assembly configured to rotate the first coaxial rotor and the second coaxial rotor;

an alignment guide configured to align the first wingtip of each one of the plurality of aerial vehicles with the second wingtip of a directly adjacent one of the plurality of aerial vehicles;

a coupler configured to couple the first wingtip of each one of the plurality of aerial vehicles to the second wingtip of the directly adjacent one of the plurality of aerial vehicles; and a set of vehicle controllers configured to coordinate thrust produced by the first coaxial rotor and the second coaxial rotor of each one of the plurality of aerial vehicles to alter at least one of a pitch angle, a yaw angle, and a roll angle of the cooperative flying system and a velocity of the cooperative flying system.

20. The cooperative flying system of claim 19, wherein the wing first section and the wing second section of at least one of the plurality of aerial vehicles are rotatable about the first vehicle axis relative to the drive assembly.

* * * * *